United States Patent
Kippelen et al.

(10) Patent No.: US 9,658,510 B2
(45) Date of Patent: May 23, 2017

(54) DEVICES, SYSTEMS AND METHODS FOR ULTRAFAST OPTICAL APPLICATIONS

(71) Applicant: Georgia Tech Research Corporation, Atlanta, GA (US)

(72) Inventors: Bernard Kippelen, Atlanta, GA (US); Canek Fuentes-Hernandez, Atlanta, GA (US); James June Fan Hsu, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 14/764,100

(22) PCT Filed: Dec. 20, 2013

(86) PCT No.: PCT/US2013/077166
§ 371 (c)(1),
(2) Date: Jul. 28, 2015

(87) PCT Pub. No.: WO2014/100702
PCT Pub. Date: Jun. 26, 2014

(65) Prior Publication Data
US 2015/0378243 A1      Dec. 31, 2015

Related U.S. Application Data

(60) Provisional application No. 61/739,071, filed on Dec. 19, 2012, provisional application No. 61/831,292, filed on Jun. 5, 2013.

(51) Int. Cl.
*G02F 1/03* (2006.01)
*G02F 1/21* (2006.01)
(Continued)

(52) U.S. Cl.
CPC .............. *G02F 1/21* (2013.01); *G02F 1/0126* (2013.01); *G02F 1/17* (2013.01); *G02F 1/19* (2013.01);
(Continued)

(58) Field of Classification Search
CPC ...... G02F 1/3523; G02F 1/3515; G02F 1/355; G02F 1/17; G02F 1/0126; G02F 1/21; G02F 1/19; G02F 2001/211
(Continued)

(56) References Cited

U.S. PATENT DOCUMENTS 6,856,737 B1 * 2/2005 Parker ..................... G02F 1/353
359/333
7,729,616 B2 * 6/2010 Etemad ................. H04J 14/007
398/140

(Continued)

OTHER PUBLICATIONS

Niu et al. ("Theoretical and experimental study of a new picosecond and nanosecond framing camera". Optic Express. Jan. 1, 1993. SPIE Vo. 1801 High-Speed Photography and Photonics (1992)/841.*

*Primary Examiner* — Tuyen Tra
(74) *Attorney, Agent, or Firm* — Troutman Sanders LLP; Ryan A. Schneider

(57) ABSTRACT

An optical device capable of an ultrafast and large change of its reflection or absorption coefficient upon being excited by an ultrafast optical pulse with wavelength in the visible, near-infrared, or infrared spectral regions. The optical device includes, in sequential order, a first thick metallic layer, a first dielectric layer, a second thin metallic layer, and a second dielectric layer. The optical device acts as a nonlinear mirror that presents a large reflectance at low irradiance and a low reflectance at large irradiance. The optical device can further act as a nonlinear mirror that presents a linear and nonlinear reflectance with a large angular bandwidth.

22 Claims, 40 Drawing Sheets

(51) Int. Cl.
  *G02F 1/01*   (2006.01)
  *G02F 1/19*   (2006.01)
  *G02F 1/17*   (2006.01)
  *G02F 1/35*   (2006.01)
  *G02F 1/355*  (2006.01)

(52) U.S. Cl.
  CPC .......... *G02F 1/3523* (2013.01); *G02F 1/355* (2013.01); *G02F 2001/211* (2013.01); *G02F 2203/10* (2013.01)

(58) Field of Classification Search
  USPC .................. 359/244, 241, 240, 238, 237
  See application file for complete search history.

(56) References Cited

U.S. PATENT DOCUMENTS

2009/0296767 A1* 12/2009 Okhotnikov .......... B82Y 10/00
                                                       372/45.013
2010/0220574 A1*  9/2010 Kojima ................ G11B 7/1387
                                                       369/100

\* cited by examiner

DEVICES, SYSTEMS AND METHODS FOR ULTRAFAST OPTICAL APPLICATIONS

CROSS-REFERENCE TO RELATED APPLICATIONS

This application is a U.S. National Stage of International Application No. PCT/US2013/077166, filed 20 Dec. 2013, which claims the benefit of U.S. Provisional Application No. 61/739,071 filed 19 Dec. 2012, U.S. Provisional Application No. 61/831,292 filed 5 Jun. 2013, and International Application No. PCT/US2013/07672, filed 19 Dec. 2013, the entire contents and substance of which are hereby incorporated by reference.

STATEMENT OF FEDERALLY SPONSORED RESEARCH

This technology was made with government support under contract 0120967 awarded by the National Science Foundation (NSF), contract DMR-0120967 awarded by the NSF, and contract W31P4Q-09-1-0012 awarded by the US Army. The government has certain rights in the technology.

BACKGROUND OF THE INVENTION

1. Field of the Invention

The present invention relates generally to devices, systems and methods for ultrafast optical applications, and more specifically to a nonlinear optical mirror, and uses of same in optical system, providing stronger modulations of the reflectance or transmittance in the visible and near-infrared spectral ranges at lower pump energies than conventional nonlinear optical materials or devices.

2. Description of Related Art

Materials with a strong power-dependent reflectance, absorptance or transmittance are keys for the development of all-optical applications such as optical signal processing, pulse compression, passive protective devices and medical image processing. A trade-off exists between the strength and the response time of a nonlinear process and the transparency of a material. The nonlinear optical response of a material is strong when the optical field resonates with the frequency of an allowed electronic transition, but this also leads long-lived excitations that are much slower than electronic processes that induce a nonlinear polarization. As a general rule, the strength of the nonlinear polarization terms induced in a material increases as the optical bandgap of the material decreases. As a consequence, transparent materials with an ultrafast nonlinear optical response have weaker nonlinearities in the visible spectral range compared with transparent materials in the infrared spectral range. For these reasons, nonlinear optical devices are more easily implemented in the near-infrared and infrared spectral ranges. However, in all cases, since the nonlinear response of common materials is typically weak, when incorporated in device configurations they require large switching energies and/or long interaction lengths to produce significant effects. In addition to these restrictions, other restrictions such as fulfillment of wave-vector matching conditions further complicate the incorporation of these materials into active optical devices.

Known examples that are particularly relevant to the present invention include: nonlinear mirrors and ultrafast optical shutters. Nonlinear mirrors have been realized by: the combination of a second harmonic generation (SHG) crystal and a dichroic mirror and used to demonstrate intra-cavity passive mode-locking operation for picosecond-pulse generation in the visible range; Bragg-periodic structures comprising semiconductor layers with Kerr-type optical nonlinearity in the infrared spectral range have been reported. Ultrafast optical shutters or loop mirrors are known to be realized using a nonlinear Sagnac interferometer wherein an intra-loop nonlinear optical element is placed off-center to define the opening time of the shutter. The nonlinear optical element in these cases is known to be a Kerr medium, a saturable absorber or a high gain laser media.

The rapid-growth development of biomedical applications and micromachining using ultrafast optical pulses in the visible spectral range creates a strong need for developing ultrafast optical devices that operate at visible and near-infrared wavelengths. These devices are expected to enable the all-optical control over the spatial and temporal irradiance profiles of high energy optical pulses and could find multiple applications in a variety of optical technologies.

Noble metals are known to have an extremely large and ultrafast NLO response in the visible spectral range, much larger than most known organic or inorganic materials, but are seldom used as NLO materials due to their limited optical transparency and large reflectance in the visible (Vis) and near infrared (NIR) spectral ranges. Ultra-thin layers of noble metals can be semi-transparent in the visible range if their thickness is around the skin depth of metals (typically between 10 to 20 nm). Thicker metal layers rapidly loose transparency and become highly reflective due to the inherent large admittance contrast between metals and the dielectric environment. It is well known in the art that the dielectric environment of a metal can be engineered, by nanostructured dielectric layers, to relief the admittance contrast between the metal and its environment. Using this approach, it is possible for thin layers of noble metals, with a thickness of several times its skin depth, to be highly transparent within the spectral region where the optical response of the metal arises from their intraband electronic transitions. The large admittance mismatch, or alternatively permittivity contrast, between metals and dielectrics makes it possible to engineer compact nanostructures with fewer layers and unique optical properties compared to all-dielectric nanostructures. Induced-transmission filters (ITFs) and metal-dielectric bandgap structures (MDPBGs) are known examples of such nanostructures. The increased transmittance in such nanostructures arises from a large decrease in reflectance and an increased absorptance within the metal layers. For these effects to be significant, the excitation of surface plasmon polariton modes must be avoided since they lead to parasitic absorptance and decreased transmittance or reflectance. Hence, metallic nanostructures offer a unique opportunity to engineer optical devices with tailored linear optical properties in the Vis and NIR spectral ranges.

The ability to engineer the linear absorption in a thin metal layer within a nanostructure is also important because the NLO response of noble metals arises from the electron and lattice heating caused by the absorption of energy from an ultrafast optical pulse. The linear and NLO responses of noble metals are determined by the inherent electronic properties that define their dielectric permittivity. The electronic properties of noble metals in the visible spectrum are characterized by two separate mechanisms, namely interband and intraband transitions, that dominate in different spectral regions within the visible spectrum, and consequently lead to different properties. Electronic interband transitions dominate in the visible or ultraviolet (UV) spectral region and arise from bound electrons excited from fully occupied electronic states within the d-band, below the Fermi energy level, to the half-filled s-p electronic bands in the conduction band. At lower energies, electronic intraband transitions occur from free electrons stimulated within the conduction band. When a metal film is excited with an ultrafast optical pulse, the absorbed optical intensity raises the temperature of the electron cloud and smears the electronic distribution around the Fermi energy (Fermi-smearing), causing a very strong change of the dielectric permittivity of the metal around the interband transition onset. The latter is defined by the wavelength or photon energy where the electronic properties stop being dominated by interband transitions and start to be assigned to intraband transitions.

Known examples of nonlinear optical devices exploiting the nonlinear optical response of thin noble-metal films are induced-transmission filters (ITFs) and metallo-dielectric bandgap structures (MDPBGs). These devices are known to amplify the response of a single thin metal film and typically display nonlinear reflectance or transmittance changes smaller than 10% at moderate fluences smaller than 10 $J/cm^2$.

The unique linear and NLO properties of metallic nanostructures open the opportunity to develop a wide range of all-optical applications in a spectral region where materials with ultrafast and strong NLO response are very scarce and where there is a need to develop a technology that could allow a new generation of all-optical devices for biomedical, machining, and laser applications. It is the intention of the present invention to provide for such an industrial need.

BRIEF SUMMARY OF THE INVENTION

Briefly described, in a preferred form, the present invention comprises devices, systems and methods for ultrafast optical applications. The present invention can comprise an optical device capable of an ultrafast and large change of its reflection or absorption coefficient upon being excited by an ultrafast optical pulse with wavelength in the visible (Vis), near-infrared (NIR) or infrared (IR) spectral regions.

The present invention can further comprise systems and uses of such an optical device, for example, in an ultrafast all-optical shutter, and/or an ultrafast framing camera or to produce a pulse shaping device that could be used for laser manufacturing or other applications.

In an exemplary embodiment, the present optical device comprises, preferably in sequential order, a first thick metallic layer, a first dielectric layer, a second thin metallic layer, and a second dielectric layer.

In exemplary embodiments, the present optical device can act as a nonlinear mirror that presents a large reflectance at low irradiance and a low reflectance at large irradiance.

In exemplary embodiments, the present optical device acts as a nonlinear mirror that presents a linear and nonlinear reflectance with a large angular bandwidth.

In exemplary embodiments, the present optical device acts as a nonlinear mirror that presents a high reflectance at a first angle of incidence and a high absorptance at a second angle of incidence, wherein an optical pulse impinging on the nonlinear mirror with a high irradiance at the second angle of incidence causes a strong reduction of the reflectance of the nonlinear mirror at the first angle of incidence.

In exemplary embodiments, the present optical device acts as a non-degenerate nonlinear mirror, wherein the reflectance at a first wavelength and at a first angle of incidence is controlled by the absorption of a light pulse at a second wavelength and at a second angle of incidence.

In exemplary embodiments, the present optical device acts as a reflective saturable absorber that presents a high absorptance at low irradiances and a lower absorptance at high irradiances.

In exemplary embodiments, the present optical device acts as a non-degenerate switch wherein the absorptance or reflectance of the device at a first wavelength is modified by the absorption of light at a second wavelength.

In exemplary embodiments, the present nonlinear optical device comprises in sequential order a first thick metallic layer, a first dielectric layer, a second thin metallic layer and a second dielectric layer. The first thick metallic layer can be a substrate or a superstrate and can be known metal with a large reflectivity in the Vis, NIR or/and IR spectral ranges. The thickness of the first metallic layer is at least 50 nm, preferably more than 100 nm, and more preferably more than 200 nm.

The first dielectric layer can comprise a bulk or a nanostructured material of known organic or inorganic materials with insulator or semiconductor properties having a low absorption in the spectral region of operation of the nonlinear mirror. The refractive index of the first dielectric layer has a value of at least 1 in the spectral region of operation of the nonlinear mirror. The second thin metallic layer constitutes the active nonlinear optical component on the structure and can be a noble metal such as Au, Ag, and Cu. The thickness of the second metallic layer is at least such that the metallic layer is electrically continuous, above the percolation threshold, typically more than 5 nm, preferably more than 10 nm, but not larger than 40 nm or a couple of times the maximum metal skin depth in the spectral region of interest.

The second dielectric layer can be a substrate or a superstrate comprising a bulk or a nanostructured material, such as a Bragg stack, of known organic or inorganic materials with insulator or semiconductor properties having a low absorption in the spectral region of operation of the nonlinear mirror. The refractive index of the second dielectric layer has a value of at least 1 in the spectral region of operation of the nonlinear mirror. The thickness of the first and second dielectric layers are selected to produce the desired amount of absorption in the second thin metallic layer to produce the desired nonlinear optical change of the reflection or absorption coefficient of the entire nonlinear optical device. At a given wavelength, the absorptance in the second thin metallic layer is a periodic function of the optical path length, defined as the thickness of a layer times its refractive index, of the first and second dielectric layers. The periodicity of the absorptance in the second metallic layer is half-wave the optical path length of the first and second dielectric layers.

In exemplary embodiments, the linear absorption in the second metallic layer is significantly increased compared to the linear absorption of a single metallic layer of the same thickness at a wavelength in the Vis, NIR or IR. The increased absorption in the second metallic layer produces an increased thermal nonlinearity of this layer, and consequently increases the nonlinear optical response of the present optical device, making it much stronger than the nonlinear response of a single metallic layer of the same thickness on glass. By virtue of its structure, the present nonlinear optical device displays a higher rate of change of reflectance (R) or absorptance (A) per change of refractive index of the second metallic layer, $\partial R/\partial n$ or $\partial A/\partial n$, than that of a single metallic layer of the same thickness on glass.

In addition, the present nonlinear optical device can reduce the sensitivity of R or A to changes in the imaginary part of the refractive index of the second metallic layer, which are reflected by smaller values of ∂R/∂k or ∂A/∂k than those obtained for a single metallic layer of the same thickness. As such, the large nonlinear response of the present nonlinear optical device arises from: 1) a large absorptance in the second metallic layer and 2) high sensitivity of the present nonlinear optical device to subtle changes of the real part of the refractive index of the second metallic layer. The complementary nature of R and A (R+A=1) in a mirror also implies that changes of reflectance and absorptance of a nonlinear optical device are complementary, therefore an increase in absorptance (ΔA) will lead to a decrease in reflectance (ΔR) and vice versa.

Some exemplary embodiments are or include nonlinear optical devices wherein the nonlinear reflectance change is bigger than 10% at fluences smaller than 10 J/m². In some exemplary embodiments, the present nonlinear optical device is designed to act as a nonlinear mirror having a large reflectance at low irradiances and low reflectance at large irradiances, wherein the reflectance changes is at least 10% for an optical fluence smaller than 10 J/m².

In exemplary embodiments, the present optical device acts as a nonlinear mirror that presents a linear and nonlinear reflectance with a large angular bandwidth. In exemplary embodiments, the present optical device acts as a nonlinear mirror that presents a high reflectance at a first angle of incidence and a high absorptance at a second angle of incidence, and wherein an light impinging on the nonlinear mirror with a high irradiance at the second angle of incidence causes a strong reduction of the reflectance of the nonlinear mirror at the first angle of incidence wherein the reflectance change induced in the present nonlinear optical devices is at least 10% for an optical fluence smaller than 10 J/m².

In exemplary embodiments, the present optical device acts as a non-degenerate nonlinear mirror, wherein the reflectance at a first wavelength and at a first angle of incidence is controlled by the absorption of a light pulse at a second wavelength and at a second angle of incidence. In exemplary embodiments, the present optical device acts as a reflective saturable absorber that presents a high absorptance at low irradiances and a lower absorptance at high irradiances. In exemplary embodiments, the present optical device acts as a non-degenerate switch or modulator wherein the absorptance or reflectance of the device at a first wavelength is modified by the absorption of light at a second wavelength.

In exemplary embodiments, the present nonlinear optical device can be incorporated into an optical apparatus to control the amplitude or phase of an optical beam. Such an apparatus can include but not be limited to a laser cavity, an interferometer, a detector and an imaging system.

In another exemplary embodiment, the present invention comprises a nonlinear optical device having an ultrafast nonlinear optical response in visible and near infrared spectral range. The nonlinear optical device comprises a metallic mirror, a first dielectric layer deposited on top of the metallic mirror, a semi-transparent thin noble metal layer deposited on top of the first dielectric layer comprising a single or a combination of noble metals (such as Au, Ag and Cu) and a second dielectric layer, wherein a single layer or a nano-structured dielectric multilayer is deposited on top of the noble metal layer. The thickness of the noble metal layer is around the skin depth of the metal used. The thickness of the first and second dielectric layers is chosen to tailor the linear absorption of the noble metal layer and the overall linear and nonlinear spectral reflectance and absorptance of the nonlinear optical device.

The nonlinear optical reflectance or absorptance of the present nonlinear optical device in response to strong optical pulse is at least one order of magnitude larger than the same pulse produced by a single isolated layer of the noble metal used in the nonlinear optical device structure. The response time of the nonlinear optical device is ultrafast faster than 100 ps.

The nonlinear optical device is designed to provide the linear and nonlinear reflectance invariant with respect to the angle of incidence. The nonlinear optical device provides a high linear reflectance and low linear absorptance at a first angle of incidence and a lower linear reflectance and high linear absorptance at a second angle of incidence. The nonlinear optical device is designed to have a very high absorptance at a low irradiance and smaller absorptance at a high irradiance. The nonlinear optical device is used in optical apparatus used to control the optical beam in interferometers, detectors, and imaging systems.

Thus, an objective of the present invention is to advance the science and engineering of metal-dielectric thin-film structures for ultrafast all-optical applications.

Another object of the present invention is to utilize the beneficial advantages of linear and nonlinear optical (NLO) properties of Au and Ag/Au bilayer metallic thin films, and how bilayer metallic films can be tuned by controlling the mass-thickness ratio between Au and Ag.

Yet another object of the present invention is the design of a nonlinear device useful in an ultrafast all-optical shutter.

A further object of the present invention is the development of bilayer films that are attractive for active plasmonic applications and nonlinear optical filters.

These and other objects, features and advantages of the present invention will become more apparent upon reading the following specification in conjunction with the accompanying drawing figures.

DETAIL DESCRIPTION OF THE INVENTION

Figure 1:
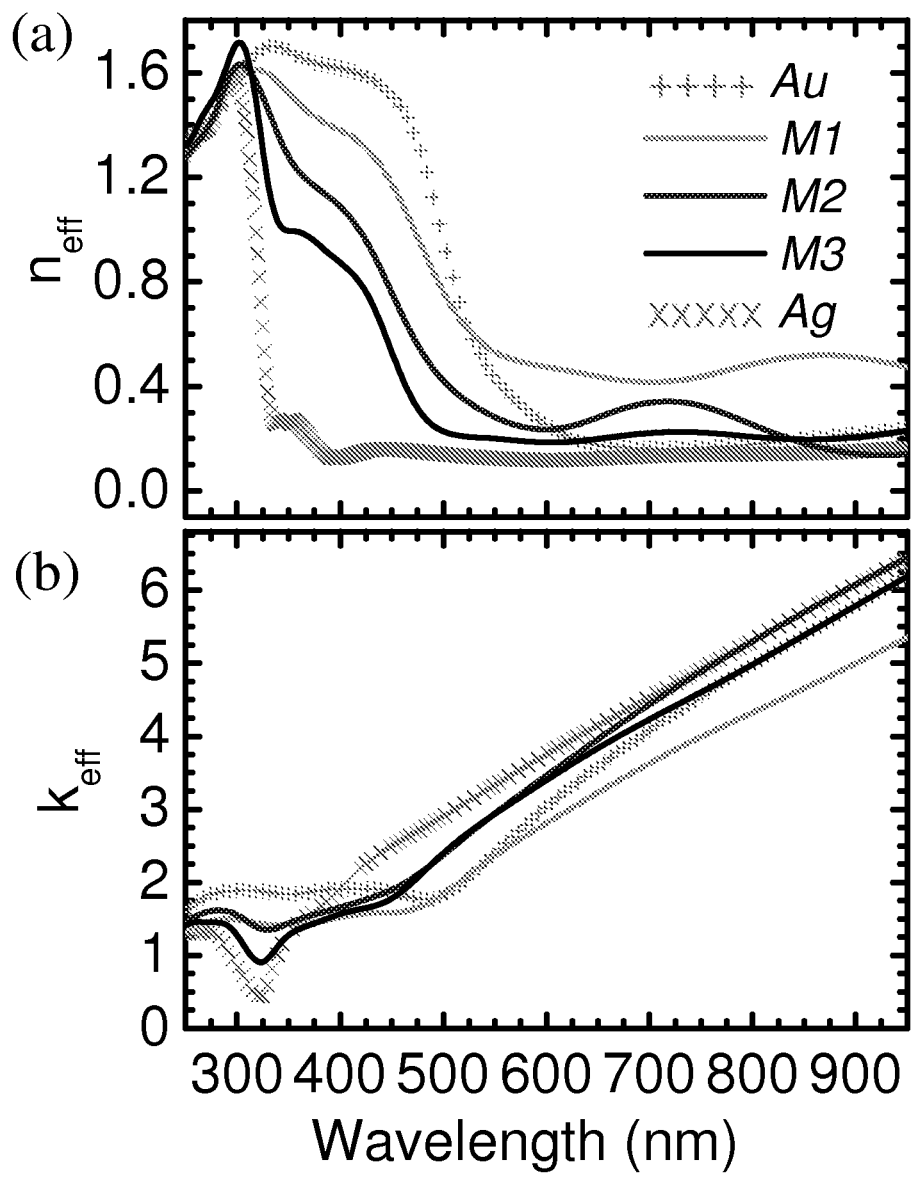
FIGS. 1: (a) real and (b) imaginary effective refractive index values of bilayer Ag/Au metal thin films: M1, M2 and M3; Au (23 nm) and Ag (20 nm) are shown as reference.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

The present invention comprises metal-dielectric thin-film structures for ultrafast all-optical applications. The linear and nonlinear optical (NLO) properties of Au and Ag/Au bilayer metallic thin films are useful in numerous applications, including an ultrafast all-optical shutter and camera. The linear and NLO properties of bilayer metallic films can be tuned by controlling the mass-thickness ratio between Au and Ag. One can optimize the NLO response of an exemplary Au-based NLO device. For example, with only four layers, the present device strongly amplifies the NLO response of the component Au thin film. NLO devices with broad spectral and angular bandwidths in the visible spectral region can be fashioned. The narrow band dependent NLO response of the NLO device leads to all-optical controls of high peak-power optical signal pulses. The more general NLO device technology can be integrated into an ultrafast all-optical shutter, which allows temporal sampling windows as short as a few ps. Ultrafast all-optical shutter potentially can temporally shape high peak-power nanosecond optical pulses, which could benefit biomedical and micromachining applications. Other possible optical applications such as short electron, X-ray pulse generations, ultrafast photography, and biomedical imaging.

One of the main challenges to develop all-optical control applications in the visible spectral region has been the lack of NLO materials with strong NLO response at visible wavelengths. Novel metal-dielectric thin-film structures are disclosed herein that amplify the strong and ultrafast NLO response of noble metal thin films and used to demonstrate an ultrafast all-optical shutter technology in the visible spectral range.

The linear and NLO properties of Au and Ag/Au bilayer metallic thin films have been studied with physical models and compared with experiments. An exemplary noble-metal NLO device structure is disclosed and shown to lead to extremely large and ultrafast reflectance changes upon being excited by femtosecond optical pulses. The angular and spectral bandwidth of NLO devices are studied using two different designs: a broadband NLO device and narrowband NLO device.

The present NLO device technology can be used to develop an ultrafast all-optical shutter capable of offering the ability to easily adjust the opening window (i.e. actively control the time during which the shutter remains open) in the ps to ns temporal regimes.

Background of Noble Metals

Noble metals, such as Ag, Au, and Cu, have a wide range of applications in photonics and electro-optics. Within the visible and near-infrared spectral regions, Ag, Au, and Cu can have a negative permittivity that allows for the excitation of surface plasmon polaritons (SPPs), which have been actively exploited in recent years for sub-wavelength photonic circuits. This negative permittivity also enables artificial meta-material structures that allow remarkable control over the dispersion and sign of the refractive index of a material and consequently over the flow of electromagnetic energy throughout its structure. In addition, highly transparent metallic structures have been reported and are attractive as optical filters with high out-of-band rejection and thin-film metal electrodes in organic light-emitting diodes. Noble metals have also attracted great attention because of their extremely large and ultrafast non-linear optical (NLO) response can be exploited to achieve all-optical control of metallic nanostructure. This NLO response is described as the first-order nonlinear susceptibility $\chi^{(1)}$ process caused by electron and lattice heating.

In the early studies, optical nonlinearities of noble metals have been interpreted in the context of the third-order nonlinear susceptibility $\chi^{(3)}$ process measured by standard techniques such as Z-scan and degenerate four-wave mixing (DFWM) for the characterization of the NLO properties. The magnitude of $\chi^{(3)}$ have been estimated at visible wavelengths on the order of $10^{-9}$-$10^{-8}$ esu ($10^{-17}$-$10^{-16}$ m$^2$/V$^2$) for Ag, $10^{-8}$-$10^{-7}$ esu ($10^{-16}$-$10^{-15}$ m$^2$/V$^2$)=for Au, and $10^{-7}$-$10^{-6}$ esu ($10^{-15}$-$10^{-14}$ m$^2$/V$^2$) for Cu.

Most of these estimations arise from measurements performed in nanocermets (metal-nanoparticles embedded in a dielectric host) and rely in the use of some effective medium theories to extract the intrinsic response of the metallic component. The third-order nonlinearity is an intensity-dependent nonlinear effect so-called optical Kerr effect, wherein the value of $\chi^{(3)}$ coefficient is an intensity-independent constant, and the nonlinear response is instantaneous on the sub-femtosecond time scale.

However, the instantaneous Kerr effect was found inadequate to describe the NLO properties of noble metals through experimental studies. First, the $\chi^{(3)}$ coefficients of noble metal thin films measured from Z-scan techniques, are not intensity-independent constants and their values could vary significantly by two order-of-magnitudes with different pulse intensities and pulse widths.

Second, the nonlinear responses of noble metal thin films and nanoparticles have revealed a non-instantaneous temporal evolution studied by pump-probe experiments. In addition, thermo-modulations experiments have also been conducted to provide extensive evidence, in which the thermal dynamics of electrons can modify the permittivity of metals. In fact, until the electron heating is recognized as the strongest contribution to the NLO response of metals, the dynamic of their nonlinearities is eventually interpreted accurately according to the two-temperature model. The two-temperature model describes the ultrafast heating process of electron and lattice temperatures and discussed hereinafter.

It is interesting to note that after the role of ultrafast thermal effects was discovered in noble metals, one derived a non-instantaneous $\chi^{(3)}$ coefficient of an Au film, assuming continuous-wave pump and probe, with a pump wavelength $\lambda_a$=950 nm (frequency $\omega_a$), and a probe pulse wavelength $\lambda_b$=500 nm (frequency $\omega_a$), they estimate values of $\chi^{(3)}$ ($\omega_b$; $\omega_a$, $-\omega_a$, $\omega_b$)≈($-8.4+11$i)×$10^{-8}$ esu (($-1.2+1.5$i)×$10^{-15}$ m$^2$/V$^2$), about six orders of magnitude larger than fused silica. This non-instantaneous $\chi^{(3)}$ coefficient is still derived from the two-temperature model, but offers an extended version to interpret ultrafast thermal nonlinearities of noble metals. It is important to note that non-instantaneous $\chi^{(3)}$ coefficients of noble metals are pulse width dependent and intensity dependent. For instance, the imaginary part of $\chi^{(3)}$ is sometimes discussed in form of nonlinear absorption coefficient $\beta$ to describe the nonlinear absorption process, and the effective value of $\beta_{eff}$ reported to change by nearly two orders of magnitude from $6.8\times10^{-7}$ to $6.7\times10^{-5}$ cm/W as the pulse width varied from 0.1 to 5.8 ps, measured for 20-nm thick Au at 630 nm.

Although a direct comparison is difficult to make between non-instantaneous $\chi^{(3)}$ coefficients of noble metals and instantaneous $\chi^{(3)}$ coefficients of other NLO materials, $\chi^{(3)}$ coefficient values are listed below as a general reference on magnitudes. Most NLO materials display values of $\chi^{(3)}$ that are orders-of-magnitude smaller than those estimated for noble metals, for example, glasses such as fused silica or BK-7 glass at 1.91 µm displays a value of $10^{-14}$ esu ($10^{-22}$ $m^2/V^2$); semiconductors such as ZnSe or GaAs at 1.06 µm display values of $10^{-11}0^{-10}$ esu ($10^{-20}$-$10^{-18}$ $m^2/V^2$); polymers such as 4BCMU (4-butoxycarbonylmethyl-urethane-polydiacetylene) at 1.06 µm or bisdioxaborine polymethines at 1.3 µm display values of $10^{-11}$-$10^{-10}$ esu ($10^{-19}$-$10^{-18}$ $m^2/V^2$). Note that these materials with large instantaneous $\chi^{(3)}$ coefficients are located at the infrared spectral range instead of the visible spectral range.

The larger order of magnitude in the non-instantaneous $\chi^{(3)}$ values can only be compared with the following instantaneous $\chi^{(3)}$ values: nanoparticles such as CS-doped glass (Commercial glass, Corning #3484: CS3-68) at 532 nm or Au-doped glass at 550 nm displays values of $10^{-9}$-$10^{-7}$ esu ($10^{-17}$-$10^{-15}$ $m^2/V^2$); Polymers such as PTS (p-toluene sulfonate) at 1.06 µm displays values of $10^{-8}$ esu ($10^{-16}$ $m^2/V^2$).

The linear and nonlinear optical responses of a noble metal and their potential applications are determined by the inherent electronic response which gives rise to their dielectric permittivity. The electronic response of a noble metal in the visible spectral region can be divided into two separate mechanisms: interband and intraband electronic transitions. Electronic interband transitions in the visible or ultraviolet (UV) spectral region arise from bound electrons excited from fully occupied electronic states within the d-band, below the Fermi energy level, to the half-filled s-p electronic bands in the conduction band. In this spectral region, metals are opaque because optical fields are strongly absorbed. At lower energies, electronic intraband transitions occur from free electrons stimulated within the conduction band. In this spectral region, metals are opaque mainly because the optical fields are reflected off its surface, rather than absorbed in the bulk.

When a metal is excited with an ultrafast optical pulse, the energy absorbed by the electron gas raises its temperature and smears the electronic distribution around the Fermi energy (Fermi-smearing), causing a very strong change of the dielectric permittivity of the metal around the onset of interband region. In the intraband region, an increased electron temperature increases electron scattering processes which change the dielectric permittivity, albeit these changes are of smaller magnitude than the ones produced in the onset of the interband region. Therefore, noble metals such as Au and Ag have very different linear and nonlinear optical properties not only because of inherent differences in their electronic configurations, but also because these differences cause the onset of interband transitions to lie in very different spectral regions (in the visible for Au and in the UV for Ag).

Noble metals are known to have an extremely large and ultrafast NLO response in the visible spectral range, much larger than most known organic or inorganic materials, but are seldom used as NLO materials due to their limited optical transparency and large reflectance in the visible and near-infrared spectral ranges. Ultra-thin layers of noble metals can be semi-transparent in the visible range if their thickness is around the skin depth of metals (typically between 10 to 20 nm). Thicker metal layers rapidly loose transparency and become highly reflective due to the inherent large admittance contrast between metals and the dielectric environment. It is well known in the art that the dielectric environment of a metal can be engineered, by nanostructured dielectric layers, to relief the admittance contrast between the metal and its environment. Using this approach, it is possible for thin layers of noble metals, with a thickness of several times its skin depth, to be highly transparent within the spectral region where the optical response of the metal arises from their intraband electronic transitions. The large admittance mismatch, or alternatively permittivity contrast, between metals and dielectrics makes it possible to engineer compact nanostructures with fewer layers and unique optical properties compared to all-dielectric nanostructures. Induced-transmission filters (ITFs) and metal-dielectric bandgap structures (MDPBGs) are known examples of such nanostructures. The increased transmittance in such nanostructures arises from a large decrease in reflectance and an increased absorptance within the metal layers. Hence, metallic nanostructures offer a unique opportunity to engineer optical devices with tailored linear optical properties in the visible and NIR spectral ranges.

The ability to engineer the linear absorption in a thin metal layer within a nanostructure is important because the NLO response of noble metals arises from the electron and lattice heating caused by the absorption of energy from an ultrafast optical pulse. Hence, engineering linear and NLO properties of metallic nanostructures opens the opportunity to develop a wide range of all-optical applications in the visible and near infrared spectral region where materials with ultrafast and strong NLO response are very scarce and where there is a need to develop a technology that could allow a new generation of all-optical devices For all-optical applications in the visible spectrum, Au is an attractive material because its interband transition onset lies around 520 nm, causing a very large NLO response across the whole visible spectrum. The nonlinear optical changes of an Au thin film has been extracted from pump-probe experiments and shown to be strong, spectrally broad, and ultrafast. The present invention in an exemplary embodiment is an Au based NLO device structure that allows all-optical control of its reflectance will be presented. The easily fabricated four-layer metal-dielectric thin-film structure will provide large and ultrafast reflectance changes in the visible spectral range. Its adjustable spectral and angular bandwidth will also be demonstrated in two structure designs: broadband NLO device and narrowband NLO device.

Origin and History of the Problem

Materials with a strong power-dependent reflectance, transmittance, or absorptance are keys for the development of all-optical applications such as optical signal processing, pulse compression, passive protective devices, and medical image processing. Different types of nonlinear optical (NLO) effects and materials have been used to realize NLO devices. With nonlinear reflectors, for example, the combination of a second harmonic generation (SHG) crystal and a dichroic mirror has been used to demonstrate intra-cavity passive mode-locking operation for picosecond-pulse generation in the visible range. In addition, Bragg-periodic structures comprising semiconductor layers with Kerr optical nonlinearity in the infrared spectral range have been reported. A common limitation of these approaches is that they require complex structures which have restrictive wave-vector matching conditions that are difficult to implement due to the need of precise optical alignment.

NLO devices have mostly been implemented in the near-infrared and infrared spectral ranges because NLO materials in the visible spectral region are scarce. The most commonly used NLO materials are semiconductors, but their prominent nonlinearities mainly locate at infrared or near infrared wavelengths. All-optical applications in visible region have been limited by the lack of materials and devices with a strong NLO response. The rapid-growth development of biomedical applications and micromachining using ultrafast optical pulses in the visible spectral range creates a strong need for developing ultrafast optical devices that can operate at visible and near-infrared wavelengths. These devices can perform all-optical control over the spatial and temporal irradiance profiles of high energy optical pulses and could potentially be attractive for a multiple applications related to the use of ultrafast optical pulses.

Ultrafast laser pulses with nanosecond, picosecond, and femtosecond temporal pulse widths are used to drill, cut, or machine products for the microelectronics, biotechnology, photonics, precision engineering and medical industries. Pulsed lasers offer fast and cost-efficient prototyping of products made from any material, like ceramics, glasses, plastics, or metals, just to mention a few. Furthermore, pulsed lasers are now also used in a wide variety of surgical procedures such as eye, dental, blood-vessel, and endoscopic surgeries (i.e. removal of deep-sealed tumors or treating scarred vocal folds). This is because high peak-power laser pulses are able to ablate materials with a high spatial precision in a fast and cost-effective way.

It is well established that the ability of a laser to ablate a material and the quality of the ablation depends upon the power and energy of the laser pulse and very importantly, on its temporal pulse width. High peak-power nanosecond lasers ablate materials by conventional heat deposition (heating of the lattice) that results in melting and vaporization of the material, and occasionally, in fracture. This process is known as thermal ablation of materials and results in a heat-affected zone surrounding the ablated spot. In contrast, high peak-power sub-nanosecond lasers with temporal pulse widths smaller than a few hundreds of picoseconds produce multi-photon ionization, joule heating, avalanche ionization, and plasma formation with a greatly reduced or non-existent heat-affected zone. For these reasons, nanosecond lasers are being replaced by sub-nanosecond pulsed lasers in surgical or manufacturing applications requiring high tolerances; this is, fine ablations with reduced or non-existent thermal side-effects.

The problem faced by non-thermally ablating materials is that high peak-power sub-nanosecond pulsed lasers are expensive to own, operate, and maintain. High capital investments and recurring costs currently limit the wide spread adoption of these technologies. Therefore, the present application will not only present the NLO devices developed from the understanding of linear and NLO properties of metal thin films, but also integrate the NLO device technologies into a novel ultrafast all-optical shutter. This ultrafast all-optical shutter allows sampling of high peak-power nanosecond laser pulses to produce high peak-power picosecond or femtosecond pulses that are well suited for non-thermal ablation of materials. Although the experimental work of the ultrafast all-optical optical shutter is still at the early proof-of-principle stage, it has a potential to replace expensive high peak-power sub-nanosecond lasers with less expensive nanosecond lasers; thereby, significantly decreasing the capital equipment and recurring cost for high-quality pulsed laser manufacturing and laser surgery.

The commercialization potential of the ultrafast all-optical shutter was investigated through a Nation Science Foundation funded program (NSF-iCORPS). An extensive study has been conducted by interviewing people in a wide variety of companies such as laser contracting service, laser integration, laser tattoo removal, laser engravers, pulsed laser deposition (PLD), and research institutes conducting ultrafast spectroscopic and imaging studies. It was found that if applied to slice ultrafast laser pulses, the ultrafast all-optical optical shutter technology will need further developments and demonstration of outstanding cutting resolutions and speeds to compete with existing advanced sub-nanosecond pulsed laser. It was also found that other possible optical applications might offer more attractive avenues for development and potential commercialization of the ultrafast all-optical shutter technology, such as short electron beam and X-ray pulse generations, ultrafast photography, and biomedical imaging.

Linear and Nonlinear Optical Properties of Au and Ag/Au Bilayer Thin Films

Ag, Au, and configurations of Ag/Au bilayer thin films have also been used to solve multiple engineering problems. For instance, high chemical stability and high sensor sensitivity have been achieved by using Ag/Au bilayer films in different surface plasmon resonance (SPR) sensor designs. Al/Ag bilayer films have also been used as transparent electrodes in top-emitting organic light-emitting diodes. Additionally, the interactions between multi-layer metal films and femtosecond laser pulses have been studied in terms of increasing the damage threshold of laser mirrors. However, little attention has been directed at understanding the linear and nonlinear optical properties of Ag/Au bilayer thin films by controlling the thickness ratio between the two metals.

The linear and nonlinear optical properties of Au and Ag/Au bilayer metallic thin films with a total thickness of around 20 nm and with different Ag/Au mass-thickness ratios are present. This study shows that the spectral dispersion of the effective refractive index of bilayer films preserves the general dispersion features found in their component materials, namely distinct interband-like and intraband-like transition regions. In addition, it is also shown that the effective refractive index can be tuned spectrally by controlling the mass-thickness ratio between gold and silver. As a consequence, it is shown that the magnitude and spectral dispersion for the NLO response of the bilayer films can also be tuned. These changes are modeled using the two-temperature model and a physical model that describes the dielectric permittivity in terms of their interband and intraband transition terms. Potential linear and nonlinear optical applications of these metallic bilayers are also discussed.

Fabrication and Characterization

Three thickness ratios of Au and Ag with a total thickness of 20 nm bilayer Ag/Au films were fabricated. Single layers of Au and Ag were fabricated as reference samples with the same total thickness. Single layer and bilayer metallic samples with the following geometry were deposited:

R1: Glass/Au (23 nm),
S1: Glass/SiO$_2$ (64 nm)/M1/SiO$_2$ (98 nm),
S2: Glass/SiO$_2$ (64 nm)/M2/SiO$_2$ (98 nm), S3: Glass/SiO$_2$ (64 nm)/M3/SiO$_2$ (98 nm),
R2: Glass/Ag (20 nm), where Au (23 nm) and Ag (20 nm) corresponds to a 23 nm and 20 nm thick Au and Ag film, respectively, and M1 corresponds to Ag (4 nm)/Au (14 nm), M2 to Ag (10 nm)/Au (10 nm), and M3 to Ag (15 nm)/Au (6 nm) bilayers. The layer thicknesses (shown inside the parentheses) were individually estimated by matching transfer matrix method simulations with measured values of the transmittance (T), reflectance (R), and absorptance (A) spectra taken by a Shimadzu UV-Vis-NIR scanning spectrophotometer. Refractive index values of deposited Au (23 nm) and Ag (20 nm) films were obtained by modeling spectroscopic ellipsometric (SE) data (J. A. Woollam M-2000UI), taken on individual films, as a perfectly flat continuous layer. The effective refractive indices ($N_{eff}=n_{eff}+ik_{eff}$) of the bilayer films were calculated from SE data imposing Kramers-Kronig consistency to the calculated values.

The nonlinear optical properties (NLO) of these films were characterized by a commercially available white-light continuum (WLC) pump-probe spectroscopy system (Helios, ultrafast system). The pump pulse obtained from an optical parametric amplifier (TOPAS-C, Spectra-Physics) was tuned to a wavelength of 560 nm. A laser beam from a Ti:Sapphire regenerative amplifier (Spitfire, Spectra-Physics) operating at 800 nm pumped the TOPAS-C, while a small portion of this beam generated the WLC (420-950 nm) probe pulse. The WLC probe pulse measured 60 m half-width-1/e (HW 1/e) at the sample position using a knife-edge scan, and the pump pulse was 285 m (HW 1/e). Because the probe size is significantly smaller than the pump, it is assumed that the probe overlaps with a region of approximately constant peak fluence from the pump. The pump has a pulse width of 60 fs (HW 1/e) and the total instrument response time is 150 fs full-width-half-maximum (FWHM). The pump beam was chopped at 500 Hz with a 50% duty cycle to obtain pumped (signal) and non-pumped (reference) probe spectra sequentially.

After averaging over one thousand probe pulses at each time delay, the change in optical density ($\Delta OD(\lambda, t)$) was recorded as a function of wavelength ($\lambda$) and delay time (t). The fluence of the probe pulses for all samples was confirmed to be low enough to produce no observable NLO response. Scattered pump light was subtracted from the data based on measurements at negative delay times. A temporal correction factor was applied to all data sets to provide equivalent zero delay onsets for all probe wavelengths; this correction factor was determined by measuring the chirp of the WLC probe passing through the glass substrate. The transmittance spectra change ($\Delta T(\lambda, t)$) and reflectance spectra change ($\Delta R(\lambda, t)$) of the WLC probe pulses were calculated from measured $\Delta OD(\lambda, t)$ as a function of delay time for a variety of pump fluences by $\Delta T(\lambda, t) = -\ln(10) T (\Delta OD(\lambda, t))$ and $\Delta R(\lambda, t) = -\ln(10) R (\Delta OD(\lambda, t))$, where T and R are the linear transmittance and reflectance spectra, respectively. This formula is derived from a Taylor series expansion and therefore is only valid for small values of $\Delta OD(\lambda, t)$.

Linear Optical Properties

FIGS. 1(a) and 1(b) show the $N_{eff}$ values of bilayers M1, M2 and M3, as well as the refractive index values of single layer Au (23 nm) and Ag (20 nm). For Au (23 nm) and Ag (20 nm), the index values are close to literature values, with the interband transition onset of bulk Au located at 520 nm and the interband transition onset of bulk Ag at 313 nm. At these wavelengths, inflection points are present in the real part of refractive index. In contrast, for M1, M2 and M3 the inflection point in $N_{eff}$ in the visible range moves away from Au (23 nm) and towards Ag (20 nm) as the thickness ratio of Au-to-Ag decreases, resulting in an apparent blue shift of the onset of interband transitions (FIG. 1(a)). In other words, by controlling the Ag/Au mass thickness ratio in these bilayers metallic films, the apparent onset of interband transitions can be spectrally tuned. This tunability, as will be described, can be attractive for a variety of linear and nonlinear photonic applications.

Two figures-of-merit or quality factors have been recently introduced by others to evaluate the potential of metals for plasmonic applications. The first quality factor ($Q_{LSP}$) relates to the proficiency of a metal, with permittivity $\in = \in' + i\in''$, to sustain localized surface plasmon (LSP) excitations. $Q_{LSP}$ is defined by the ratio—$\in'/\in''$, which can be directly related to, for instance, the resolving power of a single layer or multilayer superlens. The second quality factor ($Q_{SPP}$) relates to the proficiency of a metal to sustain surface plasmon polartions (SPPs). $Q_{SPP}$ is defined by the ratio $(\in')^2/\in''$, which is directly related to the propagation length of SPPs in plasmonic waveguides.

Figure 2:
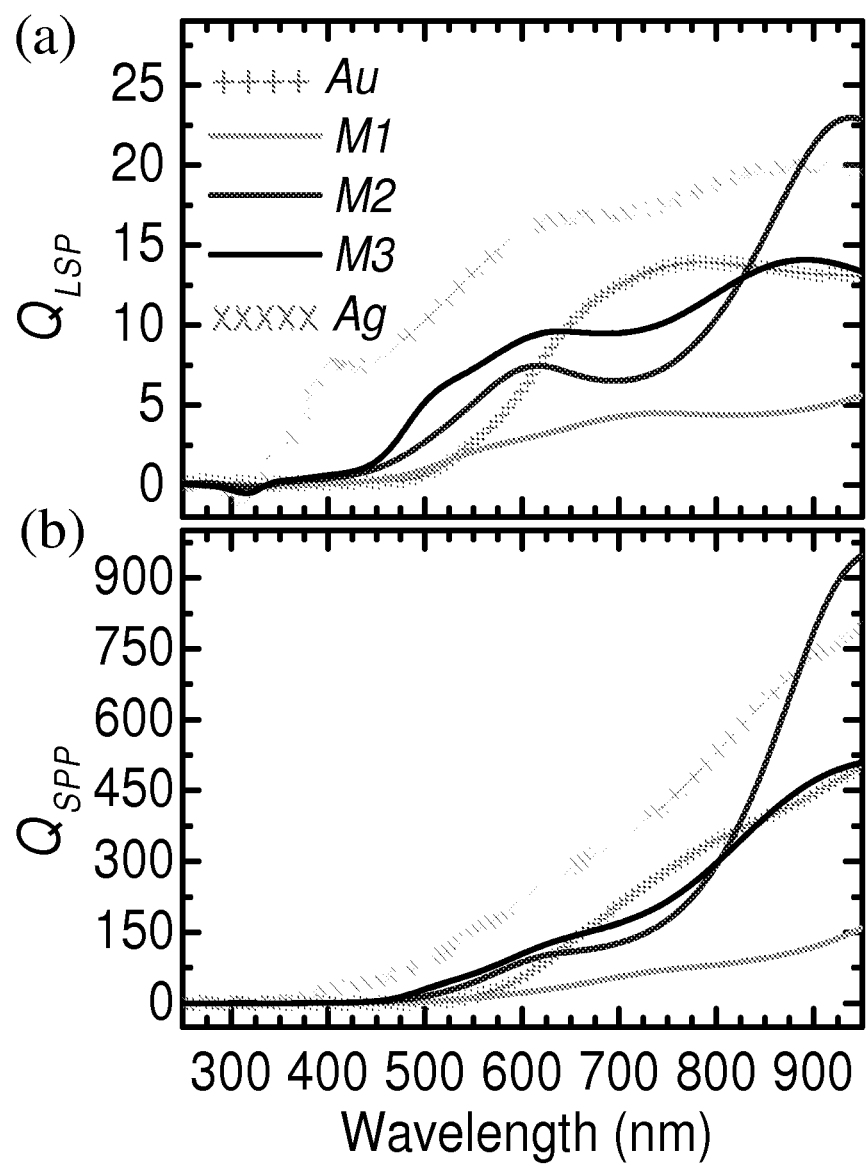
FIGS. 2: (a) Quality factor spectra for localized surface plasmon and (b) quality factor spectra for surface plasmon polariton of bilayer Ag/Au metal thin films: M1, M2 and M3; Au (23 nm) and Ag (20 nm) are shown as reference.

FIGS. 2(a) and 2(b) shows the spectral dispersion of $Q_{LSP}$ and $Q_{SPP}$ calculated for M1, M2, M3, Au (23 nm) and Ag (20 nm). The permittivity of each film was calculated from the $N_{eff} = \in^{1/2}$ values (FIGS. 1(a) and 1(b)). Note that Au (23 nm) always displays lower quality factors $Q_{LSP}$ and $Q_{SPP}$ values than Ag (20 nm). Strong absorptive losses in Ag (20 nm) due to interband transitions limit $Q_{LSP}$ and $Q_{SPP}$ values in the UV wavelength range from 250 to 350 nm. For Au (23 nm), the same mechanism also limits the values of $Q_{LSP}$ and $Q_{SPP}$ in the wavelength range from 250 to 500 nm. In this wavelength range, the apparent tuning of the onset of interband transitions achieved by decreasing the mass thickness ratio of Au-to-Ag leads to higher $Q_{LSP}$ and $Q_{SPP}$ values for all bilayer Ag/Au films compared to Au (23 nm). For instance, at wavelength 490 nm, $Q_{LSP}$ improves from a value of 0.47 for Au (23 nm), to values of 0.79 for M1, 2.3 for M2, and 4.5 for M3. In contrast, at this wavelength $Q_{LSP}=9.8$ for Ag (20 nm). Similarly, at 490 nm, $Q_{SPP}$ improves from a value of 0.89 for Au (23 nm), to values of 1.9 for M1, 11 for M2, and 23 for M3, while for Ag (20 nm) it has a value of 78, although for wavelengths above ~600 nm, the quality factors for Au (23 nm) are higher than for any of the bilayers. It is interesting to note that in the range from 825 to 950 nm, M2 shows $Q_{LSP}$ and $Q_{SPP}$ values that are again higher than Au (23 nm) and even higher than Ag (20 nm). Hence, although for linear plasmonic applications Ag (20 nm) displays higher quality factors in general, for applications that would require ultrafast all-optical plasmonic control, the bilayers will offer a very attractive combination of properties since the NLO response of any of the bilayers is significantly larger than that of Ag, as described in the next section. Finally, it should be noted that the values of $N_{eff}$ and consequently $Q_{LSP}$ and $Q_{SPP}$ are dependent on the metallic film morphology, which is dependent on the conditions for the deposition of these metallic films. Hence, the results described herein represent only general trends to be expected for a given deposition process.

For applications of Ag/Au bilayer films in linear optical filters, such as band pass filters (metal-dielectric band gap structures, induced transmission filters, etc.) or as transparent electrodes in electro-optic devices, the concept of maximum potential transmittance is useful since it provides an upper limit to the transmittance of an absorbing film, after all reflectance losses are suppressed. The maximum potential transmittance, $\Psi$, for a single metallic film has been defined as a function of the layer thickness and the refractive index.

Figure 3:
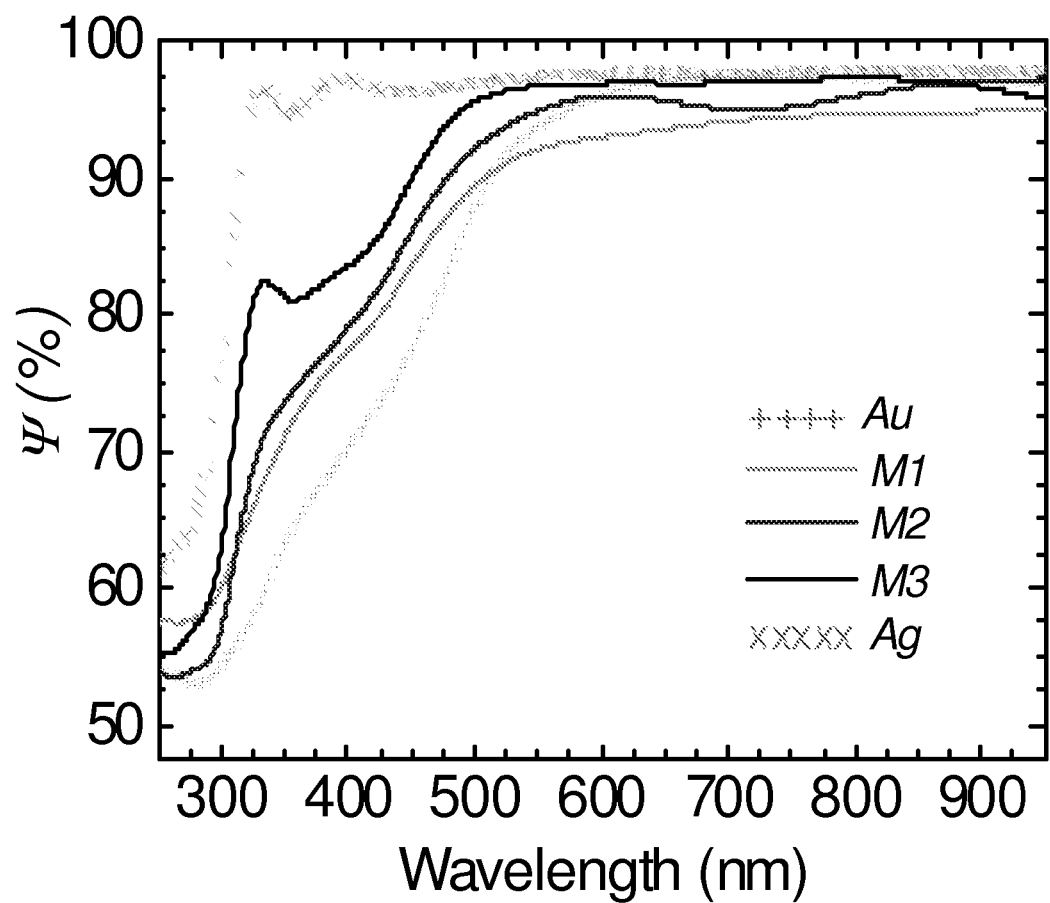
FIG. 3: Simulated maximum potential transmittance spectra of bilayer Ag/Au metal thin films: M1, M2 and M3; Au (23 nm) and Ag (20 nm) are shown as reference.

In FIG. 3, the values of the maximum potential transmittance for Ag (20 nm), Au (23 nm), and bilayer films are compared by using the $N_{eff}$ values previously derived and assuming films of equal thickness, 20 nm, to provide a fair comparison. Note that as a general statement, Au (23 nm) always displays lower values of Ψ than Ag (20 nm). For wavelengths 350-500 nm, strong absorptive losses in Au (23 nm) due to interband transitions limits the values of Ψ compared to Ag (20 nm), which has an interband transition region in the UV range. As expected from the apparent tuning of the onset of interband transitions, decreasing the ratio of Au-to-Ag leads to larger values of Ψ in all Ag/Au bilayer films compared to Au (23 nm), in the 350-500 nm wavelength range. For instance, at wavelength 400 nm, Ψ improves from 70% for Au (23 nm) to 77% for M1, 79% for M2, and 84% for M3, as the thickness ratio of Au-to-Ag decreases as shown in FIG. 3. In the 500-950 nm range, bilayer films do not display improved values of but remain still higher than 90%. Once more, although Ag offers better linear optical properties across the visible spectrum, its more reactive nature to the environment and its much smaller NLO response make it less attractive for applications where improved environmental stability and higher NLO response are required.

Nonlinear Optical Properties

Potential applications for all-optical control that use the very large magnitude of the NLO response of noble metals, Au and Cu in particular, make it interesting to explore the NLO response of these bilayer films. The largest NLO response in a thin film of a noble metal arises due to the so-called Fermi smearing process. This process is driven by the rapid heating of electrons upon the absorption of energy from an ultrafast optical pulse. The rise of electronic temperature broadens the electronic distribution around the Fermi energy, at the onset of interband transitions, causing a drastic change of the permittivity of the metal.

Pump-Probe Experiments

Figure 4:
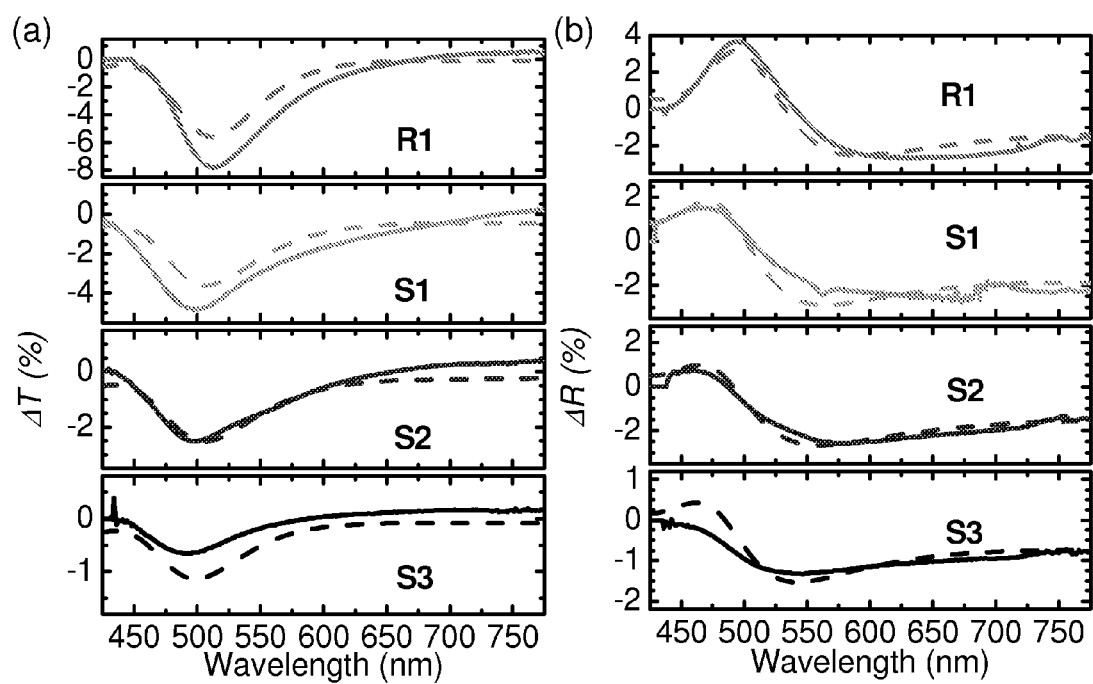
FIGS. 4: (a), (b) Spectral dependence of transmittance and reflectance changes (ΔT(λ, tpeak) and ΔR(λ, tpeak)) measured from WLC pump-probe experiment (solid line) and simulation by two-temperature model (dashed line) of samples R1, S1, S2 and S3 with a pump fluence of 25 J/m2. The excitation wavelength in all cases was 560 nm.
Figure 5:
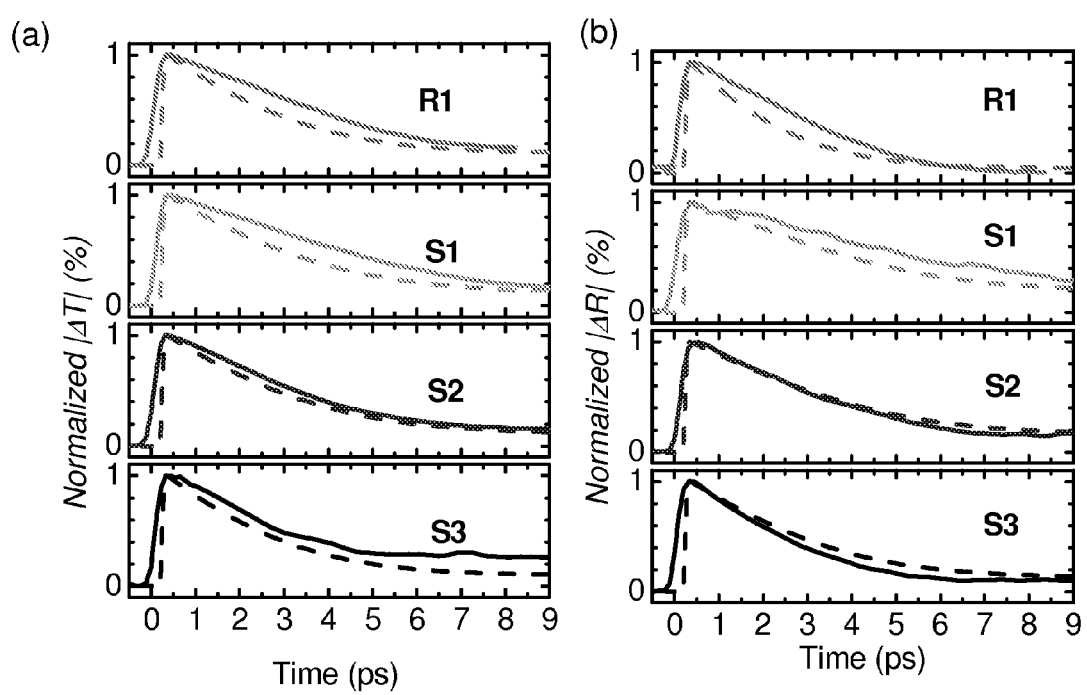
FIGS. 5: (a), (b) Temporal dependence of normalized absolute transmittance and reflectance changes (|ΔT(λpeak=520 nm, t)| and |ΔR(λpeak=520 nm, t)|) measured from WLC pump-probe experiment (solid line) and simulation by two-temperature model (dashed line) of samples R1, S1, S2 and S3 with a pump fluence of 25 J/m2. The excitation (pump pulse) wavelength in all cases was 560 nm and the probe wavelength was 520 nm.

FIGS. 4(a) and 4(b) show the values of $\Delta T(\lambda, t_{peak})$ and $\Delta R(\lambda, t_{peak})$ measured in WLC pump-probe experiments in samples R1, S1, S2, and S3 for a pump fluence of 25 J/m². FIGS. 5(a) and 5(b) shows the temporal evolution of $|\Delta T(\lambda_{peak}=520 \text{ nm}, t)|$ and $|\Delta R(\lambda_{peak}=520 \text{ nm}, t)|$ measured on the same samples. Here, the subscript peak denotes the maximum value of the NLO response in the spectral and temporal ranges studied. For a single Ag layer, the maximum $|\Delta T(\lambda, t_{peak})|$ and $|\Delta R(\lambda, t_{peak})|$ are at least an order of magnitude smaller (<0.5% for a pump fluence of 50 J/m²) than those found in bilayer or single Au layer films, so their values are not included in FIGS. 4-5. For bilayer films, S1, S2, and S3, the $\Delta T(\lambda, t_{peak})$ and $\Delta R(\lambda, t_{peak})$ spectra display similar dispersion characteristics found in a single Au layer (R1). Under the same incidence pump fluence, the peak-to-valley magnitude of $\Delta T(\lambda, t_{peak})$ and $\Delta R(\lambda, t_{peak})$ gradually reduces as the mass thickness ratio of Au-to-Ag decreases from R1, S1, S2 to S3 (FIGS. 4(a) and 4(b)).

Interestingly, there is a consistent blue-shift of the wavelength at which maximum values of $\Delta T(\lambda_{peak}, t_{peak})$ and $\Delta R(\lambda_{peak}, t_{peak})$ are observed by decreasing the mass thickness ratio of Au-to-Ag, the $|\Delta T(\lambda_{peak}, t_{peak})|$, where peak wavelength and magnitude change from $|\Delta T(513 \text{ nm}, t_{peak})|=7.8\%$ for R1 to $|\Delta T(498 \text{ nm}, t_{peak})|=4.8\%$ for S1, $|\Delta T(496 \text{ nm}, t_{peak})|=2.5\%$ for S2, and $|\Delta T(490 \text{ nm}, t_{peak})|=0.7\%$ for S3. A similar trend is found for ΔR as shown in FIG. 4(b). The trend of these shifts is consistent with the shifts in the onset of interband transitions shown in FIG. 1(a). This correspondence shows that both linear and NLO properties can be tuned by controlling the mass-thickness ratio between Ag and Au in bilayer films, albeit the magnitude of the NLO changes appears to be reduced as the Ag content increases. This apparent reduction, as will be later described, arises primarily from differences in the absorbed power within the Au layer.

Two-Temperature Model and Temperature-Dependent Physical Models of NLO Properties In order to gain a better understanding of the NLO properties of these bi-metal layers, the two-temperature model was introduced (Eq. 1) as follows to describe the heating of electrons and the lattice when optically pumped.

$$C_e(T_e)\frac{dT_e}{dt} = -G(T_e - T_l) + P(t) \qquad (1)$$

$$C_l\frac{dT_l}{dt} = G(T_e - T_l)$$

The changes in electron and lattice temperatures, $T_e$ and $T_l$, respectively, calculated through the two temperature model depend upon intrinsic material properties such as the electron and lattice specific heats, $C_e$ and $C_l$, respectively, and the electron phonon coupling constant, G, and are driven by the density of absorbed power within each individual layer, P(t).

In a simulation, $C_e(T_e)=(62\pm5)\times T_e$ [J/m³K], $C_l=(3.2\pm0.4)\times T_e$ [J/m³K], $G=(1.8\pm0.1)\times 10^{16}$ [W/m³K], and the density of absorbed power is estimated as $P(t)=I(t)A/d$ [W/m³], where I(t) is the pump irradiance, here assumed to have a Gaussian temporal profile with a pulse width of 60 fs (HW 1/e), A is the linear absorptance in the metal layer calculated using the transfer matrix method, and d is the thickness of the metal layer. These values were obtained by fitting $\Delta T(\lambda_{peak}, t)$ and $\Delta R(\lambda_{peak}, t)$, measured for an incident pump fluence of 8 J/m², with the physical model described in following paragraphs and show magnitudes that are comparable to literature values. Here, note that the linear approximation of $C_e(T_e)$ and the temperature independent value of G are valid only in the low-fluence regime; this is, for electron temperatures smaller than around 3000 K for Au. At the highest pump fluence of 25 J/m² used in this work, the maximum electron temperature in all samples is calculated to be in 1300-1500 K.

The electron and lattice temperatures derived from the two-temperature model are used in a temperature-dependent physical model of the permittivity to calculate the complex refractive index changes $\Delta n_{sim}(\lambda, t)$ and $\Delta k_{sim}(\lambda, t)$.

For simplicity, the model implemented here to describe the NLO response of bilayers only accounts for the contribution of the Au component. This is motivated by the fact that only very minor adjustments were found when the contribution of Ag was included in the calculations. The permittivity of Au, was modeled as a set of explicit equations (Eqs. 1~4), as functions of frequency, temperature, and time, via a Drude-like intraband transition term ($\epsilon_{intra}$) and the superposition of an interband transition term ($\epsilon_{inter}$) following Bigot, et al., as follows $$\epsilon(\omega,T_l(t),T_e(t)) = \epsilon_{intra}(\omega,T_l(t),T_e(t)) + \epsilon_{inter}(\omega,T_e(t)) \qquad (2)$$

Hereafter, ω is the free space optical frequency, t is the time, and $T_l(t)$ and $T_e(t)$ are temporal dependent lattice and electron temperatures, respectively.

For the first term in Eq. 2, $$\varepsilon_{intra}(\omega, T_l(t), T_e(t)) = 1 + \varepsilon_b - \frac{\omega_p^2}{\omega^2 + i\gamma\omega} \qquad (3)$$

with parameters, $$\gamma[T_l(t),T_e(t)] = \gamma_0 + \gamma_1 \times T_l(t) + \gamma_2 \times T_e^2(t) + \gamma_3 \times \omega^2$$

where, $\epsilon_b$ is the background dielectric constant, $\gamma$ is the damping constant, $\omega_p$ is the bulk plasma frequency, and $\gamma_0$, $\gamma_1$, $\gamma_2$, and $\gamma_3$ are constant coefficients.

For the second term in Eq. 2, $$\varepsilon_{inter}(\omega, T_e(t)) = \sum_{j=1}^{M} \kappa_{(j)} \int_0^\infty dx \frac{\sqrt{x - E_{g(j)}}}{x^2} [1 - F_{(j)}(x, T_e(t))] \quad (4)$$

$$\frac{\hbar^2\omega^2 - x^2 - \gamma_{ee(j)}^2 - 2i\hbar\omega\gamma_{ee(j)}}{\left(\hbar^2\omega^2 - x^2 - \gamma_{ee(j)}^2\right)^2 + 4\hbar^2\omega^2\gamma_{ee(j)}^2}$$

with parameters, $$F_{(j)}(x, T_e(t)) = \left(1 + \exp\left(\frac{x - E_{f(j)}}{k_B T_e(t)}\right)\right)^{-1},$$

$$E_{f(j)} = E_{fd(j)}\left(1 - \frac{\pi^2}{12}\left(\frac{k_B T_e(t)}{E_{fd(j)}}\right)^2\right),$$

and $\gamma_{ee(j)}[T_e(t)] = \hbar(\gamma_{a(j)}T_e^2(t) + \gamma_{b(j)}\omega^2)$ where the summation is composed of M interband terms and each contribution term is denoted by the subscript j, x is the electron energy, $\kappa$ is a constant related to effective electron mass, $E_g$ is the minimum transition energy from a valence band to an ideal parabolic conduction band, $\gamma_{ee}$ is the inverse scattering time, $F(x,T_e(t))$ is the electron occupation number, $E_f$ is the electron distribution function, $E_{fd}$ is the transition energy from the d-band to the Fermi level, $k_B$ is the Boltzman constant, $\hbar$ is the plank constant, and $\gamma_a$ and $\gamma_b$ are constant coefficients.

Figure 6:
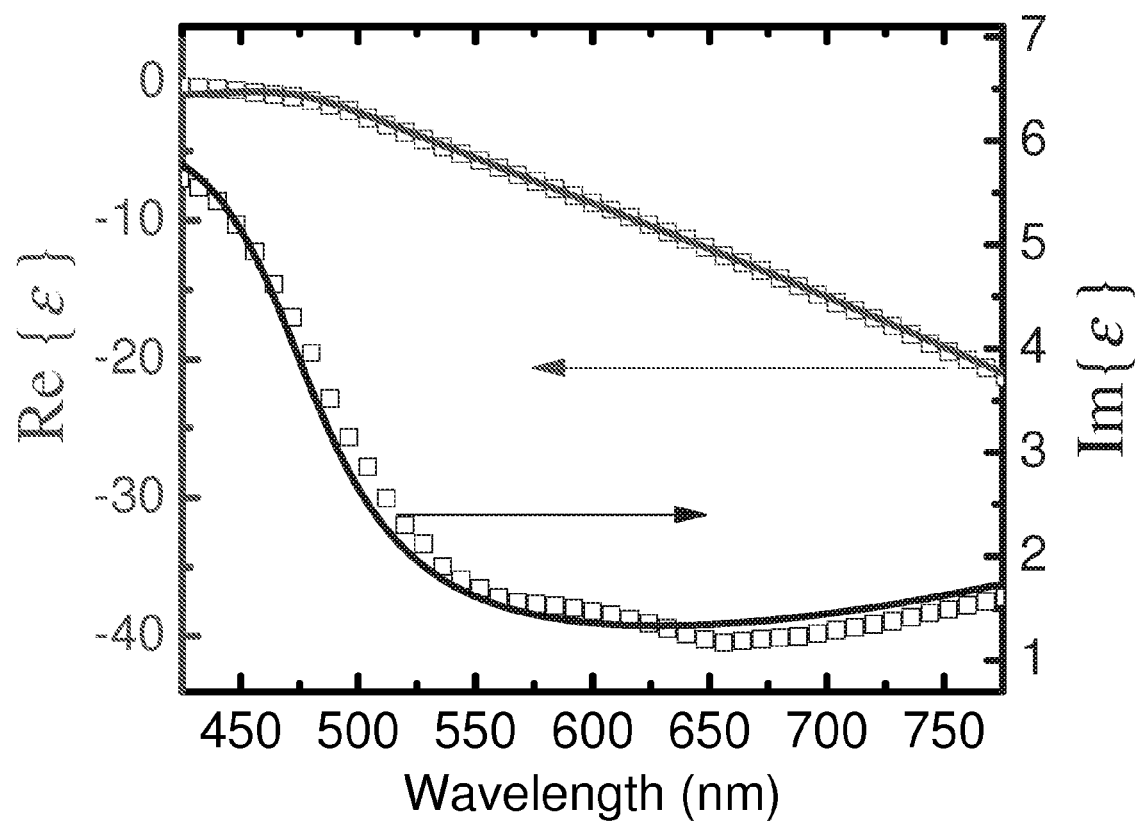
FIG. 6: Comparison of measured (symbols) and simulated (solid lines) complex permittivity spectra in visible range for the fabricated sample R1. The permittivity of Au was modeled as a set of explicit equations (Eqs. 2~4) and compared with measured ellipsometric data.

The value of the constant coefficients used in the Au permittivity model is listed in Table 1 and Table 2. These values were obtained by fitting the measured steady-state permittivity at room temperature, $T_l(t)=T_e(t)=300$ K, with Eqs. 2~4. FIG. 6 shows the comparison between simulated Au permittivity and that obtained by spectroscopic ellipsometry.

TABLE 1

Constant coefficients of an Au permittivity model for intraband transition term (Eq. 3).

| $\epsilon_{intra}$ | $\epsilon_b$ | $\gamma_0(s^{-1})$ | $\gamma_1(s^{-1}k^{-1})$ | $\gamma_2(s^{-1}k^{-2})$ | $\gamma_3(s^{-3})$ | $\omega_p(s^{-1})$ |
|---|---|---|---|---|---|---|
| | 3.5 | $1.2 \times 10^{14}$ | $1 \times 10^{10}$ | $2.5 \times 10^7$ | $2.1 \times 10^{-18}$ | $1.3 \times 10^{16}$ |

TABLE 2

Constant coefficients of an Au permittivity model of the first and second interband transition term (Eq. 4), respectively.

| $\epsilon_{inter}^{(1)}$ | $\kappa_{(1)}$ | $E_{fd(1)}$ (eV) | $E_{f(1)}$ (eV) | $\gamma_{a(1)}$ (s$^{-1}$k$^{-2}$) | $\gamma_{b(1)}$ (s$^{-3}$) |
|---|---|---|---|---|---|
| | 100 | 2.59 | 1.44 | $1.2 \times 10^{-4}$ | $1.6 \times 10^{-16}$ |
| $\epsilon_{inter}^{(2)}$ | $\kappa_{(2)}$ | $E_{fd(2)}$ (eV) | $E_{f(2)}$ (eV) | $\gamma_{a(2)}$ (s$^{-1}$k$^{-2}$) | $\gamma_{b(2)}$ (s$^{-3}$) |
| | 20 | 3.1 | 0.5 | $5.4 \times 10^{-4}$ | $7 \times 10^{-17}$ |

Simulated $\Delta T_{sim}(\lambda, t)$ and $\Delta R_{sim}(\lambda, t)$ are obtained by replacing $N_{Au}$ with $N_{Au}(\lambda, t) = N_{Au} + \Delta N_{sim}(\lambda, t)$ (where $\Delta N_{sim}(\lambda, t) = \Delta n_{sim}(\lambda, t) + i\Delta k_{sim}(\lambda, t)$). Using this approach and without any further adjustment of the parameters in the model, $\Delta T_{sim}(\lambda, t)$ and $\Delta R_{sim}(\lambda, t)$ closely match with the experimental values. This comparison is shown in FIGS. 5(a) and 5(b), where a similar ultrafast temporal evolution is found for all samples. Although better fits could be obtained if small modifications to the value of the electron-phonon coupling rates are introduced to account for its temperature dependence and differences in sample morphology, the model here disclosed is sufficient to describe the basic features of the NLO response measured in the bilayers.

In the present model, $\Delta N_{sim}(\lambda, t)$ is only ascribed to the Au layer. However, for potential applications in all-optical control devices it is useful to derive $\Delta N_{eff} = \Delta n_{eff} + i\Delta k_{eff}$ values which could be ascribed to the entire bilayer. Using a first order approximation, a Taylor expansion of $\Delta T$ and $\Delta R$ as functions of $\Delta N_{eff}$ yields the following system of linear equations $$\Delta T = \frac{\partial T}{\partial n_{eff}}\Delta n_{eff} + \frac{\partial T}{\partial k_{eff}}\Delta k_{eff} \quad (5)$$

$$\Delta R = \frac{\partial R}{\partial n_{eff}}\Delta n_{eff} + \frac{\partial R}{\partial k_{eff}}\Delta k_{eff}$$

In solving this system, $\Delta N_{eff}$ is extracted from the experimental data. The partial derivatives, $\partial T/\partial n$, $\partial T/\partial k$, $\partial R/\partial n$ and $\partial R/\partial k$ were approximated by their differentials ($\Delta T/\Delta n_{eff}$, $\Delta T/\Delta k_{eff}$, and etc.) by introducing a small perturbation to $N_{eff}$ in the entire bilayer.

Figure 7:
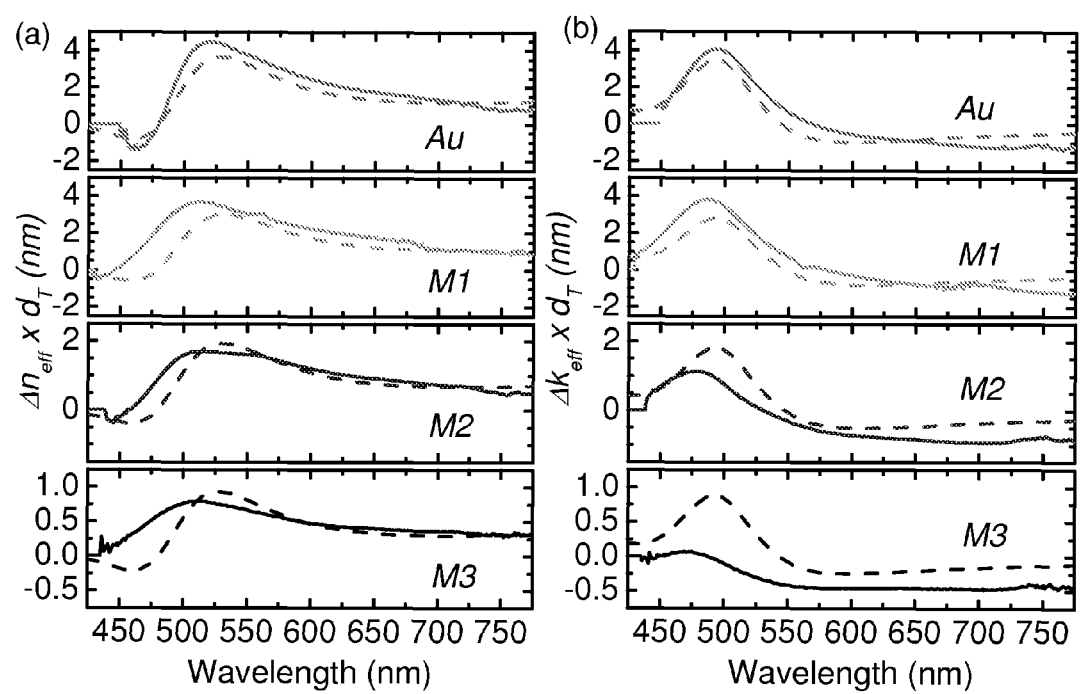
FIGS. 7: Spectral dependence of the (a) real and (b) imaginary optical path length change (ΔOPL) pumped at 560 nm with a fluence of 25 J/m2 for Au (23 nm), M1, M2, and M3. Solid line is the extracted ΔOPL=ΔNeffdT and the dashed line is the simulated ΔOPL=ΔNsimdAu probed at the peak transmittance delay time.
Figure 8:
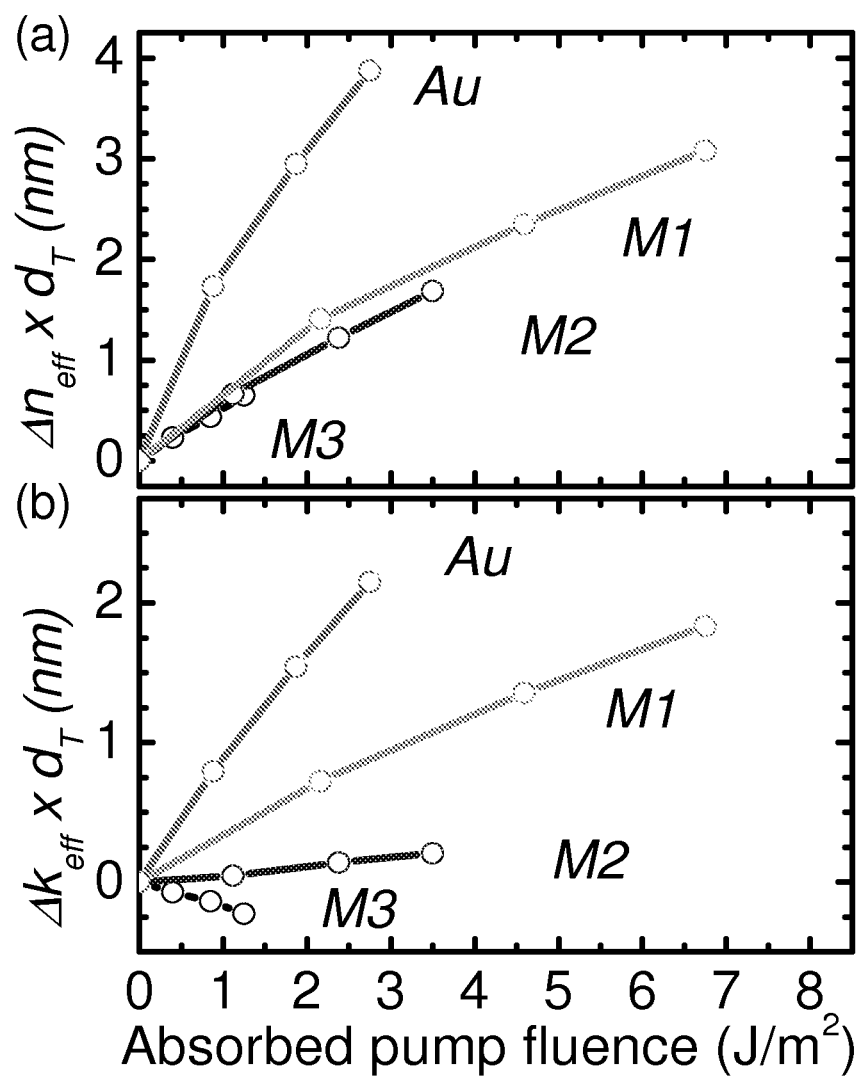
FIGS. 8: Absorbed pump fluence dependence of (a) real and (b) imaginary optical path length change (ΔOPL=ΔNeffdT), where ΔOPL(λ=520 nm) is extracted at the peak transmittance change delay time and pumped at 560 nm for Au (23 nm), M1, M2 and M3.

Here it is worth pointing out that while it is tempting to establish a direct comparison between $\Delta N_{eff}$ and $\Delta N_{sim}$, this is not straight forward. Because in calculating $\Delta N_{eff}$ and $\Delta N_{sim}$, the change of refractive index is assumed to occur in layers with different thicknesses, $\Delta N_{sim}$ is related only to the thickness of the Au layer ($d_{Au}$) in the bilayer structure, while $\Delta N_{eff}$ is ascribed to the total bilayer thickness ($d_T$). With these limitations in mind, a comparison can still be made if the change in optical path length ($\Delta OPL=\Delta N_{eff}d_T$ or $\Delta OPL=\Delta N_{sim}d_{Au}$) is used. FIG. 7 shows this comparison. In general, good order-of-magnitude estimations of $\Delta OPL$ and qualitatively good spectral agreement are obtained using both models. Spectral differences are ascribed to differences in the linear models used. Finally, due to the thermal nature of the NLO response observed in these bilayer films, $\Delta N_{eff}$ (520 nm)$d_T$ does not follow a linear dependence on the absorbed pump fluence as shown in FIG. 8. This trend is consistent with the nonlinear dependence of the electron temperature on the absorbed pump fluence. Furthermore, even at the same absorbed power, the NLO response of a single Au (23 nm) layer is larger than any of the bilayers M1, M2, and M3.

Conclusion

The optical properties of Ag/Au bilayer metallic thin films with a total thickness of approximately 20 nm and with different Ag/Au mass-thickness ratios were studied. The effective refractive index values were found to be spectrally tunable by controlling the mass-thickness ratio between Au and Ag. Hence, the optical loss introduced by interband transitions in Au layers can be reduced. As a consequence, improvement of the quality factors ($Q_{LSP}$ and $Q_{SPP}$) derived for plasmonic applications and the potential transmittance ($\Psi$) for optical filter applications are calculated within the visible range. These spectral shifts also lead to similar spectral shifts on the NLO response of the bilayers. The NLO response is shown to be ultrafast and comparable in origin and magnitude to that observed in single Au films. The NLO response in the bilayer films is dominated by the ultrafast dynamics of the thermal exchange between the absorbed optical field and the electron cloud and the lattice in the Au layer. The combined properties of these bilayers could therefore be attractive for a variety of linear and nonlinear photonic applications.

Noble Metal Nonlinear Optical Devices with Adjustable Spectral and Angular Bandwidths for all-Optical Controls at Visible Wavelengths Broadband NLO Device
Fabrication and Characterization All thin films were deposited on VWR Micro Slides glass substrates with a Kurt. J Lesker Axxis electron beam deposition system. Substrates were cleaned ultrasonically in deionized water, acetone and isopropanol for 15 min each. The films were deposited under vacuum at a pressure of $8.6 \times 10^{-7}$ Torr ($1.1 \times 10^{-4}$ Pa) with a rotating sample holder that actively cools the substrates to room temperature. The Ag, Au, and $SiO_2$ were deposited at a rate of 0.2 nm/s, 0.05 nm/s, and 0.2 nm/s, respectively, monitored by crystal sensors.

Figure 9:
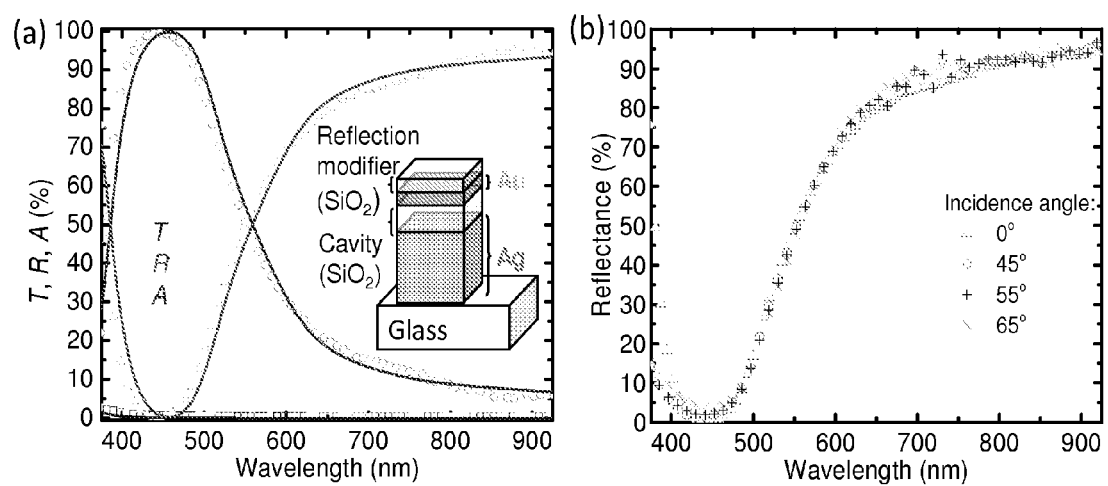
FIGS. 9: (a) Comparison of measured (symbols) and simulated (lines) transmittance (T), reflectance (R), and absorptance (A) spectra in the visible range of the fabricated Broadband NLO Device sample. The inset shows the generalized thin film structure of the NLO device. (b) Measured reflectance spectra at varied incidence angles.

The inset of FIG. 9(a) shows a generalized thin film structure of the broadband NLO device. It was fabricated by deposition of the Ag layer onto a glass substrate followed by the deposition of the Au layer sandwiched and protected by $SiO_2$ thin films with the following geometry:

broadband NLO device: Glass/Ag(100 nm)/$SiO_2$(81 nm)/Au(23 nm)/$SiO_2$(81 nm).

The layer thicknesses (shown inside the parentheses) were set to optimize the linear spectral and angular bandwidths while maintaining a maximum nonlinear reflectance change. FIG. 9(a) shows the comparison between measured values of the transmittance (T), reflectance (R), and absorptance (A) spectra taken by a Shimadzu UV-Vis-NIR scanning spectrophotometer and the simulated spectra by transfer matrix method. The good match simultaneously verifies both the fabrication process and the simulation of the transfer-matrix method. Spectroscopic ellipsometric (SE) data (J. A. Woollam M-2000UI) were taken on individual films to determine the optical properties of each layer. The refractive indices (N=n+ik) of all films were calculated from SE data imposing Kramers-Kronig consistency to the calculated values. The angular dependence of linear reflectance was measured using the SE apparatus. In addition, the spectroscopic ellipsometry also measures the reflectance spectra at varied angles shown in FIG. 9(b) to determine the angular bandwidth of the sample.

The nonlinear optical properties (NLO) of the broadband NLO device were characterized by a commercially available white-light continuum (WLC) pump-probe spectroscopy system (Helios, ultrafast system). The pump pulse was tuned to a wavelength of 550 nm with a pulse width of 60 fs half-width-1/e (HW 1/e) and a spot size of 347 μm (HW 1/e) at the sample position, measured using a knife-edge scan. The WLC (420-950 nm) probe pulse had a spot size of 80 μm (HW 1/e) at the sample position and a low enough fluence to produce no observable NLO response in the sample. The total instrument response time is 150 fs full-width-half-maximum (FWHM). Because the probe spot size is smaller, it is assumed that the probe overlaps with a region of approximately constant peak fluence from the pump. After averaging over one thousand probe pulses at each time delay, the change in optical density ($\Delta OD(\lambda, t)$) was recorded as a function of wavelength ($\lambda$) and delay time (t). The reflectance change spectra ($\Delta R(\lambda, t)$) of the WLC probe pulses were calculated from measured $\Delta OD(\lambda, t)$ for a variety of pump fluences by $\Delta R(\lambda, t) = R_0(\lambda) \cdot (10^{\Delta OD(\lambda, t)} - 1)$, where $R_0(\lambda)$ is the measured linear reflectance spectrum.

Linear Optical Properties

The structure of the broadband NLO device shown in the inset of FIG. 9(a) can be seen as a Fabry-Perot filter comprising a central dielectric layer (cavity) sandwiched by two reflectors; the first one is the thick Ag layer and the second one is the thin Au layer covered by a dielectric layer (reflection modifier) on top. This structure can provide a wide variation of absorptance values by varying the thickness distribution of its two dielectric layers.

Figure 10:
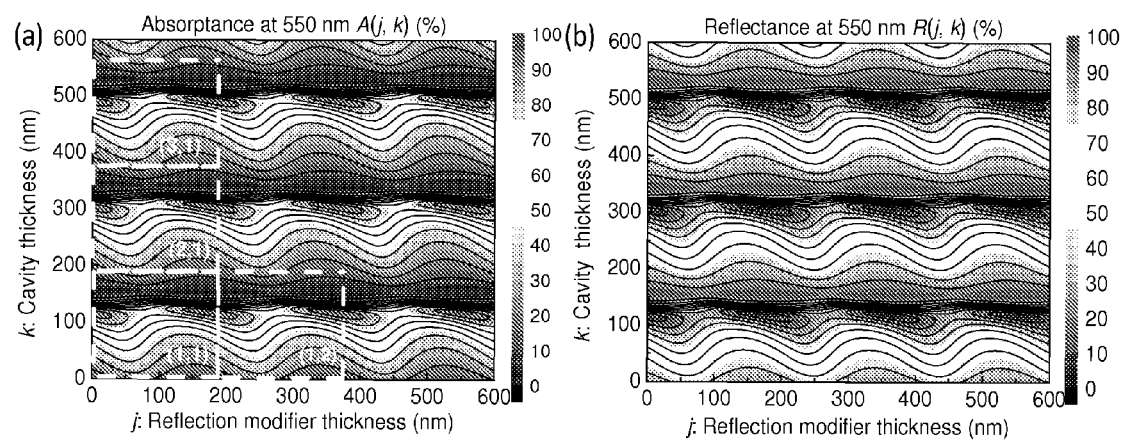
FIG. 10: Simulated (a) absorptance A(j, k) and (b) reflectance R(j, k) at 550 nm of the general NLO device structure (shown in the inset of FIG. 9) with different thickness combinations of reflection modifier (j) and cavity (k) layers.

FIG. 10(a) shows a contour plot of absorptance A(j, k) values as a function of the thickness j of the top dielectric layer which is called the reflection modifier, and the thickness k of the dielectric layer sandwiched between the two metal layers and which is referred to as the cavity thickness. The absorptance A(j, k) was simulated using the transfer-matrix method at a wavelength of 550 nm. The structure can provide a wide variation of absorptance values, ranging from 2% to 96%. These variations are periodic with respect to the thicknesses of the reflection modifier and cavity layers, as can be seen from regions [(1,1), (2,1), (3,1), (1,2)] in FIG. 10(a). Not surprisingly, in both directions these regions have a length of 188 nm corresponding to the half-wave optical thickness of $SiO_2$ at 550 nm. As also indicated in FIGS. 10(a) and 10(b), the simulated reflectance is complementary to the absorptance at 550 nm (as expected from the negligible transmittance at this wavelength) and therefore shares the same periodicity.

The dominant contribution to the total absorptance of the broadband NLO device (55%) is primarily attributed to the Au thin film (53%), with negligible absorption in its component Ag layer (2%). This is in part because of the electric field distribution imposed by the NLO device geometry, and in part because Au is highly absorptive at wavelengths close to the interband transition onset, in the middle of the visible spectral range. On the other hand, the interband transition onset of Ag located in the ultraviolet (UV) spectral range causes light with photon energy far below the onset to be mostly reflected. The $SiO_2$ films are lossless based on SE data.

To illustrate the present approach, the broadband NLO device was designed to have a linear absorptance of 55% and a linear reflectance of 45% at 550 nm. This choice was arbitrary, but it is limited by a trade-off between the linear reflectance and the strength of the NLO response of a NLO device. Although both properties are preferred in general all-optical control applications, a compromise was made here to pick up the broadband NLO device. The trade-off is because that a higher linear absorptance (A) drives the stronger nonlinearity of the broadband NLO device, on the other hand, it also decreases the linear reflectance (R), which is expected because R and A spectra are complementary in the whole visible spectral range as shown in FIG. 9(a). The measured R spectrum also shows that the fabricated broadband NLO device sample is a long wavelength pass optical filter with a broad spectral bandwidth. In addition, the measured R spectrum as a function of angle of incidence in FIG. 9(b) is shown to be angularly insensitive. Within incidence angles up to 65°, the R spectrum barely changes compared to the normal incidence. The linear optical response of the broadband NLO device shows both broad spectral and angular bandwidth.

Nonlinear Optical Properties

In the broadband NLO device structure, as the linear absorption in the Au thin film is increased, the thermal nonlinearity of this layer is enhanced and consequently the NLO response of the NLO device. To illustrate this, simulations of the refractive index change have been carried out on Au using the two-temperature model and a physical model describing the dielectric permittivity outlined above. In short, the linear absorptance in the Au film is calculated using the transfer-matrix method. The absorbed power is introduced as the source term in the two-temperature model. This model describes the temporal evolution of electron and lattice temperatures as a function of the absorbed power and thermal properties of the electrons and lattice in the metal. The electron temperature derived through this model is used to calculate a temperature-dependent dielectric permittivity function that contains two terms: a first one describing interband transitions using the approximation that electronic transitions occur from a flat d-band to a parabolic conduction band; and a second one describing contributions from intraband transitions using a Drude function. The refractive index of the metal, before and after optical excitation is taken as the root-square of the calculated dielectric permittivity.

Figure 11:
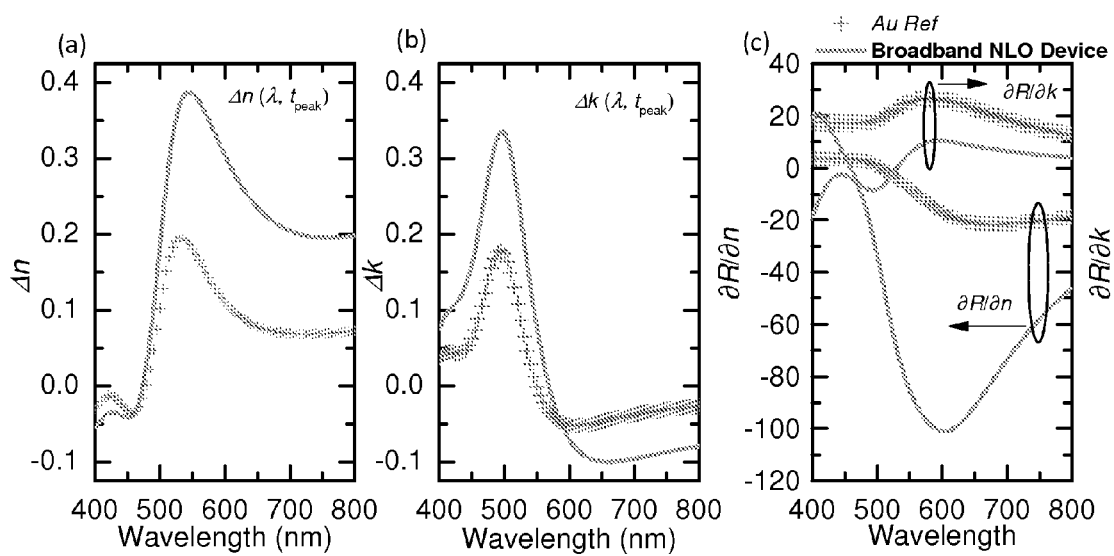
FIG. 11: Spectral comparison of simulated (a) real and (b) imaginary refractive index changes between the 23 nm-thick Au film inside the Broadband NLO Device (light lines) and a 23 nm-thick Au film on a glass substrate (Au Ref) (dark symbols). Simulations were shown for an incident peak irradiance of 13 GW/cm2 at 550 nm. (c) Spectral comparison of simulated ∂R/∂n and ∂R/∂k for the same Au containing structures.

FIGS. 11(a) and 11(b) show the simulated refractive index changes ($\Delta N_{Au}(\lambda, t_{peak}) = \Delta n(\lambda, t_{peak}) + i\Delta k(\lambda, t_{peak})$) in the visible spectra for a 23 nm-thick Au film on a glass substrate (Au Ref) and the broadband NLO device with the same thickness of the Au layer, assuming a pump pulse fluence of 16 J/m$^2$ (peak irradiance 13 GW/cm$^2$) at 550 nm. Here, $t_{peak}$ denotes the delay time of the probe pulse that yields maximum NLO response in the temporal ranges studied. Note that the peak wavelength of $\Delta n(\lambda, t_{peak})$ and $\Delta k(\lambda, t_{peak})$ are always located around the interband transition onset of Au at 520 nm. For the broadband NLO device, the peak-to-valley magnitude of $\Delta n$ and $\Delta k$ doubles. This is achieved by increasing the linear absorptance at 550 nm in the Au thin film from 19% for Au Ref to 53% in the broadband NLO device.

The correspondent reflectance changes as a function of wavelength ($\lambda$) and delay time (t) can also be calculated by the following Eq. 6.

$$\Delta R(\lambda, t) = R(N_{Au}(\lambda) + \Delta N_{Au}(\lambda, t)) - R_0(\lambda) \quad (6)$$

where $R(N_{Au}(\lambda) + \Delta N_{Au}(\lambda, t))$ and $R_0(\lambda)$ are the simulated reflectance after and before a pump pulse excitation, $N_{Au}(\lambda) + \Delta N_{Au}(\lambda, t)$ is the refractive index values of 23 nm Au after optically pumping, $N_{Au}(\lambda)$ is the linear refractive index, and $\Delta N_{Au}(\lambda, t)$ is the simulated nonlinear refractive index change ($\Delta N_{Au}(\lambda, t) = \Delta n(\lambda, t) + i\Delta k(\lambda, t)$). Since the thermal nonlinearity of Ag is order of magnitudes smaller compared to Au, for the broadband NLO device, $\Delta R(\lambda, t)$ is assumed arising only from $\Delta N_{Au}(\lambda, t)$ of the Au component.

Although the reflectance changes $\Delta R(\lambda, t)$ can be calculated exactly and have been used in the optimization process while designing the broadband NLO device, developing a simplified analysis is attractive to illustrate the enhancement mechanism of $\Delta R$. For example, the measured $\Delta R(550 \text{ nm}, t_{peak})$ increases from $-1\%$ for Au Ref to $-16\%$ for the broadband NLO device excited by a peak pump irradiance 13 GW/cm$^2$ at 550 nm. Hence, the first order approximation to the Taylor expansion of $\Delta R$ is taken as functions of $\Delta N_A$ and yields the following equation.

$$\Delta R = \frac{\partial R}{\partial b}\Delta n + \frac{\partial R}{\partial k}\Delta k \approx \frac{\partial R}{\partial n}\Delta n \quad (7)$$

The partial derivatives, $\partial R/\partial n$ and $\partial R/\partial k$, were approximated by their differentials ($\Delta R(N_{Au} + \Delta n)/\Delta n$ and $\Delta R(N_{Au} + \Delta k)/\Delta k$), introducing a small perturbation to $N_{Au}$ in the linear model used to calculate R. Eq. 7 is only valid for small values of $\Delta N_{Au}$. The simplification of Eq. 7 into a one term equation comes about since at the wavelength 550 nm, FIG. 11(b) shows that $\Delta k(550 \text{ nm}, t_{peak})$ values for the broadband NLO device and Au Ref are both close to zero, and from 515 nm to 800 nm the calculated $\partial R/\partial n$ for the broadband NLO device is always at least ten times larger than $\partial R/\partial k$, as shown in FIG. 11(c). Hence, $\Delta R$ can be decomposed into two components: $\Delta n$ and $\partial R/\partial n$. The first term, $\Delta n$, is an intrinsic property of the nonlinear material, although is dependent on the absorbed optical power as has been shown in FIGS. 11(a) and 11(b).

In FIG. 11(c), the broadband NLO device generally displays higher $\partial R/\partial n$ values than the Au Ref in the visible spectral range. For instance, at 550 nm, $\partial R/\partial n$ improves from a value of $-8$ for the Au Ref to a value of $-85$ for the broadband NLO device. Note that the broadband NLO device not only doubles the $\Delta n$ of the Au film due to an increased linear absorptance from 19% for Au Ref to 53% in the broadband NLO device, but also introduces a better structural design which improves the sensitivity of R to small changes on the real part of the refractive index of Au. In contrast, the device structure reduces the sensitivity of R to changes in the imaginary part of the refractive index of Au; as revealed by the smaller values of $\partial R/\partial k$ found for the device structure than for Au Ref. As calculated by Eq. 7, $\Delta R$ is expected to improve by around 20 times compared to Au Ref. This evaluation was verified by the measured $\Delta R(550 \text{ nm}, t_{peak})$, which increases 16 times from Au Ref to the broadband NLO device.

It is interesting to note that, spectrally, the maximum magnitude of $\partial R/\partial n$ is not at 550 nm, where it reaches a magnitude of $-85$, but instead at 600 nm, where it reaches a magnitude of $-101$. This is even though the broadband NLO device was designed for degenerate pump-probe operation, which means that $\Delta R(550 \text{ nm})$ was maximized for this geometry. Note that if the broadband NLO device is excited and probed at 600 nm, a smaller magnitude of $\Delta R$ is expected than the value when excited at 550 nm. This is because the linear absorption at 600 nm is only 31%; much smaller than the 55% obtained at 550 nm. Hence, differences in $\Delta n$ between excitation at 550 nm and at 600 nm, $\Delta n(550 \text{ nm}) >> \Delta n(600 \text{ nm})$, are expected to be more significant than the difference in $\partial R/\partial n$ found at these wavelengths.

In addition, note that most $\partial R/\partial n$ values in FIG. 11(c) of broadband NLO device are negative with positive $\Delta n$ values in FIG. 11(b) across the visible spectral range. The total product of $\Delta R$ values calculated by Eq. 7 shows that the general characteristic of $\Delta R$ is negative. After the broadband NLO device is pumped optically, positive $\Delta n$ values will cause a redistribution of the electric field throughout the structure. These changes in the electric field distribution lead to a larger field within the Au layer, resulting in an increase of absorptance. Since reflectance and absorptance of the broadband NLO device are complementary, an increase in absorptance ($\Delta A$) will lead to a decrease in reflectance ($\Delta R$).

Optimization and Design Process of the Broadband NLO Device

Here, the optimization process for designing the thickness distribution of the broadband NLO device is explained in detail. Although a higher linear absorptance (A) on the broadband NLO device leads to stronger NLO changes in the Au layer, the trade-off is that the linear reflectance (R) is also reduced. Arbitrarily, the broadband NLO device was set to have a linear absorptance (A) of 55% and a reflectance (R) of 45% at 550 nm.

A nonlinear mirror was fabricated with the following geometry: Glass/Ag(100 nm)/SiO2(D1 nm)/Au(23 nm)/SiO2(D2 nm). To exemplify the design process, the nonlinear mirror has, as noted above, a linear absorptance of 55% and a reflectance of 45% at 550 nm. This choice is arbitrary. The total absorptance of the mirror is a periodic function of the thicknesses of the layers, so there are an infinite number of thickness combinations which will yield a given targeted absorptance value.

Figure 12:
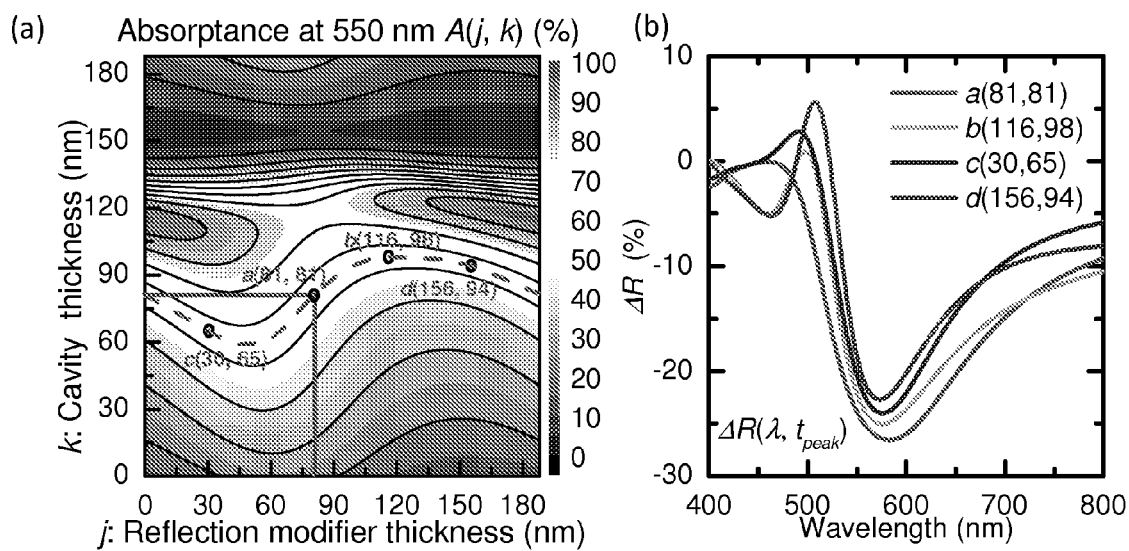
FIG. 12: (a) Absorptance A(j,k) at 550 nm of the Broadband NLO Device with different thickness combinations of reflection modifier (j) and cavity (k) layers within the region (1,1) defined in FIG. 5(c). The line represents all thickness combinations leading to A(j,k)=55%. Points a(81,81), b(116, 98), c(30,65), and d(156,94) represent four different illustrative thickness combinations used for the evaluation of ΔR(λ, tpeak). Numbers inside the parenthesis are thicknesses given in nm. The point a(81,81), highlighted, corresponds to the fabricated Broadband NLO Device. (b) Reflectance changes ΔR of the selected mirror combinations.

As discussed, the periodicity of R and A on the reflection modifier (j) and cavity (k) thicknesses allows the optimization processes to be conducted only on the region designated (1, 1). FIG. 12(a) shows the A(j, k) of the region (1, 1) and a red dashed line indicates all thickness combinations which would fit the design criterion of A(j, k)=55%. Four different dielectric layer thickness combinations (j, k), a(81, 81), b(116, 98), c(30, 65), and d(156, 94), were picked as examples to illustrate the design process. The units of the thicknesses denoted inside the parenthesis have been dropped for convenience. This process required calculations of $\Delta R(\lambda, t_{peak})$ for multiple structures along this line in order to estimate the structure that maximized $\Delta R(550$ nm, $t_{peak})$.

FIG. 12(b) shows the $\Delta R(\lambda, t_{peak})$, calculated by Eq. 6 using the values of $\Delta N_{Au}(\lambda, t_{peak})$ shown in FIGS. 11(a) and 11(b), at the peak response time, $t_{peak}$, for the broadband NLO device structures excited at 550 nm. The results show that $\Delta R(550$ nm, $t_{peak})$ improves gradually from points d(156, 94) through a(81,81) and starts decreasing from a(81,81) to c(30, 65). The maximum magnitude of $\Delta R(550$ nm, $t_{peak})$ was found to be located at a(81, 81). As expected, the value of $\Delta R(550$ nm, $t_{peak})$ was found to be the same in other regions provided that the dielectric thicknesses were increased by half-wave optical thickness of $SiO_2$ at 550 nm.

Pump-Probe Experiments

Figure 13:
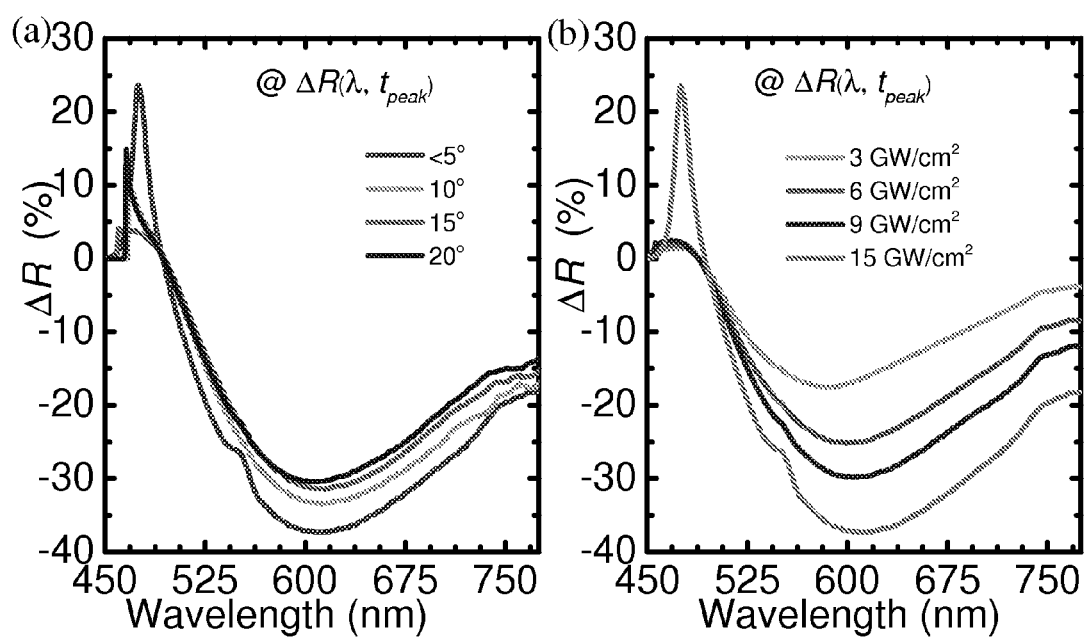
FIG. 13: Reflectance changes (ΔR) of the Broadband NLO Device pumped at 550 nm of (a) spectral spectrum ΔR(λ, tpeak) with respect to different incidence angles of <5° (dark line), 10° (lighter line), 15° (lighter line), and 20° (dark line); (b) ΔR(λ, tpeak) at the peak response time tpeak, and (c) temporal dependence ΔR(600 nm, t) at probe wavelength 600 nm for different peak pump irradiance 10 (dark line), 21 (dark line), 31 (dark line) and 51 (dark line) GW/cm2.

FIG. 13(a) shows that angular dependence of $\Delta R(\lambda, t_{peak})$ measured in pump-probe experiments conducted on the broadband NLO device at a pump irradiance of 51 GW/cm² at 550 nm. Here, $t_{peak}$ denotes the maximum magnitude of $\Delta R$ in the temporal ranges studied. As expected from simulations, $\Delta R(\lambda, t_{peak})$ displays a broad spectral and angular bandwidth. For instance, for angles <20° it was found that $\Delta R(\lambda, t_{peak})$ across the visible spectral range changes by no larger than 7% with respect to data acquired near normal incidence (<5°).

FIG. 13(b) shows the values of $\Delta R(\lambda, t_{peak})$ measured for peak pump irradiances of 10, 21, 31, and 51 GW/cm² at 550 nm. For increasing pump irradiance, $\Delta R(\lambda, t_{peak})$ spectra consistently displays broad spectral bandwidth characteristics. It was confirmed that the highest irradiance did not damage the sample by acquiring multiple data sets at high and low irradiance levels on the same spot. For potential applications in all-optical devices, it is useful to derive the irradiance evolution of the absolute reflectance calculated by $R_0(\lambda)+\Delta R(\lambda, t_{peak})$, where $R_0(\lambda)$ is the measured linear reflectance shown in FIG. 9(a).

Figure 14:
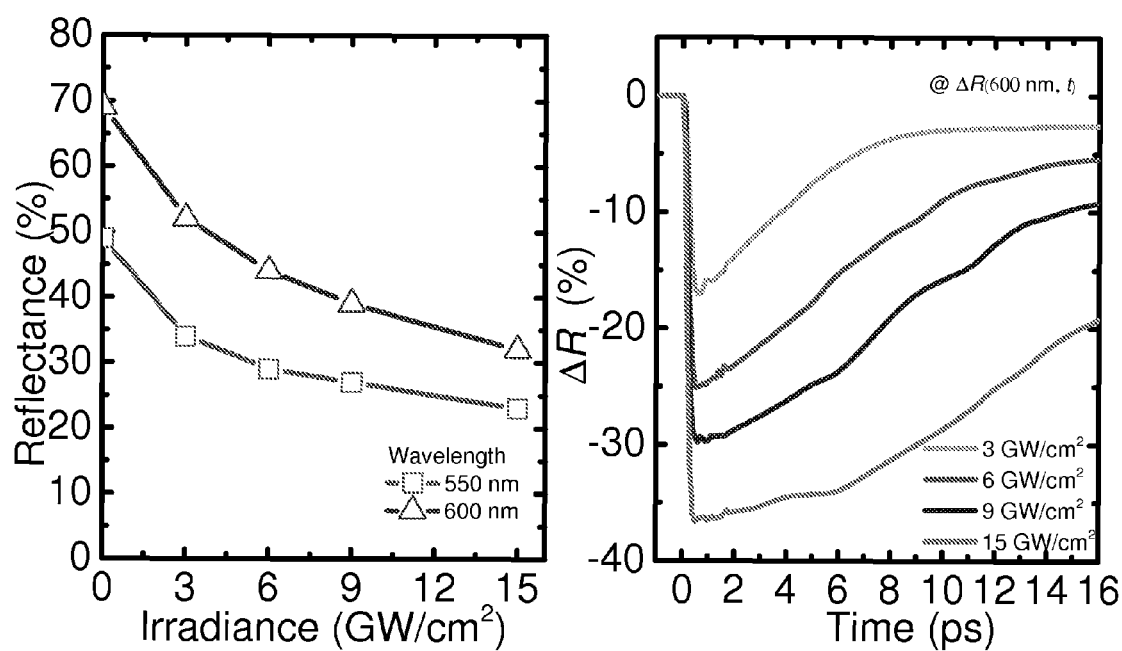
FIG. 14: (a) Irradiance dependent reflectance (%) at 550 nm (dark line and symbol) and 600 nm (dark line and symbol) by adding linear reflectance R0(λ) with measured ΔR(λ, tpeak) at the peak response time tpeak, and (b) temporal dependence ΔR(600 nm, t) at probe wavelength 600 nm for different peak pump irradiances of the Broadband NLO Device sample pumped at 550 nm.

FIG. 14(a) shows that the broadband NLO device offers significantly strong reflectance suppression from a reasonably high $R_0(\lambda)$, such as from 49% to 23% at 550 nm and from 69% to 32% at 600 nm by increasing pump irradiance to 51 GW/cm². Overall, the power dependent reflectance of the broadband NLO device can meet multiple engineering requirements in the visible spectral range by having an extreme large magnitude of $\Delta R$, ultrafast response, and fairly broad spectral and angular bandwidths.

Finally, FIG. 14(b) shows the temporal evolution of $\Delta R(600$ nm, t) as a function of the peak pump irradiances. Here, the peak wavelength has been selected to illustrate the ultrafast temporal evolution of the NLO response of the broadband NLO device. For increasing peak pump irradiance, $\Delta R(600$ nm, t) shows a larger magnitude and a delayed relaxation of the reflectance modulation. A very similar behavior has been reported in single Au films, and has been attributed to a change of the electronic specific heat with increased temperature.

Narrowband NLO Device

The challenge for producing maximum reflectance changes in the broadband NLO device structure is limited by the trade-off between its linear reflectance (R) and reflectance change ($\Delta R$) as discussed before. In short, an absorbed laser pulse in the broadband NLO device structure drives a thermal nonlinearity of the Au layer and consequently the NLO response of the whole structure. Note that if the linear absorptance (A) is increased such that the NLO device produces a larger $\Delta R$, this increased A also leads to a reduced R; an undesirable optical signal loss in all-optical control applications. The present study mitigates this inherent constraint by imposing a non-collinear beam geometry on the same four layer NLO device structure as shown in FIG. 15.

Figure 15:
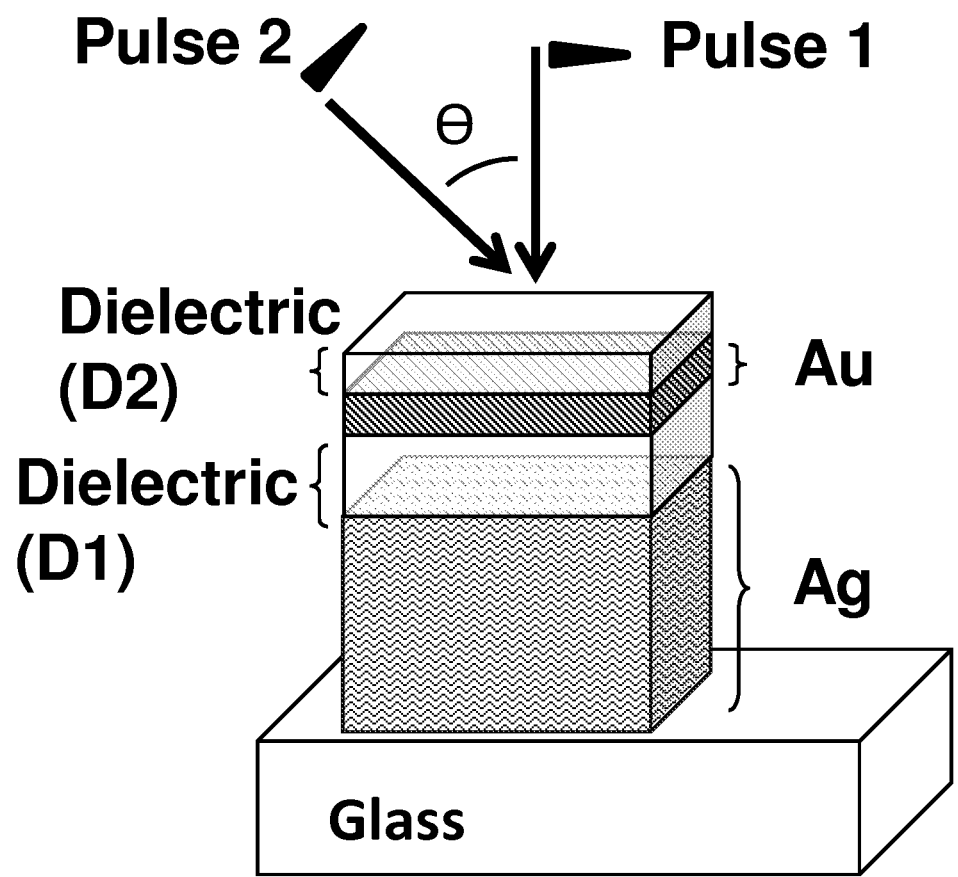
FIG. 15: Non-collinear beam geometry imposed on the NLO device with a signal pulse at the normal incidence and a control pulse at the angle of incidence θ.

FIG. 15 shows a generalized thin-film structure, comprising of a 100 nm-thick Ag and a 23 nm-thick Au sandwiched between two dielectric layers such as D1 and D2. This four-layer thin-film structure is used in broadband NLO device, which provides large reflectance changes in response to a high peak-power optical pulse. The broadband NLO device represents a conventional all-optical control in the sense that it allows a low peak-power signal pulse to be modulated in amplitude and phase by a high peak-power control pulse. The broadband NLO device is operated using a nearly collinear beam geometry (Ex: θ=0° in FIG. 15), where both signal and control pulses are traveling nearly or at the same incidence angle.

In contrast, the narrowband NLO device shown in FIG. 15 is designed to operate in a non-collinear beam geometry, wherein the high angular dependence is designed such that the control pulse experiences a high linear absorptance at a first angle of incidence θ, and the signal pulse experiences a low linear absorptance at a second angle of incidence (i.e. the normal incidence). In other words, the narrowband NLO device presents a highly angularly dependent linear absorptance (A). This four layer structure with a high angular A dependence is designed to maximize the linear absorptance of the control pulse, which leads to accessing the maximum NLO response of the device, but simultaneously limits the loss experienced by the signal; thus offering a better compromise between NLO response and linear loss than the broadband NLO device.

It is interesting to note that since the linear absorptance at the normal incidence is small, even a high peak-power signal pulse at the normal incidence does not cause a large NLO response in the narrowband NLO device. The engineered angularly dependent absorptance consequently enables a selective excitation of the NLO response by a control pulse but simultaneously suppresses the excitation from a signal pulse itself. Conventional all-optical control, without such angular sensitivity, is commonly limited in this aspect because a strong signal pulse will lead to undesired self-modulation. The present narrowband NLO device aims to show a high angular sensitivity in its NLO response, which can open up a new type of all-optical control for high peak-power signal pulses, for example, laser material processing applications such as laser manufactures and pulsed-laser surgeries.

All-Optical Controls of High Peak Power Signal Pulses

All-optical controls have been primarily applied in the context of optical signal processing applications because advantages offered by its ultrafast operation, as shown in a variety of devices such as all-optical switch, all-optical modulator, and all-optical logic gate. These devices use nonlinear optical (NLO) materials to modulate the amplitude and phase of one light beam (signal) through their NLO properties by the other light beam (control). Different types of NLO properties such as Kerr nonlinearity, and saturable absorption have been used for all-optical control applications. However, a common inherent limitation of all these approaches is that the peak power of the controlled signal beam needs to be weaker than a control beam to selectively excite the NLO response of the material.

Andrew M. C. Dawes et al have overcome some aspects of this limitation by using a highly sensitive light-induced scattering in a warm laser-pumped rubidium (Rb) vapor. In contrast to conventional all-optical controls, a weak control light is sufficient to redirect other strong signal lights. This approach opens up new possibilities for all-optical devices to be cascaded and single-photon excitable. It needs to be noted that both signal and control lights here were using continuous wave (CW) lasers rather than pulsed lasers as extensively discussed herein. This new all-optical control operates within the so-called low-light-level regime, and has been achieved by other methods as well. However, several drawbacks exist when exploiting the NLO response of atomic vapors, since they require a complex optical wave-mixing set up to drive intensive lights and atoms interactions in NLO vapors. In addition, the dynamic of the optical wave-mixing is also orders-of-magnitudes slower than ultrafast NLO processes such as Kerr nonlinearities or ultrafast thermal nonlinearities of metals. The speed of the all-optical control by Rb vapors has a rising time up to 4 μs, limited by its ground-state optical pump time.

On the other hand, the large NLO properties of noble metal thin films (Ex: Ag, Au, and Cu) are relatively easier to excite using the absorption of a single ultrafast optical pulse. The absorbed energy and power of an optical pulse (control pulse) arises electron and lattice temperatures of a metal thin film, then smears the electronic distribution of the metal around the Fermi energy level (Fermi-smearing), and causes a large and ultrafast change of transmittance and reflectance on the other pulse (signal pulse) at visible wavelengths. As an example of this approach, a metal-dielectric thin-film structure (broadband NLO device) was developed. This structure amplifies the ultrafast NLO properties for an Au thin film and consequently enhances the NLO response of the whole Au based thin film structure.

Fabrication and Characterization

A NLO device with a high angular dependence was designed using the theoretical formalism presented above and fabricated by deposition of the Ag layer onto a glass substrate followed by the deposition of the Au layer sandwiched and protected by $ZrO_2$ thin films with the following geometry:

narrowband NLO device: Glass/Ag(100 nm)/$ZrO_2$(389 nm)/Au(23 nm)/$ZrO_2$(133 nm).

All thin films were deposited on VWR Micro Slides glass substrates with a Kurt. J Lesker Axxis electron beam deposition system. Substrates were cleaned ultrasonically in deionized water, acetone, and isopropanol for 15 min each. The films were deposited under vacuum at a pressure of $5 \times 10^{-7}$ Torr ($6.7 \times 10^{-5}$ Pa) with a rotating sample holder that actively cools the substrates to room temperature. The Ag, Au, and $ZrO_2$ were deposited at a rate of 0.2 nm/s, 0.05 nm/s, and 0.2 nm/s, respectively, monitored by crystal sensors. The combination of layer thicknesses (shown inside the parentheses) was chosen to have a high angular dependence on its linear reflectance.

Reflectance spectra ($R(\lambda, \theta)$) were measured at visible wavelengths for the NLO device sample, where $\lambda$ is the wavelength, and $\theta$ is the angle of incidence. $R(\lambda, \theta=0°)$ was taken by a Shimadzu UV-Vis-NIR scanning spectrophotometer, and $R(\lambda, \theta=45°)$ was taken by a J. A. Woollam M-2000UI spectroscopic ellipsometry. The NLO properties were characterized by a commercially available white-light (WLC) continuum pump-probe spectroscopy system (HELIOS, ultrafast system), described in detail in reference. In short, a pump pulse (presenting as a control pulse in FIG. 15) was tuned to a wavelength of 568 nm with a pulse width of 60 fs half-width-1/e (HW 1/e) and a beam radius of 420 μm (HW 1/e) at the sample position, measured using a knife-edge scan. The WLC (420-950 nm) probe pulse (representing as a signal pulse in FIG. 15) had a beam radius of 80 μm (HW 1/e) at the sample position and a low enough peak irradiance to produce no observable NLO response in the sample. The total instrument response time is 150 fs full-width-half-maximum (FWHM). Because the probe beam radius is smaller than the pump beam radius, it is assumed that the probe overlaps with a region of approximately constant peak irradiance from the pump. After averaging over one thousand probe pulses at each time delay, the change in optical density ($\Delta OD(\lambda, t)$) was recorded as a function of wavelength ($\lambda$) and delay time (t). The reflectance change spectra ($\Delta R(\lambda, t)$) of the WLC probe pulses were calculated from measured $\Delta OD(\lambda, t)$ for a variety of peak pump irradiances by $\Delta R(\lambda, t) = R(\lambda) \cdot ((10^{\Delta OD(\lambda,t)} - 1)$, where $R(\lambda)$ is measured linear reflectance spectrum.

Linear Optical Properties

The design criteria of the narrowband NLO device is set as follows: a low reflectance ($R(\lambda=568$ nm, $\theta=45°)<10\%$) at the first incidence angle, a high reflectance ($R(\lambda=568$ nm, $\theta=0°)>85\%$) at the second incidence angle. Note that this criteria is set with a low linear reflectance (high linear absorptance) at $\theta=45°$ for a control pulse, but a high linear reflectance (low linear absorptance) at $\theta=0°$ for a signal pulse. Therefore, the high linear absorptance of a control pulse at $\theta=45°$ is capable of driving strong thermal nonlinearities of 23 nm-thick Au in the narrowband NLO device, and consequently producing a strong reflectance change on the signal pulse.

In contrast, the low linear absorptance at $\theta=0°$ reduces self-induced reflectance changes from a signal pulse even with a high peak power. The choice of wavelengths and incidence angles of either control or signal pulses is arbitrary and can be tuned by varying the thickness combination of two $ZrO_2$ layers simulated through the transfer-matrix method. The same design process simulated by the transfer-matrix method has been explained in details and shown in FIG. 9.

Figure 16:
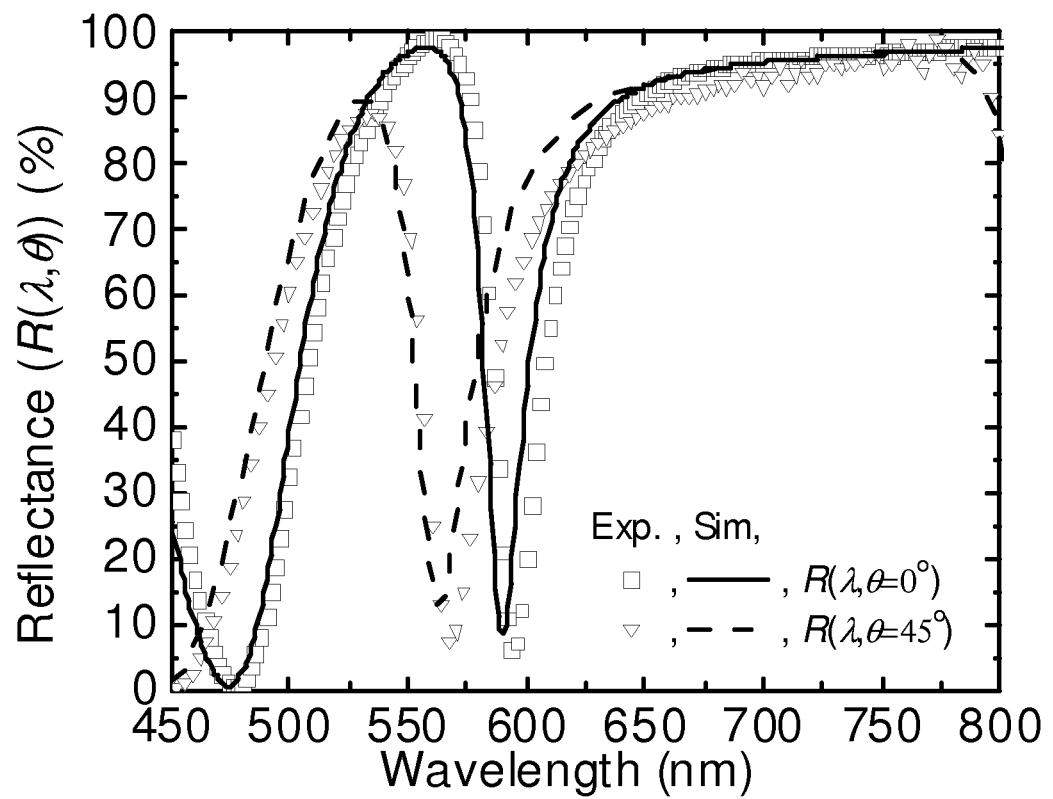
FIG. 16: Measured (symbols) and simulated (lines) reflectance spectra at visible wavelengths and two angles of incidence (R(λ, θ=0°) and (R(λ, θ=45°)) for the sample, Narrowband NLO Device, where the polarization of the incidence light at θ=45° was transverse magnetic (p-pol).

FIG. 16 shows a comparison between measured and simulated reflectance spectra of the sample ($R(\lambda, \theta)$) at visible wavelengths. Simulated reflectance spectra were calculated using the transfer-matrix method. FIG. 16 shows a good match between measured (symbols) and simulated reflectance spectra (lines), which simultaneously verifies both the fabrication process and the simulation. In addition, the measured reflectance spectra meet the chosen design criteria by R($\lambda$=568 nm, $\theta$=45°)=7% and R($\theta$=568 nm, $\theta$=0°)=98%.

Note that reflectance (R($\lambda$, $\theta$)) and absorptance (A($\lambda$, $\theta$)) spectra of the narrowband NLO device are complimentary across the visible spectral region as expected from its negligible transmittance. Its component 100 nm-thick Ag layer are thicker than the penetration depth of lights at visible wavelengths. Hence, the narrowband NLO device has a high angular dependence not only in reflectance but also in absorptance. For example, A($\theta$=568 nm, $\theta$=45°)=93% and A($\theta$=568 nm, $\theta$=0°)=2% are calculated from measured values of R($\theta$=568 nm, $\theta$=45°)=7% and R($\theta$=568 nm, $\theta$=0°)=98%.

For narrowband NLO device, the linear absorptance of a control pulse at $\theta$=45° is maximized by A($\theta$=568 nm, $\theta$=45°)=93%, closed to a complete absorption of 100%. This very high linear absorptance of the narrowband NLO device is primarily attributed to its component 23 nm-thick Au thin film, with negligible absorption in its component 100 nm-thick Ag film, and no absorption in its two $ZrO_2$ films.

Nonlinear Optical Properties

Figure 17:
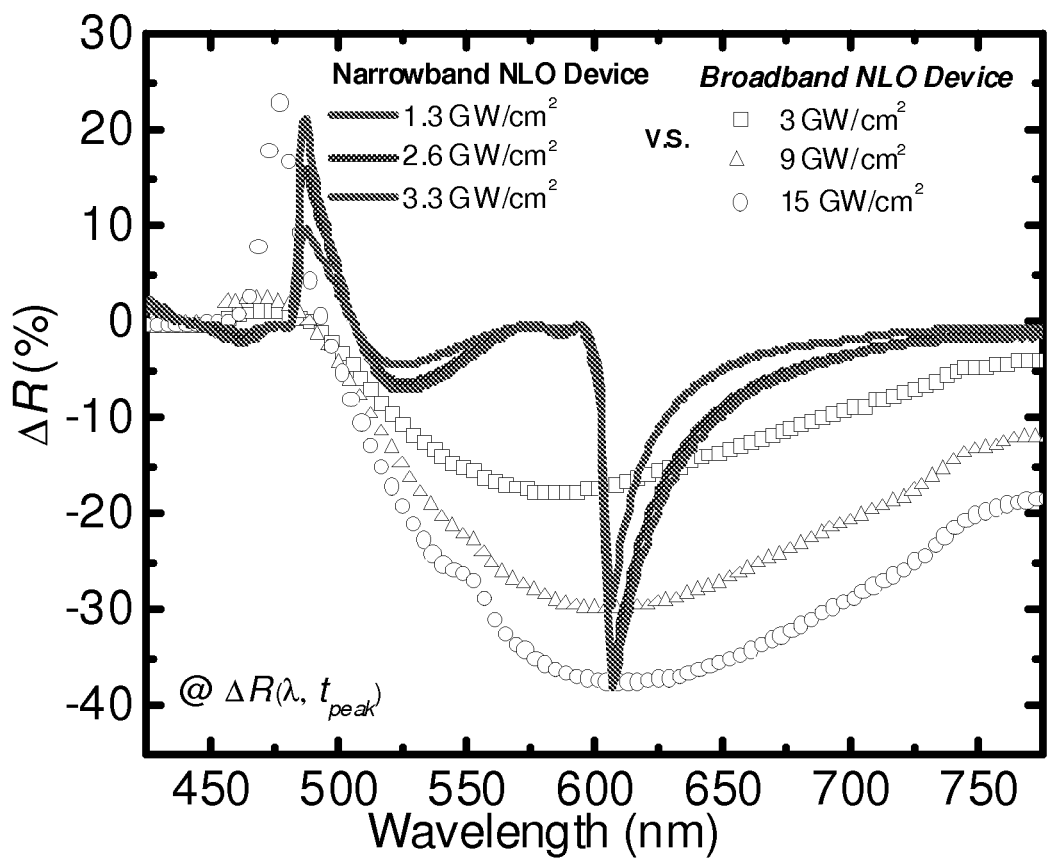
FIG. 17: Reflectance changes ΔR(λ, tpeak) at the θ=0° compared between the Narrowband NLO Device (lines) and Broadband NLO Device (symbols). Narrowband NLO Device is pumped by pump pulses at the wavelength 568 nm and θ=45° with different peak pump irradiance 1.3 (dark line), 2.6 (dark line), and 3.3 (dark line) GW/cm2; Broadband NLO Device is pumped by pump pulses at 550 nm and θ=0° with different peak pump irradiances 3 (rectangular), 9 (triangular), 15 (circle) GW/cm2.

The NLO properties of the narrowband NLO device were characterized by a commercially available white-light (WLC) continuum pump-probe spectroscopy system (HELIOS, ultrafast system). A pump pulse (presenting as a control pulse in FIG. 15) was tuned to a wavelength of 568 nm, and a WLC (420-950 nm) probe pulse was used to measure reflectance changes spectra $\Delta R(\lambda, t_{peak})$ at $\theta$=0° across the visible spectral region. Measured values of $\Delta R(\lambda, t_{peak})$ of the narrowband NLO device are shown in FIG. 17 and are compared with the broadband NLO device for $\Delta R(\lambda, t_{peak})$ at the same incidence angle of $\theta$=0°. Here, $t_{peak}$ denotes the delay time between a probe and a pump pulse that yields the maximum value of $\Delta R(\lambda, t_{peak})$ in the temporal ranges studied.

The two pump-probe experiments were individually operated at the same narrowband NLO device sample to characterize its angularly dependent NLO properties by different beam geometries. The first beam geometry (non-collinear beam geometry) has a pump pulse of wavelength 568 nm at $\theta$=45° and a WLC probe pulse at $\theta$=0°. The second beam geometry (collinear beam geometry) has a pump pulse of wavelength 607 nm at $\theta$=0° and a WLC probe pulse at nearly the same angle of incidence. Pump-probe experiments with both beam geometries have been illustrated in FIG. 18, and the $\Delta R(\lambda, t)$ values measured across the whole visible spectrum by a WLC probe pulse suggesting control (pump) and signal (probe) pulses in all-optical control applications can have a wide range of combinations between their wavelengths and incidence angles.

Both, the narrowband NLO device and broadband NLO device use the same four-layer metal-dielectric thin-film structure (shown in FIG. 15):

narrowband NLO device: Glass/Ag(100 nm)/$ZrO_2$(389 nm)/Au(23 nm)/$ZrO_2$(133 nm), broadband NLO device: Glass/Ag(100 nm)/$SiO_2$(81 nm)/Au(23 nm)/$SiO_2$(81 nm), but the dielectric layers and thicknesses have been chosen to allow the structures to present narrow or broad spectral and angular bandwidths and to ease their fabrication. The narrowband NLO device were firstly designed and fabricated using the same dielectric layers $SiO_2$, and it was found that the required $SiO_2$ thickness is too thick (up to 528 nm) to allow fabrications by the e-beam deposition system used here, causing a delamination of the whole thin-film structure. Hence, a dielectric with high refractive index values (n=2.2) $ZrO_2$ was used to replace (n=1.5) $SiO_2$ layers and provide an equivalent optical path length by a thinner layer thickness. Not only can the delamination be avoided, but the linear optical properties of the narrowband NLO device design are also preserved with a faster e-beam deposition process after reducing the total layer thickness.

Pump-Probe Experiments

By design, the NLO response of the narrowband NLO device presents narrow spectral bandwidth characteristics on $\Delta R(\lambda, t_{peak})$, as shown in FIG. 17, in contrast to the NLO response of the broadband NLO device. These two NLO devices illustrate the flexibility that the present four-layer metal dielectric structure can present for the design of NLO devices with different optical properties. It is important to note that the narrowband NLO device requires significantly less peak pump irradiance to produce the same $\Delta R$ when compared to the NLO response of the broadband NLO device. For instance, at $\Delta R(\theta$=607 nm, $t_{peak})$=-29%, the peak pump irradiances increases from 1.3 GW/cm² for the narrowband NLO device to 9 GW/cm² for the broadband NLO device. Similarly, at $\Delta R(\lambda$=607 nm, $t_{peak})$=-38%, the pump peak irradiances increases from 3.3 to 15 GW/cm². Hence, the required peak pump pulse irradiance required to operate the narrowband NLO device is reduced by at least four times compared to those required to operate the broadband NLO device. This reduction in pump power is clearly attractive for all-optical applications. Finally, it should be noted this difference in driving pump power is a direct result of differences in absorptance values between devices: A($\lambda$=568 nm, $\theta$=45°)=93% on the narrowband NLO device and A($\lambda$=550 nm, $\theta$=0°)=55% on the broadband NLO device.

Figure 18:
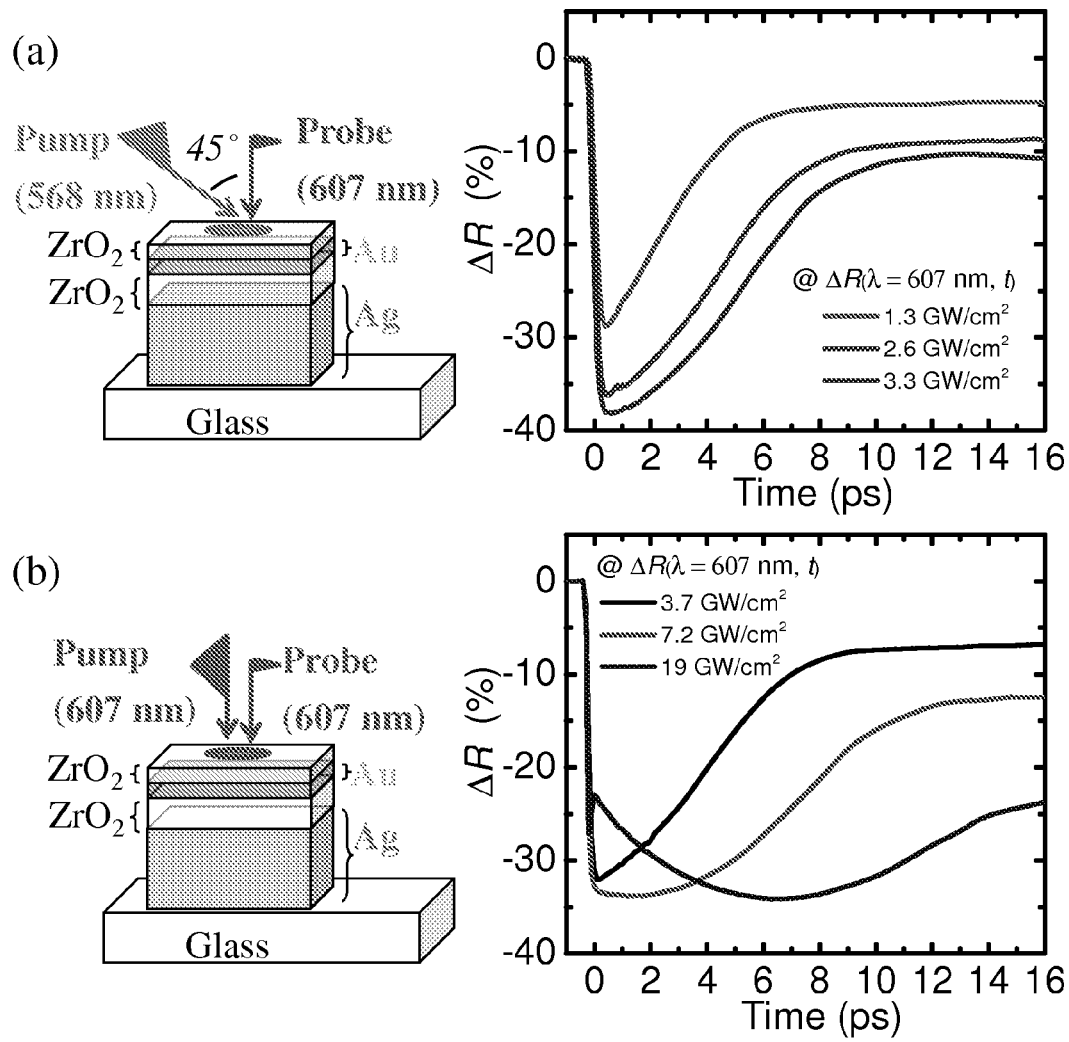
FIGS. 18: (a) and (b) Temporal dependence of reflectance changes ΔR(λ=607 nm, t) for the Narrowband NLO Device at probe wavelength 607 nm for different peak pump irradiances measured by pump-probe experiments using a non-collinear (FIG. 12(a)) and collinear beam geometry (FIG. 12(b)) and illustrated in each left figures, respectively.

Here it is worth pointing out that the previous comparison of $\Delta R$ values has been made at the wavelength of maximum modulation, which does not correspond to 568 nm for the narrowband NLO device. Its $\Delta R$ values only reach a magnitude of −0.9% at the wavelength of 568 nm, but its maximum $\Delta R$ values are at 607 nm with a magnitude of −38% excited by the same peak pump irradiance of 3.3 GW/cm². Hence, the narrowband NLO device works best in non-degenerate pump-probe operation. In this particular example, for a pump wavelength of 568 nm wherein A($\lambda$=568 nm, $\theta$=45°)=93% and for a probe wavelength of 607 nm wherein A($\lambda$=607 nm, $\theta$=0°)=50%. Given the large linear absorption at 607 nm, it is important not only to characterize the NLO response produced by a control pulse at 568 nm incident at $\theta$=45°, but also to consider the NLO response induced by a high peak power signal pulse at 607 nm incident at $\theta$=0°. Pump-probe experiments with non-collinear and collinear beam geometries were used to characterize both conditions. FIG. 18 shows a comparison of the dynamic NLO response measured under these two conditions. The temporal evolution of $\Delta R(\lambda$=607 nm, t) for a non-collinear pump-probe geometry (FIG. 18(a)) demonstrates that $\Delta R(\lambda$=607 nm, t) reaches larger values at lower peak irradiances than in the collinear pump-probe geometry (FIG. 18(b)). For instance, $\Delta R$=−29% at 1.3 GW/cm² in a non-collinear geometry compared to $\Delta R$=−32% at 3.7 GW/cm² in a collinear geometry. At a pump irradiance of 19 GW/cm², FIG. 18(b) also shows a distinct temporal evolution of $\Delta R(\lambda$=607 nm, t) with a delayed response reaching a maximum value of around −34%. Similar dynamic characteristics have been reported in single Au films, and have been attributed to a change of the electronic specific heat with increased temperature. It is known that higher pump irradiances result in increasing electron temperatures and greater electronic specific heat, and ends up a longer thermal-relaxation times.

Figure 19:
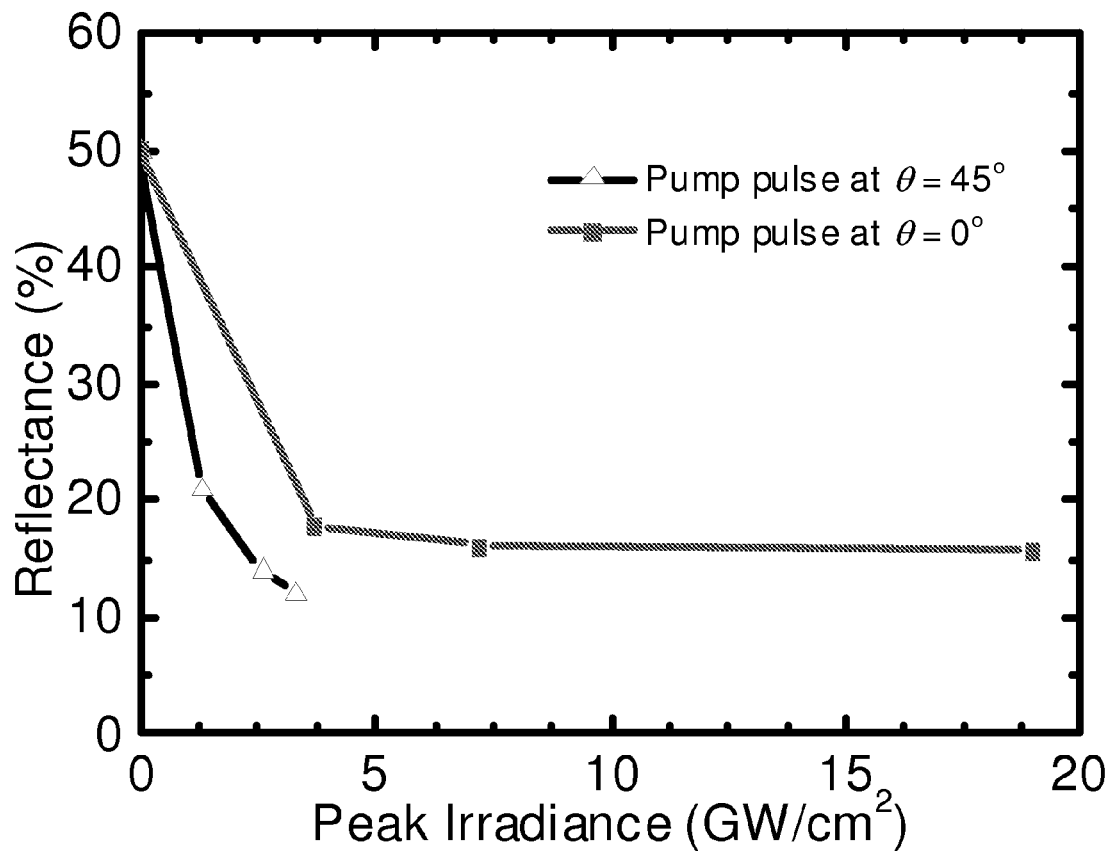
FIG. 19: Irradiance dependent reflectance (%) at the wavelength 607 nm by adding linear reflectance R(λ=607 nm) with measured ΔR(λ=607 nm, tpeak) compared between pumping at θ=45° (dark line and symbol) and θ=0° (dark line and symbol) with beam geometries as shown in FIGS. 12(a) and (b), respectively.

This result shows the NLO response of the narrowband NLO device is more sensitive by exciting at θ=45° than at 0°. To illustrate this better FIG. 19 displays the absolute reflectance calculated by R(λ=607 nm)+ΔR(λ=607 nm, $t_{peak}$), where R(λ=607 nm) is the measured linear reflectance at the normal incidence shown in FIG. 16.

In summary, the narrowband NLO device presents a high angular dependence in its linear and NLO properties. The customized angular dependence can simultaneously enhance the NLO response excited by the control pulse and reduce the self-induced NLO responses from high peak-power signal pulse. The extremely large magnitude of ΔR, ultrafast response, and adjustable angular and spectral bandwidth are attractive for NLO devices to all-optically control for high peak power signal pulses with different engineering requirements.

Conclusion

Studies of noble-metal nonlinear optical (NLO) device structures that can amplify the strong and ultrafast NLO properties of an Au thin film at visible wavelengths have been presented. Spectral and angular bandwidths of the NLO device are adjustable while maintaining a large nonlinear reflectance change. The same four layer thin-film structure can be tuned to present broad or narrow spectral and angular bandwidths. The linear optical properties of these NLO devices can therefore be tuned without compromising their NLO properties, and can be of great interest for a wide variety of all-optical applications in the visible spectral range.

The narrowband NLO device not only reduces the peak power consumption of a control pulse used in exciting ultrafast reflectance changes, but opens up a new design of all-optical controls for high peak-power signal pulses. This attractive optical device (narrowband NLO device) will be further integrated and developed into a novel dose-control system (ultrafast all-optical shutter) for medical and laser manufacturing applications presented hereinafter.

Further Exemplary Embodiments

Nonlinear Reflective Saturable Absorber

Figure 20:
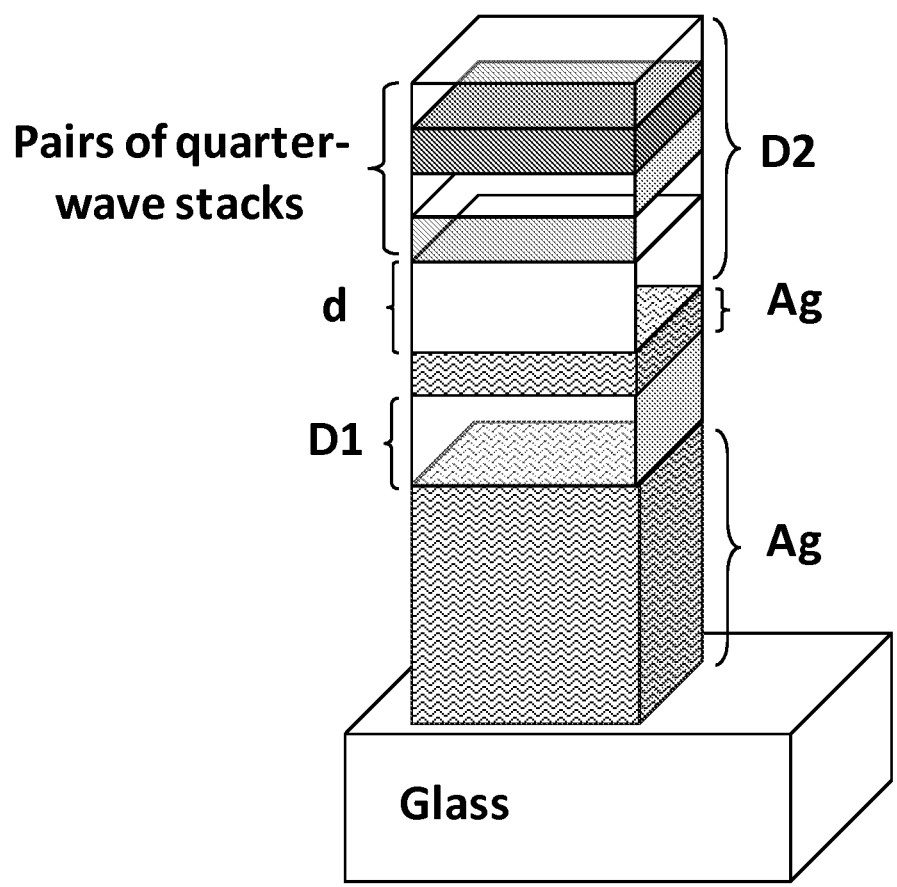
FIG. 20: Structure geometry of the reflective saturable absorber with two pairs of quarter-wave stacks
Figure 21:
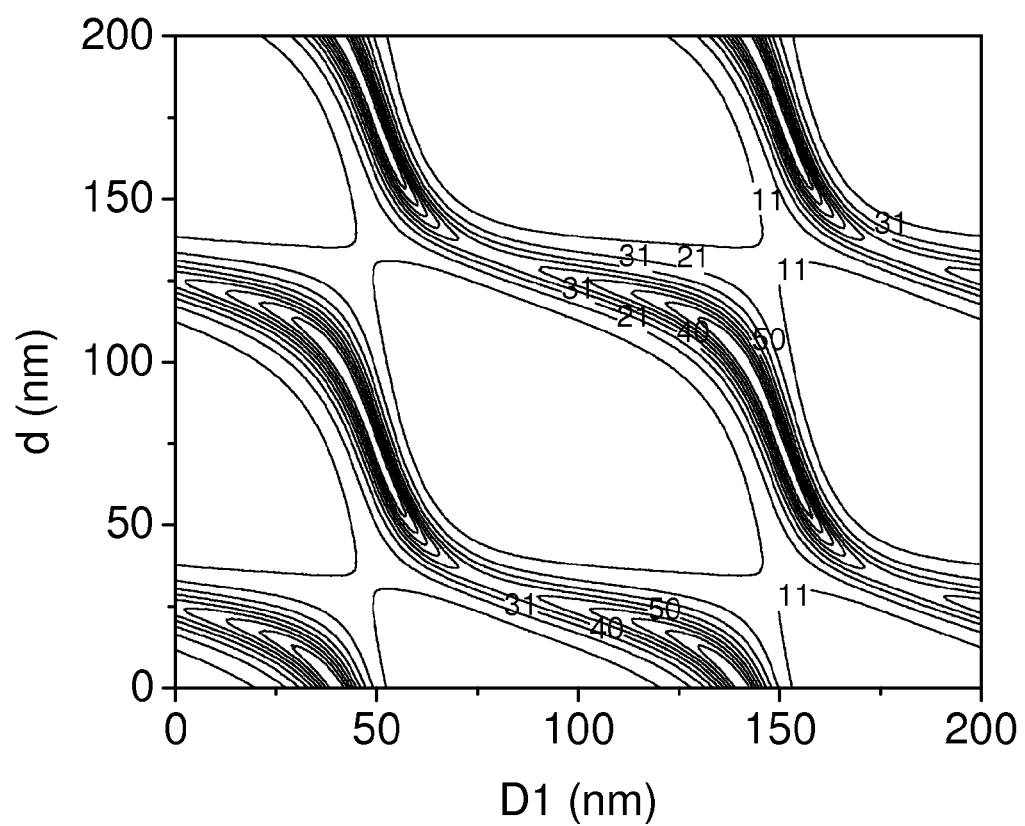
FIG. 21: Absorptance of the reflective saturable absorber as a function of the thickness of the dielectric cavity and spacer layers.
Figure 22:
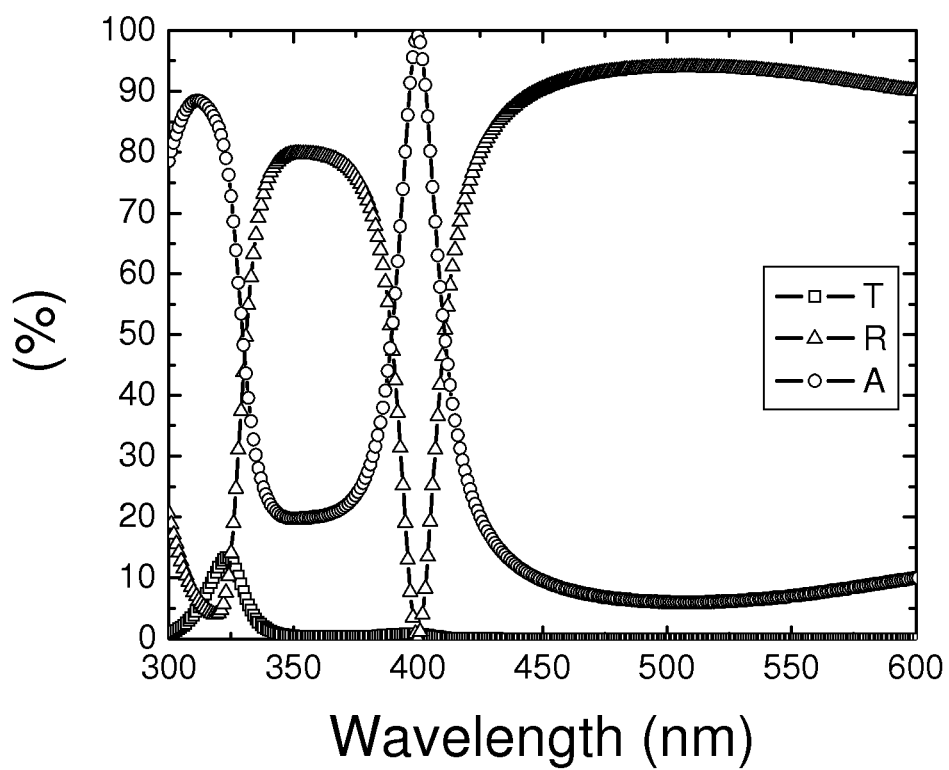
FIG. 22: Simulated linear spectra of the reflective saturable absorber using the matrix transfer method

The nonlinear reflective saturable absorber is designed to maximize linear absorptance at a specified wavelength. In order to simulate the structure and take advantage of metal nonlinearities, the wavelength must be spectrally above the interband transition onset for a given metal. Silver is used because its interband transition occurs at 313 nm, allowing 400 nm to be the chosen wavelength in order to demonstrate capabilities in the full visible spectral range. The exemplary structure is shown in FIG. 20. The second dielectric layer, D2, in the nonlinear optical device structure comprises a quarter-wave stack and an extra layer, hereafter referred to as cavity. The quarter-wave stacks are added in order to maximize absorption at 400 nm within the structure. The number of quarter-wave stacks is initially chosen depending on the thickness of the Ag thin film layer and affects the full-width half-maximum as well as the absolute maximum of the absorptance peak. The quarter-wave stacks alternate between high and low index materials, which in this case are assumed to be $ZrO_2$ and $SiO_2$, respectively. The geometry is as follows: Glass/Ag(120 nm)/$ZrO_2$(cavity)/Ag(20 nm)/$SiO_2$(spacer)/$ZrO_2$(50.3 nm)/$SiO_2$(67.8 nm)/$ZrO_2$(50.3 nm). The thicknesses of D1 and cavity layers are chosen to maximize absorptance (FIG. 21). Note that the absorption is periodic with respect to the D1 and cavity thickness. In this example, the smallest possible thickness values are chosen for each layer such that the absorptance reaches a local maximum. The final simulated structure has the following geometry: Glass/Ag(120 nm)/$ZrO_2$(40 nm)/Ag(20 nm)/$SiO_2$(67.8 nm)/$ZrO_2$(50.3 nm)/$SiO_2$(67.8 nm)/$ZrO_2$(50.3 nm). The simulated linear spectra are shown in FIG. 22.

Figure 23:
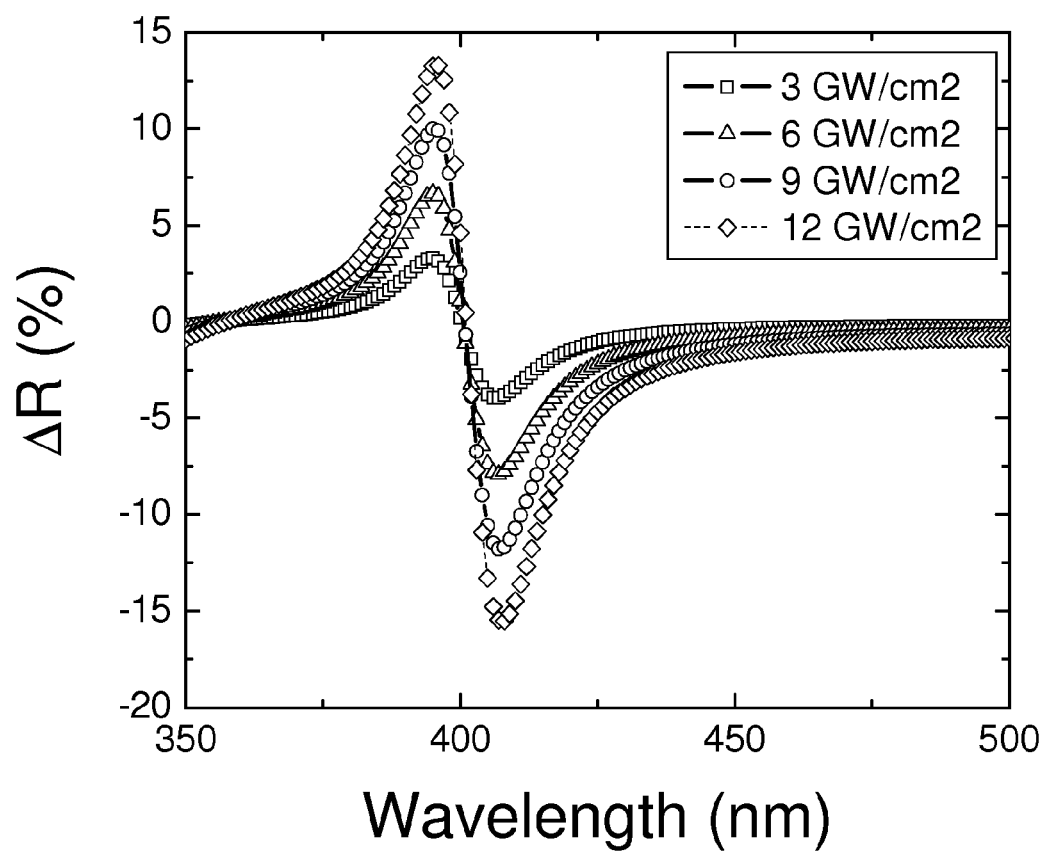
FIG. 23: Simulated nonlinear response of the reflective saturable absorber pumped by a 400 nm, 60 fs pulse with varying intensities

The nonlinear response of the reflective saturable absorber are simulated using a two-temperature model and a physical model describing the dielectric permittivity for silver. A pump pulse at with a temporal width of 60 fs and wavelength of 400 nm is used for simulating the nonlinearity of the reflective saturable absorber. Pump intensities are varied from 3 GW/cm² to 12 GW/cm² as shown in FIG. 23.

It will be understood by those of skill in the art that many other variations to the reflectance or absorptance spectra of these nonlinear optical devices, wavelengths and angles of incidence of the optical pulses exist which are included within the present invention.

Ultrafast all-Optical Shutter and Camera Systems for Medical and Laser Manufacturing Applications To date, reports of ultrafast optical shutters in the literature are scarce. The performance of these shutters is limited in their spectral range of operation; none of them offer the ability to easily adjust the shutter opening window (i.e. actively control the time during which the shutter remains open) nor the ability to modulate high peak-power optical pulse. Accordingly, there is a need to study ultrafast all-optical shutter to generate high peak-power sub-nanosecond pulses with adjustable temporal pulse widths.

Nonlinear Sagnac Interferometer

Figure 24:
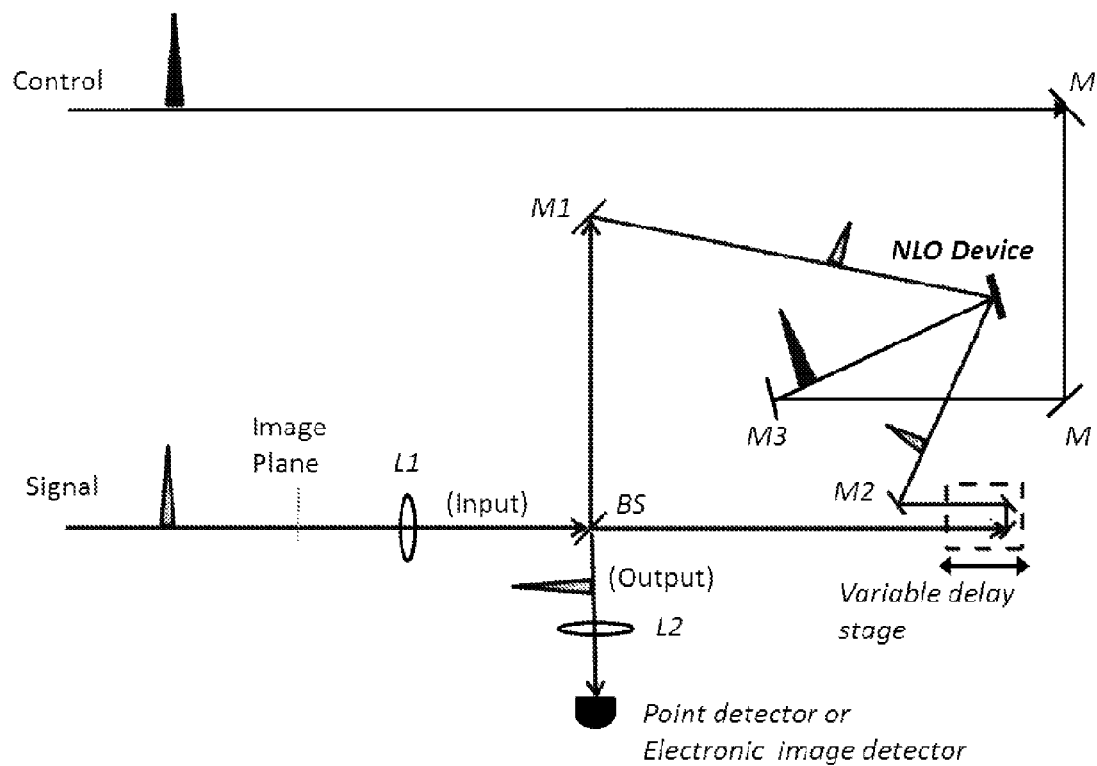
FIG. 24: Schematics of 4f Nonlinear Sagnac Interferometer. L represent a lens, M represent a mirror, and BS is a 50/50 beam splitter.

FIG. 24 provides an example of a preferred embodiment according to the present invention wherein the a 4-f nonlinear Sagnac interferometer comprises: a first imaging lens, L1; a 50/50 beam splitter BS at the entrance of the ring interferometer; a ring interferometer with a path defined by the BS at the entrance port, a first mirror, M1, a NLO device as described in the present invention, a second mirror, M2, a variable delay line and the BS at the output port; a second lens L2; and a point detector or a electronic image detector; and a third mirror M3 used to direct the control optical pulse to overlap with the Fourier spectrum of the image plane at the NLO device.

According to a present embodiment, the Fourier transform imaging lens L1 is placed at a distance from the image plane $x_{image}$ defined by a solution to the lens equation $f_1^{-1}=x^{-1}_{image}+x^{-1}_{NLOdevice}$ and the constrain imposed by the total distance $x_{image}+x_{NLOdevice}=d$, where $f_1$ is the focal length of the lens L1, $x_{image}$ is the distance from the lens to the image plane and $x_{NLOdevice}$ is the distance from the lens to the NLO device defined by the path going from L1 to BS to M1 to NLO device, and d is the total distance between the image plane and the NLO device. Solutions to the quadratic equation are given by $x_{image}=(d/2)\pm[(d/2)^2-f_1 d]^{1/2}$.

Similarly, L2 is placed at a distance $x_{detector}=(d'/2)\pm[(d'/2)^2-f_2 d']^{1/2}$ from the detector. Here d' the distance from the electronic image detector to the NLO device and $f_2$ is the focal length of the second lens. Note that the image plane can be at infinity and that the size of the control beam is typically adjusted to overfill the Fourier spectra of the image at the NLO device. This configuration can be used as an ultrafast framing camera or to produce a pulse shaping device that could be used for laser manufacturing or other applications.

Nonlinear Sagnac Interferometer with Intraloop Fourier Lenses

Figure 25:
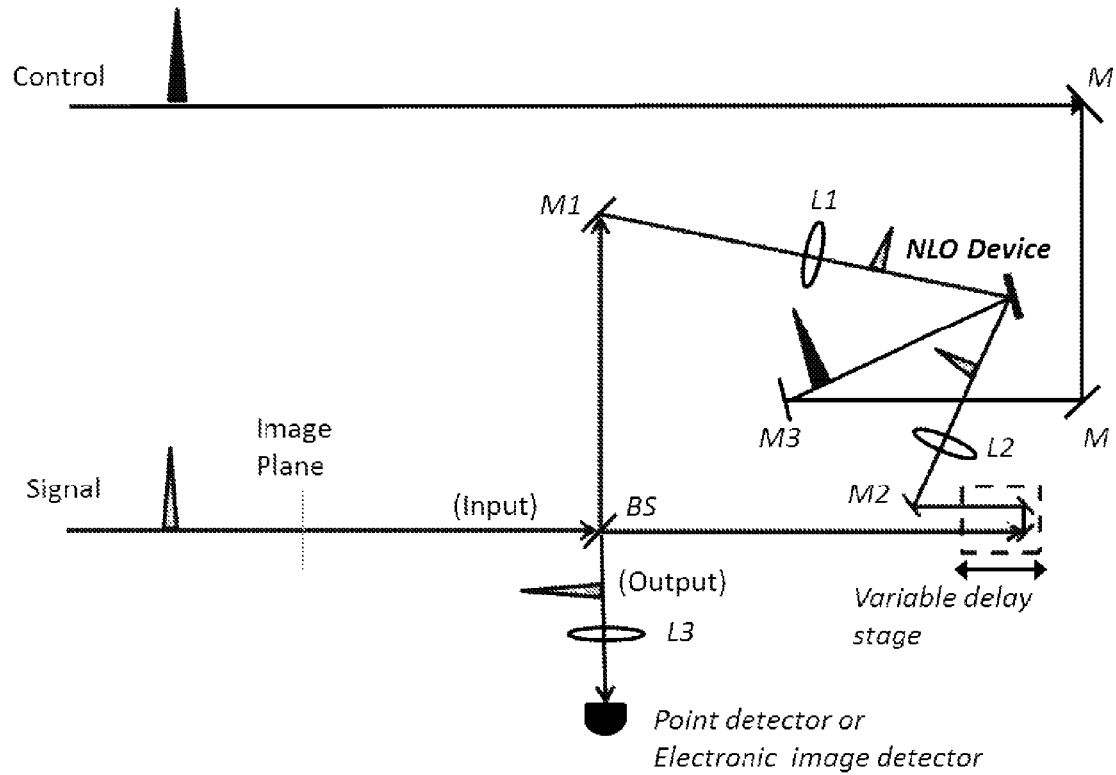
FIG. 25: Schematics of 4f Nonlinear Sagnac Interferometer with Intraloop Fourier Lenses. L represent a lens, M represent a mirror, and BS is a 50/50 beam splitter.

FIG. 25 provides an example of a preferred embodiment according to the present invention wherein the ultra high-speed framing camera comprises: a 50/50 beam splitter BS at the entrance of the ring interferometer; a ring interferometer with a path defined by the BS at the entrance port, a first mirror, M1, a first imaging lens, L1, a NLO device, a second imaging lens, L2, a second mirror, M2, a variable delay line and the BS at the output port; a second lens L3; and an electronic image detector; and a third mirror M3 used to direct the control optical pulse to overlap with the Fourier spectrum of the image plane at the NLO device. The two imaging lenses have a focal distance f.

According to a present embodiment, the Fourier transform imaging lenses L1 and L2 are placed at the same distance $x_{NLOdevice}$ from the NLO device defined by a solution to the lens equation: $f^{-1}=x^{-1}_{image}+x^{-1}_{NLOdevice}$ and the constrain imposed by the total distance $x_{image}+x_{NLOdevice}=d$, where f is the focal length of the lens, $x_{image}$ is the distance from the lens to the image plane and $x_{NLOdevice}$ is the distance from the lens to the NLO device defined by the path going from L1 to BS to M1 to NLO device, and d is the total distance between the image plane and the NLO device. Solutions to the quadratic equation are given by $x_{NLOdevice}=(d/2)\pm[(d/2)^2-fd]^{1/2}$. L3 is placed at a distance $x_{detector}=(d'/2)\pm[(d'/2)^2-f_3\,d']^{1/2}$ from the detector. Here d' the distance from the electronic image detector to the front focal plane of lenses L1 or L2 and $f_3$ is the focal length of the third lens. Note that the image plane can be at infinity and that the size of the control beam is typically adjusted to overfill the Fourier spectra of the image at the NLO device. This configuration can be used as an ultrafast framing camera or to produce a pulse shaping device that could be used for laser manufacturing or other applications.

Figure 26:
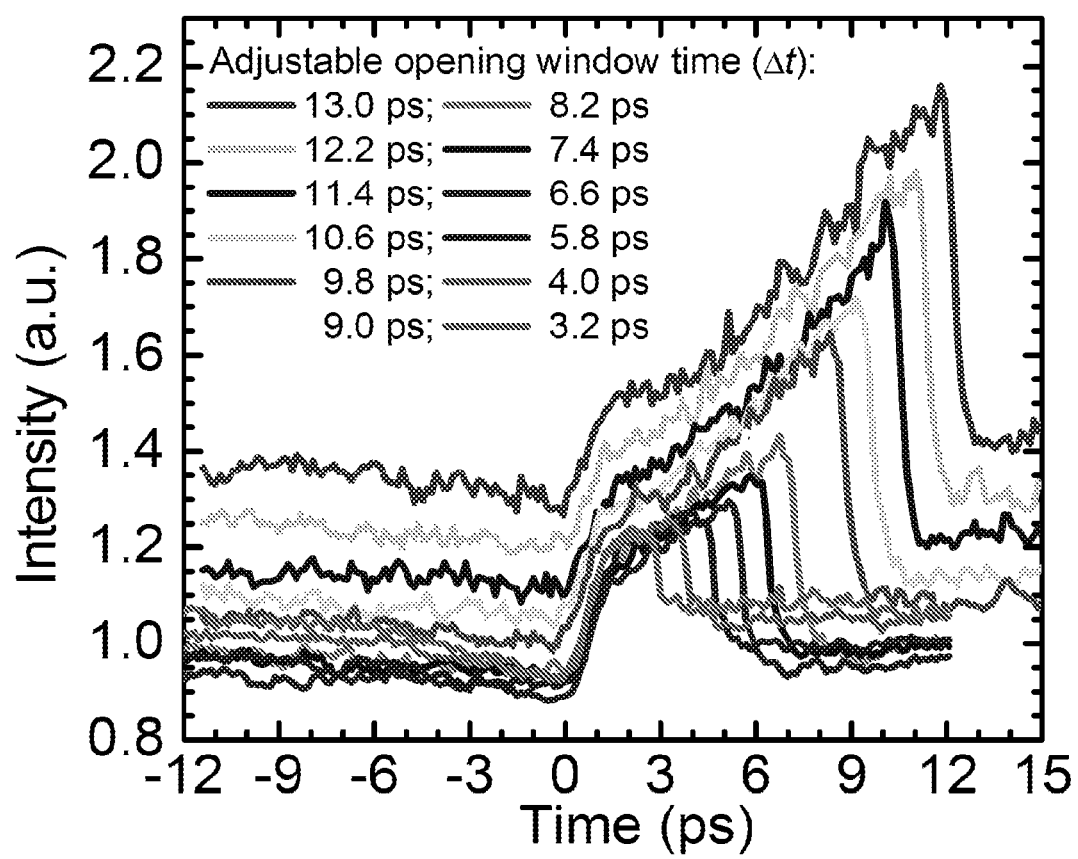
FIG. 26: Temporal evolution of the transmitted intensity captured with the image camera setup demonstrating temporally tunable shutter operation.

FIG. 26 displays the temporal response of the 4f Nonlinear Sagnac Interferometer with Intraloop Fourier Lenses for the special case where the input beam is collimated.

Another Exemplary Nonlinear Sagnac Interferometer

Figure 27:
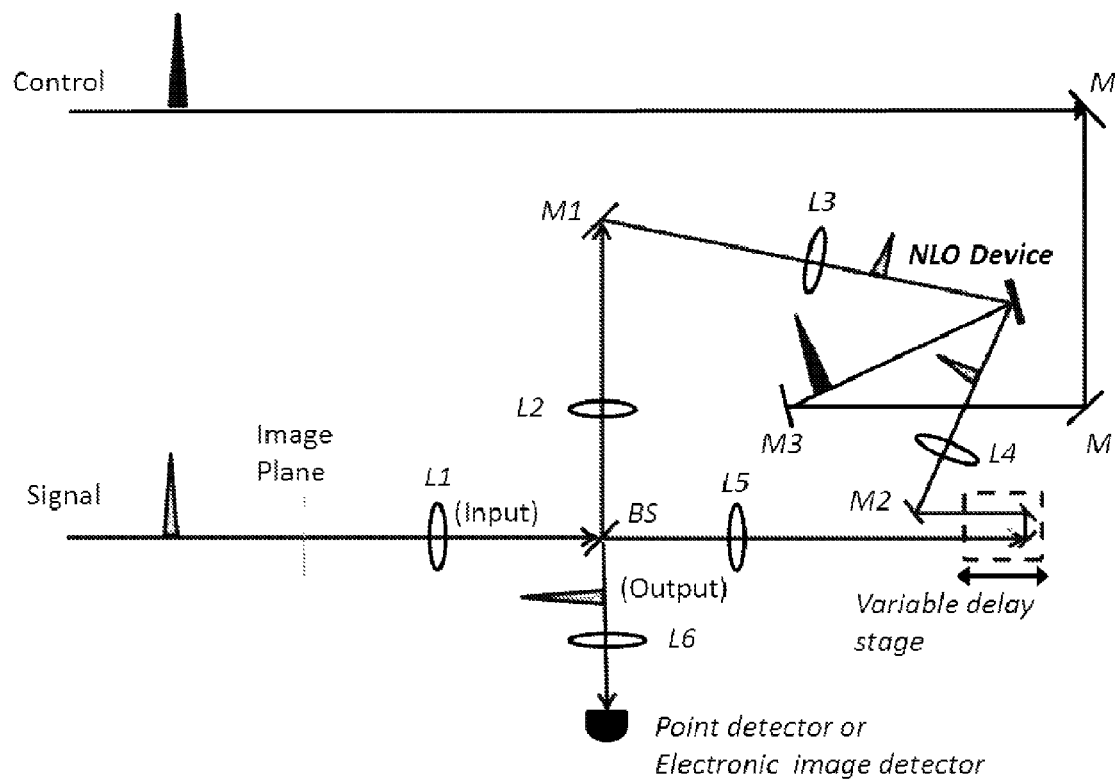
FIG. 27: Schematics of an ultra high-speed camera setup. L represent a lens, M represent a mirror, and BS is a 50/50 beam splitter.

FIG. 27 provides an example of a preferred embodiment according to the present invention wherein a 12-f Nonlinear Sagnac Interferometer comprises: a first imaging lens, L1; a 50/50 beam splitter BS at the entrance of the ring interferometer; a ring interferometer with a path defined by the BS at the entrance port, a second lens, L2, a first mirror, M1, a third lens, L3, a NLO device, a fourth lens, L4, a second mirror, M2, a variable delay line, a fifth lens, L5, and the BS at the output port; a six lens L6; and an point detector or electronic image detector; and a third mirror M3 used to direct the control optical pulse to overlap with the Fourier spectrum of the image plane at the NLO device. Note that the image plane can be at infinity and that the size of the control beam is typically adjusted to overfill the Fourier spectra of the image at the NLO device. This configuration can be used as an ultrafast framing camera or to produce a pulse shaping device that could be used for laser manufacturing or other applications.

According to the present embodiment, lenses L1, L2, L3, L4, L5 and L6 are disposed in a 12f optical imaging system array wherein Li and L(i+1) are separated by a distance $f_i+f_{i+1}$ and $f_2=f_4$ and $f_3=f_5$ to conserve the magnification of both optical pulses traveling in opposite directions along the ring resonator equal. Therefore the distance from the image plane to the electronic image detector plane is given by $d=2(f_1+2f_2+2f_5+f_6)$.

Figure 28:
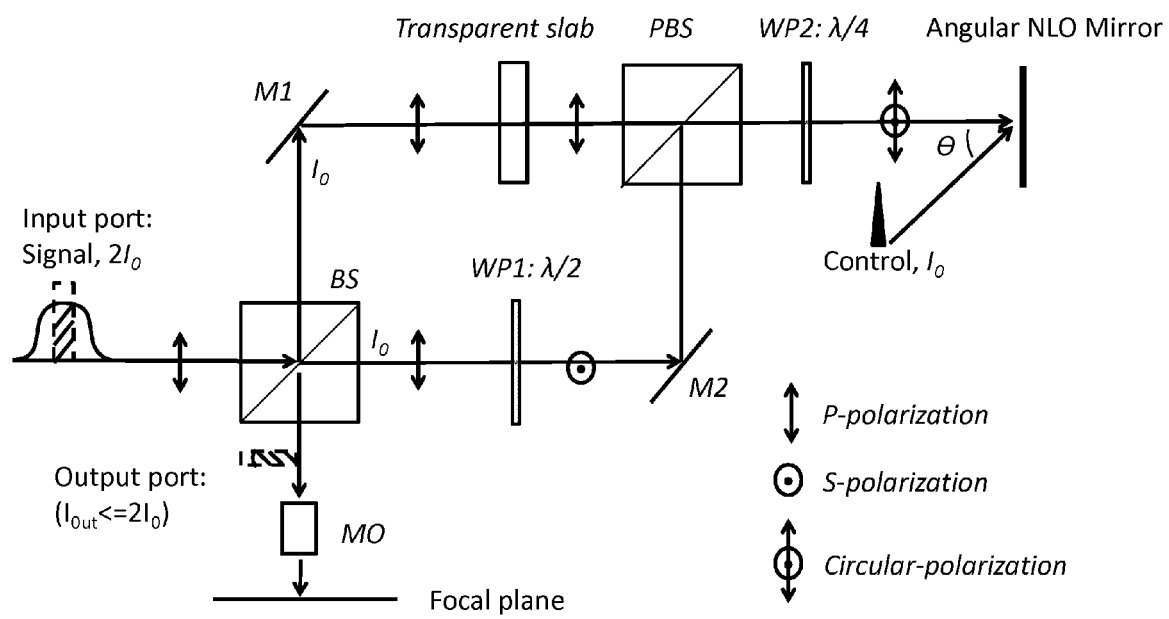
FIG. 28: Experimental setup of an all-optical shutter, where BS and PBS are the non-polarized and polarized beam splitters, respectively, WP1 is the half-wave plate, WP2 is the quarter-wave plate, M1 and M2 are silver mirrors, the Angular NLO Mirror is the nonlinear optical device and the transparent slab is a slab of a transparent material; The corresponding polarizations in the light path are labeled in the figure as P-polarization, S-polarization, and Circular-polarization. A signal pulse incident from the input port with a peak irradiance of $2I_0$ and a control pulse injects on the Angular NLO Mirror with a peak irradiance of $I_0$ at the incidence angle of θ. The sampled signal pulse transmits to the output port with a peak irradiance of $I_{out}$, and then is focused by a microscope objective (MO) or a lens.

Ultrafast all-Optical Shutter with a Polarized Beam Splitter and a Transparent Slab Another embodiment of the present invention includes an ultrafast all-optical shutter, as described in FIG. 28, comprising a 50:50 non-polarized beam splitter (BS) and a polarized beam splitter (PBS); two wave plates: a half-wave plate (WP1) and a quarter-wave plate (WP2); two silver mirrors: M1 and M2; a nonlinear optical (NLO) device: Angular NLO mirror; and a linear optical element comprising a slab of a transparent material (transparent slab). In this configuration a first and a second signal optical pulse impinge upon the Angular NLO Mirror at normal incidence, while the control optical pulse impinges on it at an angle of incidence θ The Angular NLO Mirror is designed to present a high linear reflectance at normal incidence and a low linear reflectance (high linear absorptance) at the angle of incidence θ The high linear absorptance of the control pulse drives the strong thermal nonlinearity of the Angular NLO Mirror and produces a strong change of the reflectance at normal incidence. The choice of wavelengths and incidence angles for the signal and control pulses is arbitrary and can be engineered when designing the Angular NLO Mirror.

The optical path length introduced by the transparent slab is defined as the product of the effective thickness traveled by and optical pulse and its refractive index. This optical path length defines the adjustable sampling window of the shutter. The sampling window can be adjusted by rotating the transparent slab or by increasing its thickness and controlled down to a few nanometers or, equivalently, down to a few fs. Note that this setup can be used to produce a pulse shaping of an ultrafast optical pulse by controlling the shape and size or the opening window. Such device could find applications in the processing of materials.

Figure 29:
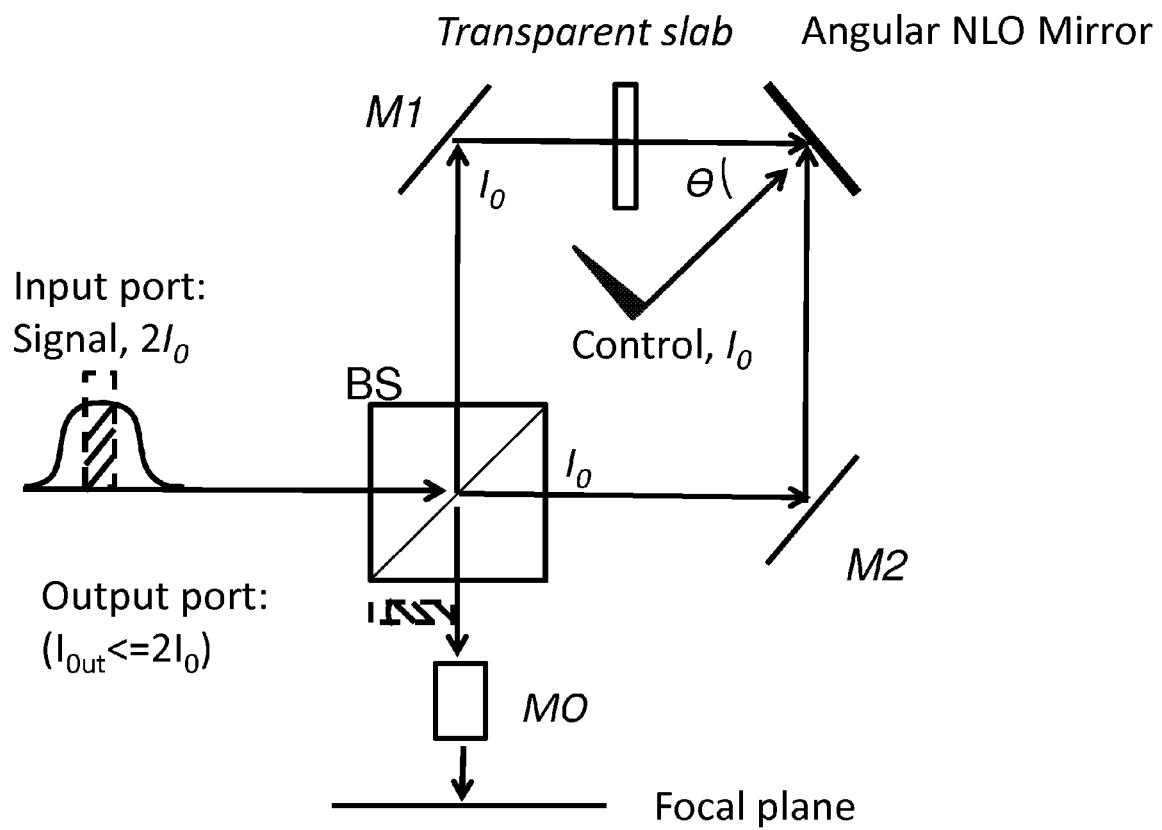
FIG. 29: Experimental setup of an all-optical shutter, where BS is the non-polarized beam splitters, M1 and M2 are silver mirrors, the Angular NLO Mirror is the nonlinear optical device and the transparent slab is a slab of a transparent material; A signal pulse incident from the input port with a peak irradiance of $2I_0$ and a control pulse injects on the Angular NLO Mirror with a peak irradiance of $I_0$ at the incidence angle of θ. The sampled signal pulse transmits to the output port with a peak irradiance of $I_{out}$, and then is focused by a microscope objective (MO) or lens.

Ultrafast all-Optical Shutter with Non-Polarized Beam Splitter and a Transparent Slab In another embodiment of the present invention the ultrafast all-optical shutter has an optical layout of FIG. 29 comprising a 50:50 non-polarized beam splitter (BS), two silver mirrors: M1 and M2; a nonlinear optical (NLO) device: Angular NLO mirror; and a linear optical element comprising a slab of a transparent material (transparent slab). In this configuration a first and a second signal optical pulse impinge upon the Angular NLO Mirror at ±450, while the control optical pulse impinges on it at normal incidence. The Angular NLO Mirror is designed to present a high linear reflectance at ±45° and a low linear reflectance (high linear absorptance) at normal incidence. The high linear absorptance of the control pulse drives the strong thermal nonlinearity of the Angular NLO Mirror and produces a strong change of the reflectance at ±450. The choice of wavelengths for the signal and control pulses can be engineered when designing the Angular NLO Mirror. Note that this setup can be used to produce a pulse shaping of an ultrafast optical pulse by controlling the shape and size or the opening window. Such device could find applications in the processing of materials.

Ultrafast all-Optical Shutter with a Diffractive Optical Element

Figure 30:
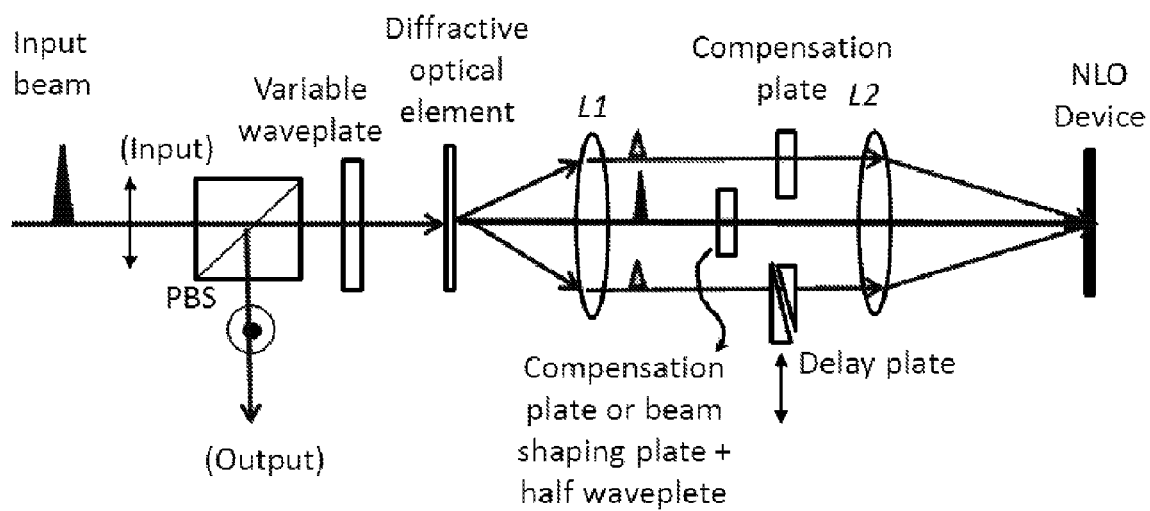
FIG. 30: Experimental setup of an ultrafast all-optical shutter with a diffractive optical element.
Figure 31:
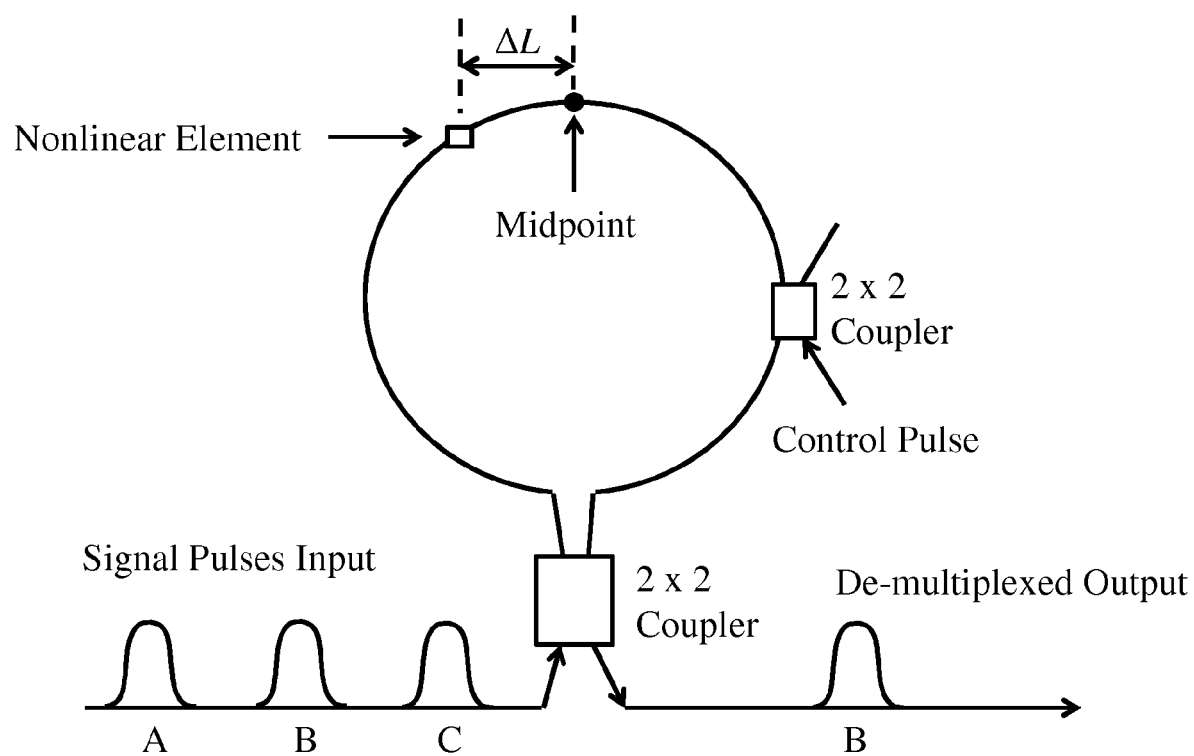
FIG. 31: The general configuration of the terahertz optical asymmetric de-multiplexer (TOAD).

FIG. 30 provides an example of a preferred embodiment according to the present invention wherein an ultrafast all-optical shutter comprises: a polarizing beam splitter PBS, a variable waveplate, a diffractive optical element splitting the input beam into three beam, a zero-order beam and two first order beams, a first lens L1; a delay plate; a compensating plate in another arm and a compensation plate in the other arm or a beam shaping plate in addition to a half-waveplate to rotate the polarization of this beam in order to avoid exiting at the output port; a second lens, L2, a NLO device. In this configuration at the power of at least one of the diffracted beams is larger than the other two, either by design of the diffractive optical element or by attenuating the beams with the compensation plates. The diffractive optical element is placed at the front focal plane of the lens L1 and the distance between L1 and L2 is $f_1+f_2$, where $f_i$ are the focal length of the lenses. The compensation plates are used to assure equal arrival time of at least two pulses at the NLO device plane, the temporal delay of the third pulse is controlled by a variable delay line in the form a transparent slab that is thicker or thinner than the compensation plate or preferably two sliding wedges wherein the total thickness is varied to control the temporal delay. A variable waveplate is used to rotate the polarization of the reflected beams to make it perpendicular to the polarization of the input beam. This configuration can be modified to conduct optical imaging A Further Exemplary Ultrafast all-Optical Shutter General Timing Mechanism and Setup The present ultrafast all-optical shutter adopts a timing mechanism derived from a known terahertz optical asymmetric demultiplexer (TOAD). FIG. 31 shows the TOAD configuration comprising a fiber loop with a first 2×2 coupler. The first coupler is used for introducing a series of signal pulses. On the other hand, the second intra-loop 2×2 coupler is used for introducing a control pulse to optically pump a nonlinear optical element. The position of the nonlinear optical element is offset from the midpoint of the loop by a distance ($\Delta L$) defined as an optical path length. The TOAD architecture uses the off-center position of the nonlinear optical element to determine an adjustable sampling window ($\Delta t$). The duration of $\Delta t$ can be further calculated by the following equation:

$$\Delta t = \frac{2\Delta L}{c} \text{ and } \tau_{rise} < \Delta t \quad (8)$$
$$\tau_{fall}$$

where c is the speed of light, $\tau_{rise}$ is the turn-on time of the nonlinearity of the nonlinear optical element, and $\tau_{fall}$ is the relaxation time of the nonlinearity. The pre-set $\Delta t$ determines which of the signal pulses would be affected and let through the output port. FIG. 31 illustrates that three signal pulses enter at the input port: A, B, and C. The de-multiplexer lets the pulse B pass only based on the adjustable sampling window ($\Delta t$).

Figure 39:
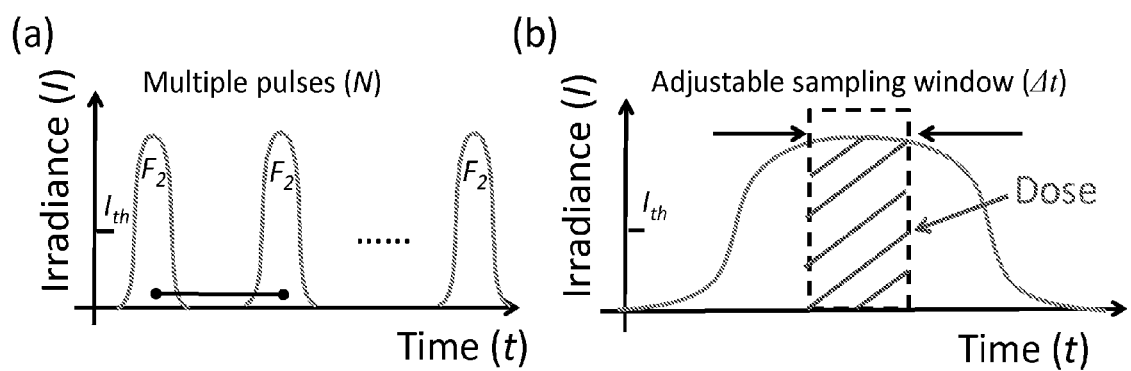
FIG. 39: Two different surgical operations are illustrated in (a) and (b), where (a) is the conventional dose control by the counting number (N) of multiple pulses incidence and (b) is the new dose control by sampling a single nanosecond pulse by the ultrafast all-optical shutter with an adjustable sampling window (Δτ).

An object of the present invention is to use a similar timing mechanism as used in TOAD, adopts it for the desired function of the ultrafast all-optical shutter as shown in FIG. 39(b), and disclosed in the ultrafast all-optical shutter embodiments in detail. The timing mechanism is formulated in Eq. 8 and shows that an adjustable sampling window $\Delta t$ can be set by choosing $\Delta L$. For instance, the offset introduced by inserting a 0.5 mm-thick glass slab with a refractive index value of 1.5 results in an adjustable sampling window of $\Delta t=2\cdot(0.5 \text{ mm}\cdot 1.5)/c=6$ ps.

Other timing configurations could also be used to define an adjustable sampling window ($\Delta t$) in the ultrafast all-optical shutter, such as colliding-pulse Mach-Zehnder (CPMZ) and symmetric Mach-Zehnder (SMZ). All these architectures have been developed as all-optical interferometric switches, mainly, for high bandwidth de-multiplexing in telecommunication signals. Otherwise, these architectures have not been exploited for all-optical control at visible wavelengths due to the limited number of materials having a large nonlinear optical response in the visible spectral region.

Figure 32:
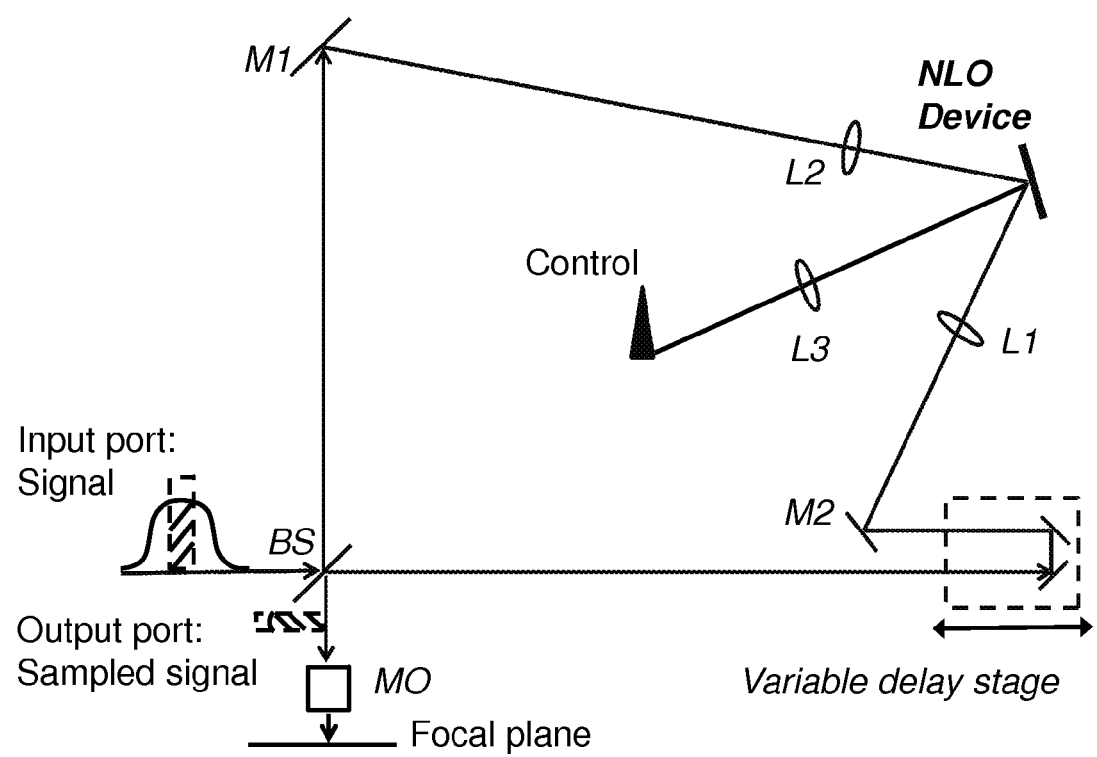
FIG. 32: Experimental setup of an ultrafast all-optical shutter, where BS is the non-polarized beam splitters, M1 and M2 are silver mirrors, the NLO Device is a nonlinear optical device (Narrowband NLO Device described in Section 3.2), L1, L2, and L3 are lenses and variable delay stage is an optical delay line; A signal pulse incident from the input port and a control pulse injects on the Narrowband NLO Device at normal incidence. The temporally sampled signal pulse transmits to the output port, and then is focused by a microscope objective (MO) down to the focal plane and causes non-thermal ablations.

FIG. 32 shows an experimental setup of the ultrafast all-optical shutter, where the nonlinear optical element is a narrowband NLO device, and the nonlinear optical device discussed previously. An optical delay line (variable delay stage shown in FIG. 32) comprising a translation stage with a retro-reflector is used to define $\Delta L$, and consequently $\Delta t$. The resolution of the $\Delta L$, and consequently of $\Delta t$, can be can be precisely controlled down to a few tens of micrometers. Hence, $\Delta t$ is easily, and very accurately adjustable by varying the value of $\Delta L$ with a resolution up to hundreds of femtoseconds. The limitation to the minimum and maximum value of $\Delta t$ that can be used, as shown in Eq. 8, is the temporal response of the nonlinear optical element used. Pump-probe experiments presented in Section 3.2.5 show that the narrowband NLO device displays transient reflectance changes ($\Delta R$) with rising times on the order of $\tau_{rise}\sim 500$ fs and relaxation time in the rage of $\tau_{fall}>80$ ps, when optically pumped by a 60 fs half-width-1/e (HW 1/e) pulse with a peak irradiance 19 GW/cm$^2$ (see FIG. 18). Hence, it is expected that the ultrafast all-optical shutter will be broadly tunable with adjustable sampling windows from picosecond to femtosecond response times (500 fs<$\Delta t$<$\tau_{fall}$ where $\tau_{fall}>80$ ps).

The ultrafast all-optical shutter has an optical layout comprised of: a 50:50 non-polarized beam splitter (BS); two silver mirrors: M1 and M2; three lenses: L1 to L3; a nonlinear optical (NLO) device: narrowband NLO device; and a linear optical element comprising an optical delay line (variable delay stage) comprising a translation stage with a retro-reflector.

An optical loop (ring interferometer) is formed for a signal pulse through the use of a 50:50 non-polarized beam splitter (BS), two silver mirrors: M1 and M2, one nonlinear optical device: the narrowband NLO device, and an optical delay line: variable delay stage to introduce the adjustable sampling window of $\Delta t$. The variable delay stage offsets the narrowband NLO device from the midpoint of the loop by $\Delta L$. A signal pulse incident from the input port enters the loop and is firstly split into two pulses by the BS to create a clockwise propagating pulse and a counter-clockwise propagating pulse. For example, consider a clockwise propagating pulse: it reflects from BS into M1, and then focuses through L2 on the narrowband NLO device. The clockwise propagating pulse subsequently reflects off the narrowband NLO device, is then converted back to a collimated pulse by L1, reflects off M2, and transmits through a variable delay stage. Finally, the pulse transmits through BS, and returns to the input port.

Both clockwise and counter-clockwise propagating pulses experience exactly the same loop path only in a reversed direction. Hence, both signal pulses temporally overlap with each other at the output port. A lossless beam splitter gives a phase shift of $Ø_t$-$Ø_r$=90, where $Ø_t$ and $Ø_r$ are phases of transmitted and reflected light beams. In terms of the output port, two split signal pulses return and experience a $2Ø_r$+$Ø_{loop}$ and $2Ø_t$+$Ø_{loop}$ phase shift in clockwise and counter-clockwise direction, respectively, where $Ø_{loop}$ is the arbitrary phase shift given by the loop. The relative phase shift between recombined pulses is therefore $2Ø_t$-$2Ø_r$=180° and causes a completely destructive interference. Therefore, no signal pulse is allowed to transmit to the output port until the control pulse is present. In other words, the ultrafast all-optical shutter is closed by default. At the input port, both split signal pulses return with the same phase shift of $Ø_t$+$Ø_r$+$Ø_{loop}$, and make a completely constructive interference. The energy conservation law makes any incidence light at the input port be totally reflected, since the output port is closed by default. This type of loop was called a conventional "loop mirror".

FIGS. 33(a)-33(f) subsequently shows the propagation analysis of the above process by a spatially dependent irradiance profile (I(Z)). FIG. 33(a) initially shows the irradiance profile of the incidence signal pulse at a peak irradiance 2I₀ assuming a Gaussian profile. The BS then splits the incidence signal pulse into a clockwise and a counter-clockwise propagating pulse of equal peak irradiance I₀ and their irradiance profiles are overlapped as shown in FIG. 33(b). FIG. 33(c) shows that there is a temporal offset of Δt between two split signal pulses at the narrowband NLO device, because the clockwise propagating pulse travels an extra distance of ΔL introduced by the optical delay line compared to the counter-clockwise propagating pulse, as shown in FIG. 32. This Δt results in the clockwise propagating pulse arriving at the narrowband NLO device after the counter-clockwise propagating pulse. However, FIG. 33(d) shows that the irradiance profile of two split signal pulses temporally overlap after the two pulses travel the whole loop in a reversed direction and recombine at the BS as shown in FIG. 32. Both clockwise and counter-clockwise propagating pulses pass through the optical delay line once. Finally, FIG. 33(e) shows completely constructive interference of two recombined signal pulses at the input port and FIG. 33(f) shows a completely destructive interference at the output port.

When a control pulse is introduced in the setup, as shown in FIG. 32, it excites the narrowband NLO device at the time point t₀ as shown in FIG. 34(a). This excitation induces a strong transient reflectance coefficient change (including amplitude and phase modulations) which are symbolized in a temporally dependent function of complex amplitude (A(t)), shown in FIG. 34(b) and shaded. The nonlinear optical response of the narrowband NLO device presents a fast rising time and a slow relaxation time upon being illuminated by a control optical pulse. For instance, a 60 fs control pulse should present a fast rising time less than 500 fs and a slow relaxation time about several tens of ps. The preliminary experiments of the ultrafast all-optical shutter using a 60 fs control pulse will be later introduced in details.

Figure 34:
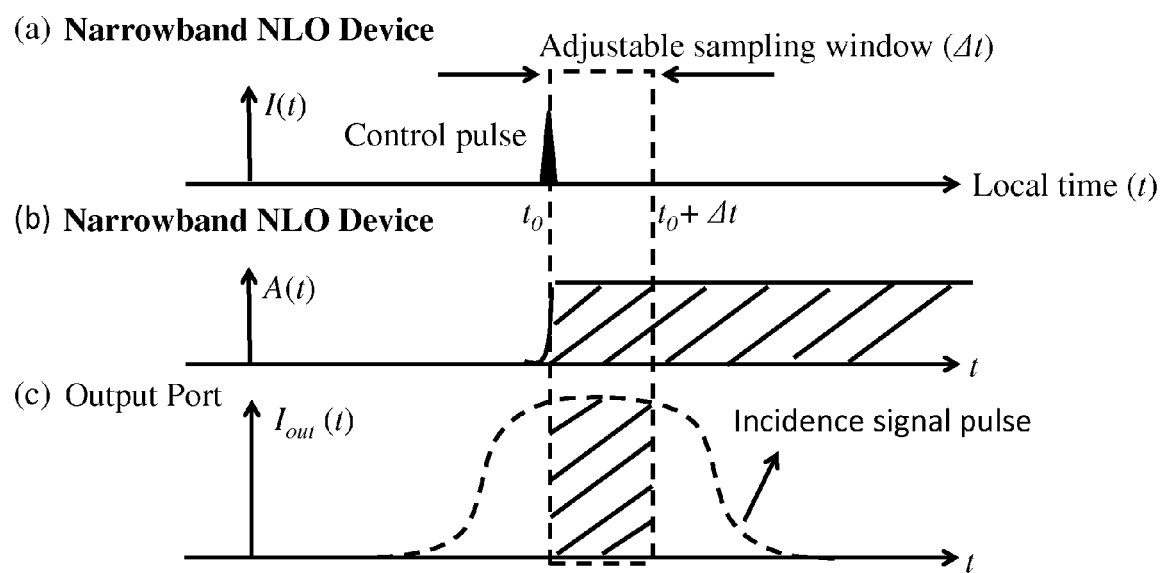
FIG. 34: The temporal analysis of (a) irradiance profile (I(t)) of the control pulse, (b) the complex amplitude modulation (A(t)) for the transient reflectance coefficient of the Narrowband NLO Device, and (c) the irradiance profile (Iout(t)) of the signal pulse sampled at the output port. The shaded area represents the sampled portion which has experienced A(t). The local time (t) is with respect to the position.

The local time (t) of FIG. 34 is with respect to the position. FIG. 34(c) shows the irradiance profile ($I_{out}(t)$) at the output port. The ultrafast all-optical shutter therefore opens during the adjustable sampling window (Δt) and closes outside the window. The detailed temporal analysis will be discussed later. During this period the ultrafast all-optical shutter remains open, leading to an output irradiance profile of $I_{out}(t)$, shown in FIG. 34(c) (filled area). The peak output irradiance of $I_{out}(t)$ can be calculated by following a basic interferometric equation:

$$\frac{I_{out}}{I_{in}} = \frac{1}{4}\{R_1 + R_2 - 2\sqrt{R_1 R_2} \cos(\phi_1 - \phi_2)\} \quad (9)$$

where the input signal pulse has the peak input irradiance of $I_{in}$, the output signal pulse has the peak output irradiance of $I_{out}$, the transient reflectance ($R_{1,2}$) and transient phase shift ($\emptyset_{1,2}$) when signal pulses transverse the narrowband NLO device, and subscripts 1 and 2 denote a clockwise and counter-clockwise propagating signal pulse, respectively. Therefore, in the absence of a control optical pulse, the relative phase shift between said first and second signal optical pulses is $\emptyset_1 - \emptyset_2 = 2\emptyset_t - 2\emptyset_r = 180°$, causing a complete destructive interference at the output port of the ring interferometer. In the absence of a control optical pulse, the ultrafast all-optical shutter is closed by default.

Figure 33:
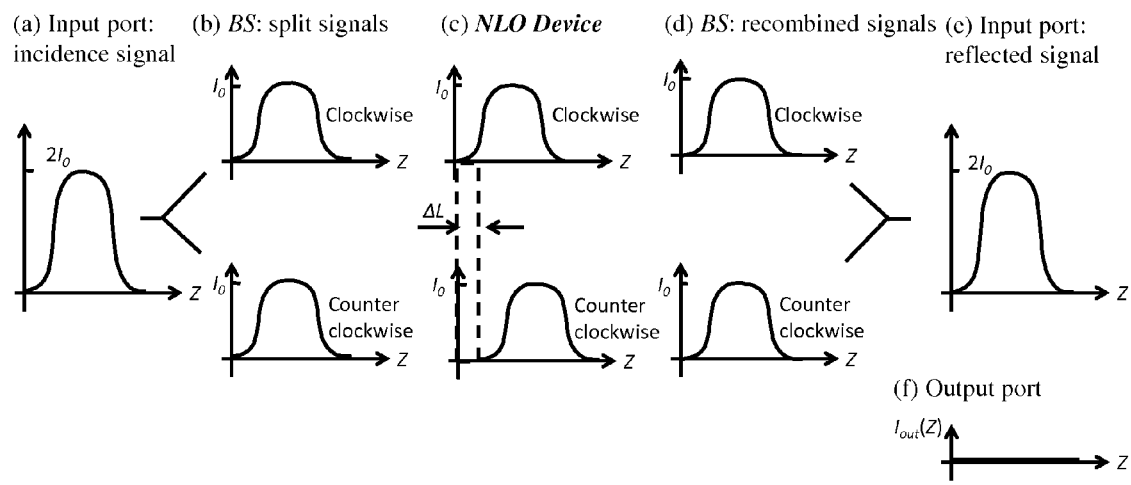
FIG. 33: The propagation analysis of the signal pulse with a spatially dependent irradiance profile (I (Z)) of (a) the incidence signal at the input port, (b) two split signals (clockwise and counter-clockwise propagating pulses) at the BS, (c) two split signals at the nonlinear optical device, (d) two recombined signals back to the BS, (e) the reflected signal at the input port, and (f) the signal at the output port, where Z is the local position, ΔL defines the adjustable sampling window Δt, and 2I0 and I0 are the peak irradiance of the incidence signal before and after split, respectively.
Figure 35:
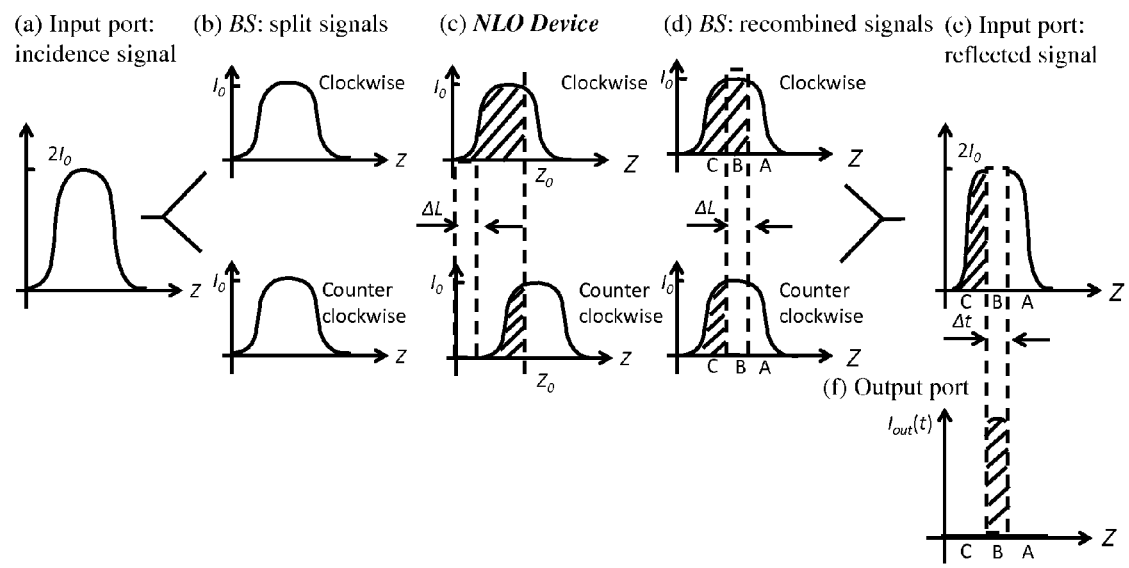
FIG. 35: The propagation analysis of the signal pulse with a spatially dependent irradiance profile (I(Z)) of (a) the incidence signal at the input port, (b) two split signals (clockwise and counter-clockwise propagating pulses) at the BS, (c) two split signals at the nonlinear optical device, (d) two recombined signals back to the BS, (e) the reflected signal at the input port, and (f) the sampled signal pulse at the output port, where Z is the local position, ΔL defines the adjustable sampling window of Δt, and 2I0 and I0 are peak irradiances of the incidence signal before and after split, respectively.

In the following part, the propagation analysis when the control pulse is introduced will be explained in detail. The propagation evolution with a control pulse follows exactly that of the case without the control pulse, as shown in FIG. 33. However, the narrowband NLO device is now excited by the control pulse at the position Z₀ and causes nonlinear modulations defined by A(t) as shown in FIG. 34(b). Hereafter, the portion of the signal pulse which experiences A(t) will be shaded, as shown in FIG. 35. The clockwise propagating pulse arrives at the narrowband NLO device behind the counter-clockwise propagating pulse as shown in FIG. 35(c). Consequently the clockwise propagating pulse experiences a longer period of modulations, defined by Δt, than the counter-clockwise propagating pulse as shown in FIG. 35(c). FIG. 35(d) shows that at the output port, the irradiance profiles of these signal pulses overlap, as initially shown in FIG. 35(b); since the two pulses travel the same loop path just in a reversed direction and recombine at the BS as shown in FIG. 32.

For illustration convenience, FIG. 35(d) shows that both recombined signal pulses are decomposed into three subsequent parts: A, B, and C. FIG. 35(d) shows both recombined signal pulses are symmetrically un-modulated for the part A and symmetrically modulated for the part C. This leads to a completely destructive interference both in the part A and C which results in zero irradiance at the output port. Hence, the ultrafast all-optical shutter closes in the part A and part C with no signal pulses transmitted. Finally, FIG. 35(d) shows only the part B of the recombined signal pulses, which is anti-symmetrically modulated. It is modulated for the clockwise propagating pulse but un-modulated for the counter-clockwise propagating pulse. The part B of recombined signal pulse at the output port undergoes a constructive interference, thus producing an output. Therefore, FIG. 35(f) shows that the ultrafast all-optical shutter opens only in the part B. The duration of the part B matches with the adjustable sampling window Δt.

Temporal-Scan Experiments

The ultrafast all-optical shutter is designed to provide an ultrafast timing mechanism, with opening and closing times on the order of several hundreds of fs to ps, the adjustable opening window (adjustable sampling window as shown in FIG. 34) is easily pre-set and adjusted by varying the optical delay within the ring interferometer.

Figure 36:
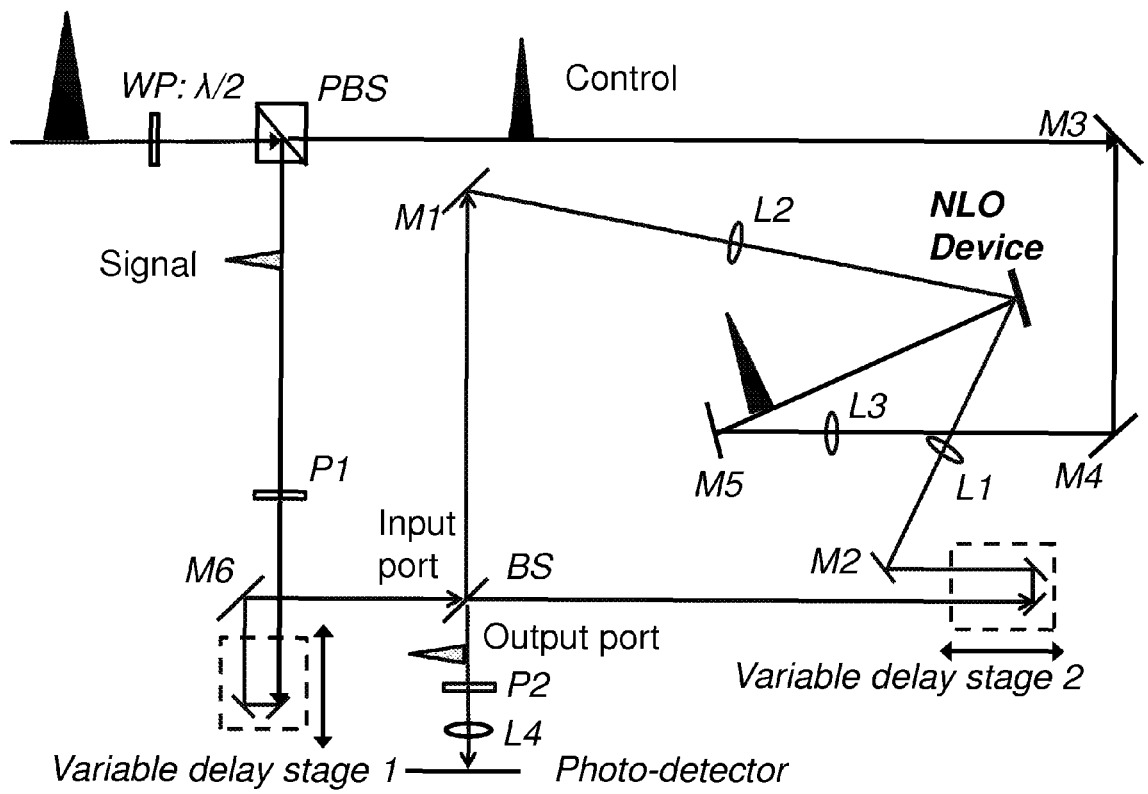
FIG. 36: Temporal-scan experiment of an ultrafast all-optical shutter to temporally scan its impulse response and measure the temporal profile of its adjustable opening window, where BS and PBS are the non-polarized and polarized beam splitters, respectively, WP is the half-wave plate, P1 and P2 are polarizers, M1 to M6 are silver mirrors, the NLO Device is a nonlinear optical device (Narrowband NLO Device described in Section 3.2), L1 to L4 are lenses, and Variable delay stage 1 and Variable delay stage 2 are optical delay lines; A femtosecond laser pulse is split into a high peak-irradiance control pulse and a low peak-irradiance signal pulse, where the control pulse injects on the NLO Device at normal incidence, the signal pulse incident from the input port, transmits to the output port, and then is focused down to the Photo-detector.

In this section, the dynamic of the ultrafast all-optical shutter will be characterized, and be described as an impulse response of an optical system. Here, a temporal-scan experiment is set up as shown in FIG. 36. The experiment is set to measure the impulse response of the ultrafast all-optical shutter. However, the impulse response can be widely used not only in simulating the sampling process, but also calculating a temporal response of shutter output with response to any control pulse with an arbitrary temporal profile by a convolution between the control pulse profile and the impulse response.

The impulse response as a function of time will be scanned in a time-resolved experiment as a proof-of-principle of the ultrafast all-optical shutter to show the temporal profile of its adjustable opening window. Ultrafast applications enable by this ultrafast all-optical shutter such as ultrafast photography, time-gated spectroscopy, and photoelectric effects with temporally shaped pulses, which will be further discussed hereinafter The temporal-scan experiment uses a femtosecond laser system, where its femtosecond laser pulse is obtained from an optical parametric amplifier (OperASolo, Coherent). A seed laser beam from a Ti:Sapphire regenerative amplifier (Libra, Coherent) operating at the wavelength of 800 nm generates a femtosecond pulse through the OperASolo, and the wavelength of the femtosecond pulse can be tuned within the visible spectra range. The femtosecond pulse has a temporal pulse width of 100 fs half-width-1/e (HW 1/e).

FIG. 36 shows that the temporal-scan experiment of the ultrafast all-optical shutter has an optical layout comprised of: polarized and 50:50 non-polarized beam splitter: PBS and BS; five silver mirrors: M1 to M6; four lenses: L1 to L4; a nonlinear optical (NLO) device: narrowband NLO device; and two optical delay line: Variable delay stage1 and Variable delay stage2, comprising a translation stage with a retro-reflector, where Variable delay stage1 and Variable delay stage2 uses a computer-controlled motorized translation stage and non-motorized translation stage, respectively.

In this configuration, a single femtosecond laser pulse at the wavelength of 594 nm is split into a strong control pulse and a weak signal pulse with a peak irradiance of 123 and 0.35 GW/cm$^2$ measured at the position of the narrowband NLO device, respectively, after passing through WP and PBS. The polarization angle of WP is adjusted to maximize the peak irradiance of a control pulse, leading to optimize the excitation of the narrowband NLO device at the normal incidence, and consequently optimize the operation of the ultrafast all-optical shutter. The control pulse was tuned to a spot size of 190 μm (HW 1/e) at the position of the narrowband NLO device, measured using a knife-edge scan. The signal pulse had a spot size of 100 μm (HW 1/e) at the same position.

The signal pulse passes through the Variable delay stage1, which introduces a variable optical path difference between the signal and control pulse, resulting in a time delay between two pulses. This Variable delay stage1 is gradually scanned through a series of offset positions, and the time-averaged output intensity I(t) of the ultrafast all-optical shutter recorded as a function of delay time (t) after averaging over one thousand signal pulses injecting from the input port of the ultrafast all-optical shutter and passing through the output port to the Photo-detector. Note that time-averaged output intensity I(t) can be sensitive to the jitter of laser intensity during acquisition time, so I(t) is calculated from measured time average output $I_{out}(t)$ by $I_{out}(t)/I_{ref}(t)$ to discriminate signal from noises originated from laser jitters itself, where $I_{ref}(t)$ is measured time-averaged reference intensity sampled out of the same optical setup.

The resolution of the motorized translation stage of Variable delay stage1, can be accurately controlled down to a few tens of micrometers. Hence, the time-resolved study from this temporal-scan experiment can therefore be up to a few hundreds of femtoseconds. In addition, FIG. 36 also shows that a signal pulse passing through the input and output port of a ring interferometer, where the propagation analysis has been explained in details in FIG. 32. In brief, a first and a second split signal optical pulse after BS impinge upon the narrowband NLO device at ±45, while the control optical pulse impinges on it at normal incidence. The narrowband NLO device is designed to present a high linear reflectance at ±45 and a low linear reflectance (high linear absorptance) at normal incidence. The high linear absorptance of the control pulse drives the strong thermal nonlinearity of the narrowband NLO device and produces a strong change of the reflectance at ±45°.

The second optical delay line: variable delay stage 2 introduces the adjustable opening window of Δt for the ultrafast all-optical shutter. When the variable delay stage 2 offsets the narrowband NLO device from the midpoint of the loop (ring interferometer) by ΔL, the adjustable opening window can consequently be preset by Δt. Although the general timing mechanism of the ultrafast all-optical shutter has been shown in the last section, the temporal-scan experiment here is used to scan the temporal profile of this adjustable opening window. Note that two polarizers P1 and P2 are added into the optical layout shown in FIG. 36, because it is found that varying the combination of polarization angles of P1 and P2 can further increase the signal-to-noise ratio measured by time-averaged output intensity I(t) of the ultrafast all-optical shutter.

Figure 37:
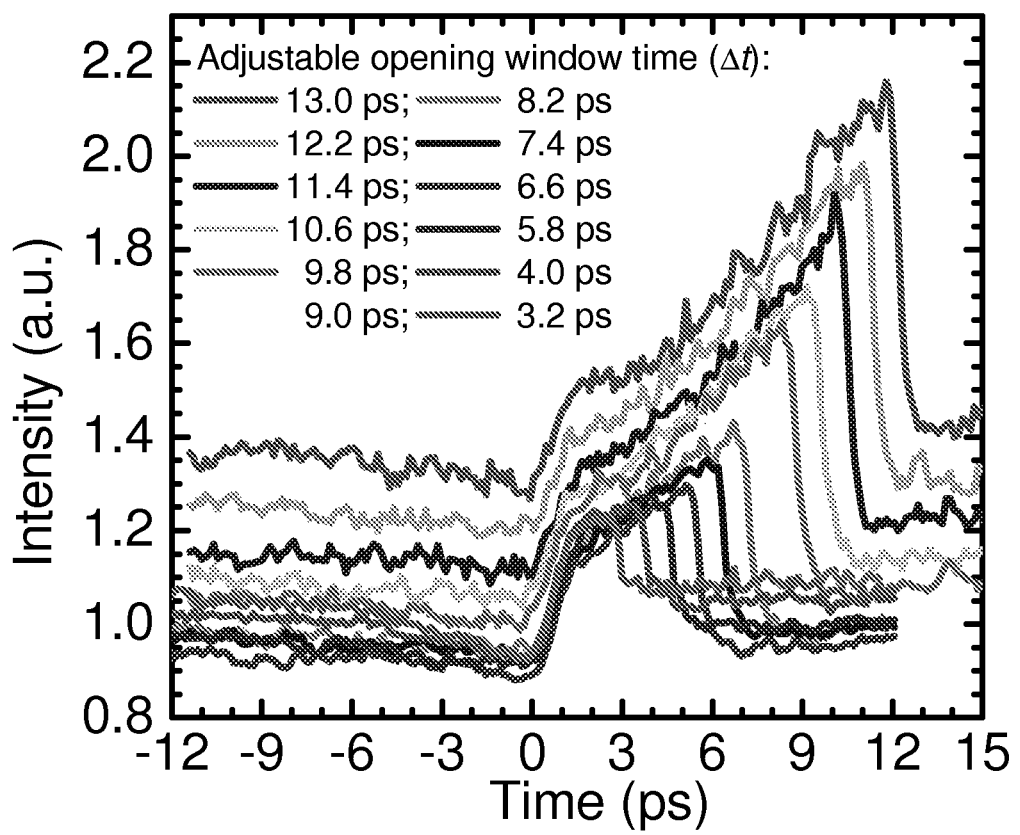
FIG. 37: Time-averaged output intensity I(t) of the ultrafast all-optical shutter versus time delay of the signal pulses with respect to the control pulses. This temporal-scan experiment measures a profile of the adjustable opening window opened by the control pulse between the input and output of the shutter. The figure shows 12 different settings of adjustable opening window (Δt) decreasing from 13 ps to 3.2 ps with a constant interval of 0.8 ps.

FIG. 37 shows the impulse response of the ultrafast all-optical shutter by measuring time-averaged output intensity I(t) with different time delays between a signal and control pulse. The shutter is opened between its input and output port by a femtosecond control pulse, and has a larger value of I(t) within the preset adjustable opening window compared to outside the opening window. The temporal-scan experiment scans the temporal shape of 12 different settings of adjustable opening windows varying from Δt=13 ps to 3.2 ps with a constant interval of 0.8 ps as shown in FIG. 37. The results show that all adjustable opening windows display a consistent temporal shape with a sharp rising edge and a sharp falling edge, both below 1 ps. The preset adjustable opening windows of Δt matches faithfully with the measured values as shown in FIG. 37. The adjustable window time is easily set, and is accurately controlled by the variable delay stage 2 as shown in FIG. 36, though the optical alignment of the optical delay line can still be further refined to keep values of I(t) be constant when the shutter closes.

It is interesting to note that values of I(t) changes exponentially, which is expected from the exponential decay of thermal nonlinearities of narrowband NLO device excited by a femtosecond laser pulse as shown in FIG. 18. In addition, the shape of opening time window should be tunable, for example, a flat-hat shape can be achieved through a slowly decayed relaxation of thermal nonlinearities either from saturated nonlinearities excited by a very high peak-irradiance control pulse as mentioned in previously or nonlinearities excited by a temporally shaped nanosecond control pulse with a fast rising time and a slow decay time.

Applications in Medical and Laser Manufacturing

A present challenge in laser manufactures and pulsed-laser surgeries is to achieve precisely all-optical control over high peak power signal pulses. In conventional all-optical control systems, a low intensity signal pulse is modulated in amplitude and/or phase by a high intensity control pulse through the NLO effects excited by the control pulse alone. On the other hand, the all-optical control of non-thermal ablation applications require a high peak-power signal pulse since it needs to have enough energy and power to ablate the targeted materials including tissues. To achieve such properties the linear and NLO properties need to be precisely engineered, so that the nonlinearity can be selectively driven by the control pulse even if the signal pulse also has a high peak power. The narrowband NLO device, with its extremely large and ultrafast NLO response, offers such unique all-optical control of intense pulses in the visible spectral range and is ideal to develop the present ultrafast all-optical shutter design.

The ultrafast all-optical shutter is present to sample a high peak-power nanosecond optical pulse with a wavelength in the visible spectral regions to produce a high peak-power picosecond or femtosecond optical pulse of the same wavelength. The potential impact of the shutter can enable high-repetition rate and low-cost nanosecond pulse laser systems to be used to produce femtosecond or picosecond laser pulses with properties that are well suited for the non-thermal ablation of materials.

Since an objective of the ultrafast all-optical shutter is to sample sub-nanosecond laser pulses from nanosecond laser pulses, the whole optical system should be integrated under a single nanosecond laser system to reduce capital costs. In this complete optical layout, the fast rising edge of a ns control optical pulse needs to be generated by passing a ns laser pulse through a slow saturable absorber, for example, an organic dye DODCI (3,3'-diethyloxadicarbocyanine iodide). The temporal shape of this ns control pulse can therefore match to excite the preferred temporal response of narrowband NLO device as shown in FIG. 34(b).

Figure 38:
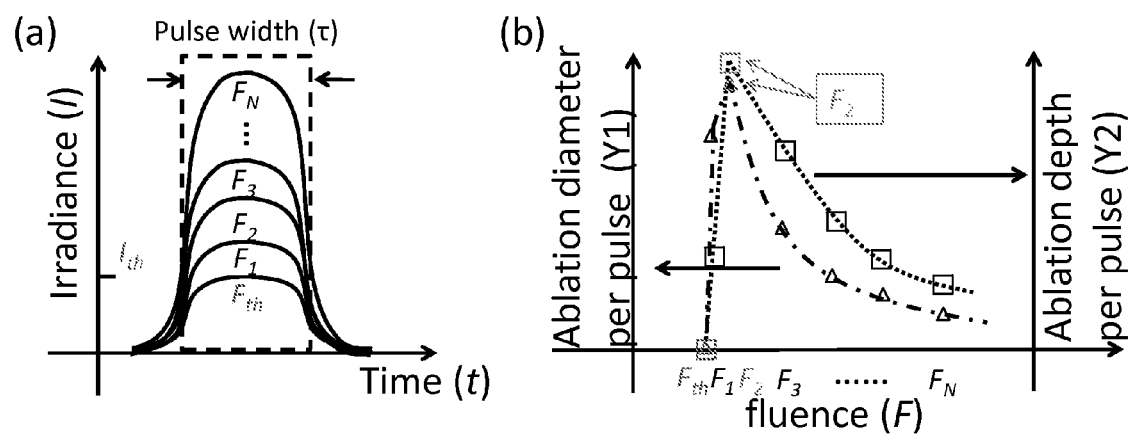
FIGS. 38: (a) and (b), a femtosecond pulsed-laser surgery study between (a) temporally dependent irradiance profiles (I(t)) of a single Gaussian pulse with different fluences per pulse (F) and (b) ablation diameter (Y1 axis on left and labeled by triangular symbols) and depth (Y2 axis on right and labeled in rectangular symbols) per pulse with different F.

The experimental study of femtosecond pulse surgeries on collagen gels and porcine corneas by others show that both vertical and horizontal precision of the ablated area can be improved, as well as control over cut diameters, depths, and volume removal rates, by selecting the right amount of laser fluence per pulse (F). FIG. 38(a) shows the temporally dependent irradiance profiles (I(t)) in a series of pulse fluence per pulse $F=F_{th}, F_1, F_2, F_3 \ldots F_N$. Each pulse profile of I(t) was experimentally confirmed to be close to a Gaussian pulse with similar temporal pulse width (r). These pulses can be described as below.

$$I(t) = I_{peak} \exp\left(-\left(\frac{t - t_{peak}}{\tau}\right)^2\right), \quad (10)$$

$$F = \int_{-\infty}^{\infty} I(t) dt = \int_{-\infty}^{\infty} I_{peak} \exp\left(-\frac{t - t_{peak}}{\tau}\right)^2 dt = I_{peak}(\tau\sqrt{\pi}),$$

where $I_{peak}$ is the peak irradiance, $t_{peak}$ is the time at which $I_{peak}$ is achieved. Equation 10 shows a relationship between F and $I_{peak}$ for any Gaussian pulse, and one set of $F_{th}$ and $I_{th}$ is labeled in FIG. 38(a).

FIG. 38(b) shows a relationship between the ablation diameter (Y1 axis on left) and depth (Y2 axis on right) per pulse for a set of pulses of varying fluences shown in FIG. 38(a) as reported by others. The ablation diameter and depth per pulse represent averages from measurements of multiple pulses, as illustrated in FIG. 39(a), and will be explained later. FIG. 38(b) shows there is a minimum fluence ($F_{th}$) for a single pulse to reach observable ablation. $F_{th}$ or $I_{th}$ is therefore the damage threshold for ablation and can be determined experimentally. The damage threshold of femtosecond pulsed ablation originates in the optical breakdown mechanism called multi-photon ionization. When simultaneous absorption of multi-photon occurs, they ionize seed electrons and then initiate a chain of ionization, also known as avalanche ionization. Since it requires a minimum number of photons to be simultaneously absorbed (six photons in case of tissues irradiated at the wavelength of 1053 nm), the correspondent damage threshold can be defined in $F_{th}$ or $I_{th}$. In addition, FIG. 38(b) also shows that both an ablation diameter and depth per pulse achieves a maximum point at a fluence per pulse of $F_2$; resulting in a maximum volume removal rate for ablation by a single pulse.

FIG. 39(a) exemplifies a conventional surgical operation requiring multiple pulses wherein the fluence per pulse (F) is set by adjusting a variable optical attenuator. $F_2$ is selected here to ablate the medium for the best volume removal rate. Then, a mechanical shutter lets through a variable number of pulses (N) to achieve the desired ablation volume after a total exposure fluence (dose) $F_{total}=N \cdot F_2$. The ablation diameter and depth after N pulses would be close to N times the ablation diameter and depth for a single pulse. The cut size can be accurately controlled by varying the numbers (N) of incident pulses. Note that to reduce a single cut time using this method one would have to increase the repetition rate of the used laser. However, laser systems with increased repetition rates tend to yield reducing energy per pulse, which results in decreasing fluence values below the damage threshold. Therefore, surgeries are typically conducted using laser with a relatively low repetition rate. For instance, dental surgeries theoretically require repetition rates less than f=380 kHz for a colliding pulse mode-locked dye laser and a dye amplifier (BESTEC, Berlin) with τ=300 fs, wavelength λ=615 nm to preserve a minimum pulse energy of 3 mJ. Otherwise, this laser system was practically operated at a much lower repetition rate for pulsed-laser surgery as f=3 Hz<<380 kHz to preserve enough energy per pulse. An ablation depth of healthy human dentine with a thickness of 16 μm is achieved after 100 pulses (F=2 Jcm$^{-2}$ per pulse). In this case, a mechanical shutter lets through 100 pulses with a repetition rate of 3 Hz, so the whole single-cut process takes 33 s.

Reducing the overall cutting time in surgeries is nonetheless attractive because it reduces the infection probability and pain of patients. A new dose control system is present here to reduce the single-cut time within the temporal pulse width of a single nanosecond pulse without losing the cut precision and controllability of femtosecond pulsed-laser ablation. The pulsed-laser in this new approach is replaced by a nanosecond laser, potentially reducing the capital equipment costs by avoiding the need of a more expensive femtosecond laser. FIG. 39(b) shows that this new dose-control method will be able to sample a slide out of a single nanosecond pulse and ablate tissues by this sampled portion of the laser pulse. This new dose-control enables non-thermal ablations with nanosecond lasers, because the duration of sampled portion of the laser pulse will be reduced down to picosecond to femtosecond region by this method.

In the present dose-control method, the total exposure fluence (dose) is now controlled by varying an adjustable sampling window (Δt) and can be written as $$F_{total} = \int_{t_0}^{t_0 + \Delta t} I(t) dt,$$

where $t_0$ is the beginning time of the sampling window. The present sampling process requires a shutter with an ultrafast temporal response, which mechanical and electrical shutters do not allow. Hence, this research aims to develop an ultrafast all-optical shutter which allows implementation of the newly invented dose-control scheme presented in FIG. 39(b), and wherein the adjustable sampling window, Δt, can be precisely and easily tuned to meet real-time feedback dose-control requirements for laser surgeries. The ultrafast all-optical shutter enables a dramatic reduction of surgical times and costs by allowing the use of less expensive nanosecond lasers emitting at visible wavelengths.

Consider a signal optical pulse, at 618 nm with a peak irradiance of $I_{in}$=100 GW/cm$^2$, entering the input port will be split into two pulses: a first signal optical pulse propagating in a clockwise direction and a second signal optical pulse propagating in a counter-clockwise direction with an equal peak irradiance of 50 GW/cm$^2$. At the narrowband NLO device both signal optical pulses will impinge at ±45° causing a reflectance change that is at least half of that caused by the control optical pulse. Simulations of the nonlinear response as shown previously of the narrowband NLO device indicate that the maximum reflectance change self-induced by a signal optical pulse on the narrowband NLO device is $\Delta R_2 = -17\%$. In contrast, the control pulse is expected to induce a maximum reflectance change of $\Delta R_1 = -47\%$, where the control optical pulse is injected at normal incidence, 570 nm, and with a peak irradiance of 50 GW/cm$^2$.

In the temporal region of interest wherein the amplitude and phase of the first and second signal pulses are different (Region B shown in FIG. 35), the relative phase-shift between the first and second signal optical pulses is $\emptyset_1 - \emptyset_2 = \Delta\emptyset_1 - \Delta\emptyset_2 - 0.278$(rad), and their total reflectance are $R_1 = R_0 + \Delta R_1 = 40\%$ and $R_2 = R_0 + \Delta R_2 = 70\%$, where $R_0 = 87\%$ is the linear reflectance. Using the values of $I_{in}$, $R_1$, $R_2$, and $\emptyset_1 - \emptyset_2$ in the interferometric Eq. 9, we calculate a peak output irradiance of $I_{out} = 2.1$ GW/cm$^2$ and a minimum fluence of 1 mJ/cm$^2$ assuming a 500 fs pulse width at the output port. If we reduce the area of the output optical pulse by a factor of a 1000, (i.e. using a microscope objective with a lens power higher than 33×) the peak irradiance (>1 TW/cm$^2$) and fluence (>1 J/cm$^2$) will be larger than the ablation threshold of a variety of metals, dielectrics, and biological materials.

Conclusion

The optical layout of the ultrafast all-optical shutter comprises a ring interferometer and a nonlinear optical device producing strong reflectance changes at visible wavelengths optically excited by a control pulse. The impulse response of the shutter is measured using a temporal-scan experiment. The ultrafast temporal response shows that the shutter opens and closes faster than 1 ps controlled by a femtosecond laser pulse, and the adjustable opening time of the shutter is easily and precisely preset between 3.2 ps to 12 ps with a constant interval of 0.8 ps.

Additional Exemplary Embodiments

Ultrafast optical applications using all-optical controls at visible wavelengths have been limited by the lack of materials and devices with a strong nonlinear optical (NLO) response. Noble metals are known to have extremely large and ultrafast NLO response at visible wavelengths, and their complex refractive index changes ($\Delta N = \Delta n + i\Delta k$) excited all-optically are orders-of-magnitude larger than can be found in other known NLO materials. For instance, a peak value of $\Delta N = 0.39 + i0.1$ at 545 nm has been extracted for a 23 nm-thick Au film pumped by a peak pulse irradiance of 13 GW/cm$^2$ (total fluence 16 J/m$^2$) and a pulse width of 60 fs. In the visible spectrum, other known NLO materials show much smaller values of $\Delta N$: at 532 nm polythiophene displays a $\Delta N = 9.9 \times 10^{-5}$ for a peak pulse irradiance of 7 GW/cm$^2$ (total fluence 2660 J/m$^2$) and a pulse width of 38 ps; at 576 nm CdS$_x$Se$_{1-x}$ semiconductor-doped glass display a $\Delta N = -3.8 \times 10^{-5}$ at a peak pulse irradiance of 12 GW/cm$^2$ (total fluence 240 J/m$^2$) and a pulse width of 2 ps; at 532 nm ZnSe displays a $\Delta N = -1.2 \times 10^{-4}$ for a peak pulse irradiance of 1 GW/cm$^2$ (total fluence 270 J/m$^2$) and a pulse width of 27 ps. Note that although a direct comparison is not easily made, regardless of the experimental conditions, the values of $\Delta N$ that can be achieved in noble metals such as Au, are significantly larger than the values reported in the literature.

However, the transmittance and reflectance changes provided by a single noble metal thin-film layer are still not strong enough compared to large amplitude and/or phase modulations of optical signals needed in all-optical control applications. In the present application, the research was divided into three parts to understand how the linear and NLO properties of these noble metal thin films can be engineered and optimized to overcome a wide variety of requirements in ultrafast optical applications.

First, the NLO properties of Au and Ag/Au bilayer metallic thin films are described as an ultrafast electron and lattice heating process using comprehensive physical models compared with experiments. This shows that the linear and NLO properties of bilayer metallic films can both be tuned in the visible spectral region by controlling the mass-thickness ratio between Au and Ag. The combined properties of these bilayers are therefore attractive for different photonic applications illustrated by plasmonic devices and optical filters.

Second, the understanding of NLO response of metallic films leads to the development of NLO devices, which can further amplify the ultrafast thermal nonlinearities of noble metals. The NLO device structure comprises four thin-film layers and can be engineered to display strong reflectance changes with very broad spectral and angular bandwidths across the visible spectral region. Upon being excited by a femtosecond optical pulse, an improved change of reflectance up to 25 times was observed when comparing the NLO device with a single Au film, having the same Au thickness, on a glass substrate. The reflectance change of the NLO device is ultrafast. The linear and NLO properties of these NLO devices can also be engineered to present narrow spectral and angular bandwidths while preserving a strong NLO response. The adjustable bandwidth of NLO device designs transforms all-optical controls not only for low peak-power but also for high peak-power signal pulses applications.

Third, the development of the NLO device technology was integrated into an ultrafast optical system. The temporal-scan experiments show that the ultrafast all-optical shutter opens and closes by an ultrafast temporal response faster than 1 ps excited by a femtosecond control pulse, and its adjustable opening window was demonstrated to be precisely and easily tunable from 3.2 to 12 ps.

This application presents a comprehensive study of the linear and NLO properties of noble metal thin films, and NLO devices that lead to a large enhancement of their ultrafast NLO responses. Applicants contemplate taking the NLO device designs presented herein, as a starting point, to further amplify the NLO response. Possible approaches include inclusion of nonlinear dielectrics and a cascaded connection of the NLO devices wherein a signal pulse passes multiple times.

Since the metal-dielectric thin-film structures (Broadband and narrowband NLO devices) contain four components layers by two dielectric layers and two noble metal (Au and Ag) layers, it is possible to incorporate dielectric layers with strong NLO properties. Therefore, the nonlinearities of the whole structure could be completely exploited and cause further enhancement by nonlinearities not only from the metal layer but also superimposing with nonlinear dielectric layers. Note that the initial structure is designed only to amplify ultrafast thermal nonlinearities of its component Au layer. When superimposing the other NLO properties from dielectric layers, the total enhancement effect should not be decreased. Since the driving force of ultrafast thermal nonlinearities originates from the density of absorbed power, which is proportional to the linear absorptance in a metal layer, the NLO dielectric layer candidate should have a relatively low linear absorptance to preserve the linear absorption properties of the metal layer in order to excite its NLO response.

Further investigation includes NLO dielectrics such as Au or Ag nanoparticles doped dielectric composite films, where their dielectric host are transparent such as $SiO_2$ and polyvinylpyrrolidone (PVP), which shows large nonlinear absorptions and nonlinear refractive indices based on the third-order nonlinear susceptibility $\chi^{(3)}$ process.

Figure 40:
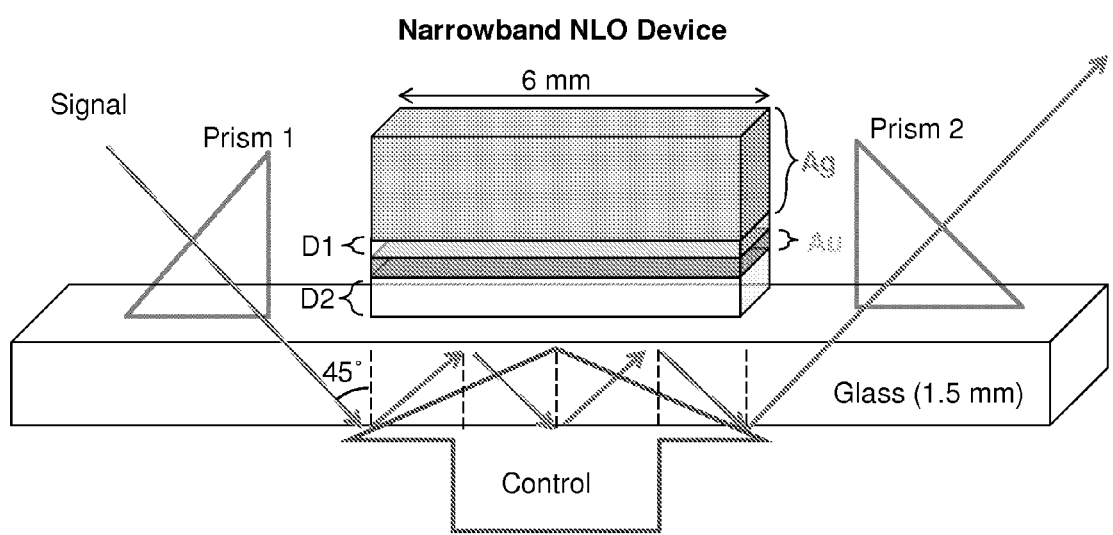
FIG. 40: Cascaded beam geometry imposed on the Narrowband NLO Device by a glass slab waveguide, where a signal pulse enters the waveguide at the incidence angle of 45°, double passes through the device in a reflection mode, and overlaps temporally and spatially with a control pulse coming at the normal incidence; Prism 1 and 2 are two right-angle prisms for coupling in and out the signal pulse.

In addition to the inclusion of NLO dielectrics in the structure, the other approach of accessing a larger NLO response without changing the material composition in NLO devices is to impose a cascade connection on a single NLO device. FIG. 40 shows possible geometry for coupling a signal pulse into a glass slab waveguide and form the cascade connection at the narrowband NLO device. Here, a 1.5 mm-thick glass substrate (Ex: VWR Micro Slides glass) is used as a glass slab waveguide, and the four layer metal-dielectric thin-film structure can be deposited on top of this glass substrate with a patterned length of 6 mm by an e-beam deposition system with a shadow mask. Prism 1 and 2 are two right-angle prisms for coupling the signal pulse in and out the glass slab waveguide. The signal pulse can be coupled into the slab waveguide at the incidence angle of 45°, which matches the total reflection angle at the interface between air and glass. After a signal pulse is coupled into the glass slab waveguide, it would reflect off the narrowband NLO device twice, and experience two nonlinear reflection coefficient changes excited by the same control pulse. The result of doubling NLO interactions between a signal pulse and the narrowband NLO device cascades two amplitude and/or phase modulations. The total cascaded signal modulations is expected to be increased compared to a single non-cascaded modulation in a simulation study. Thus, optimizing the cascaded signal modulations by multiple optical passes through the narrowband NLO device can be further developed.

Although the continuous study in amplifying the NLO properties of metal-dielectric thin-film structures is always attractive for ultrafast optical applications, it is also worthwhile to understand ultrafast optical applications that could benefit from the all-optical control technology presented herein.

A wide variety of possible optical applications were discovered through a National Science Foundation (NSF-iCORPS) program through many interviews with people in the related industry and academic field.

The ultrafast all-optical shutter was first investigated as a way to extract a high peak-power sub-nanosecond laser pulse out of a nanosecond laser pulse. The potential impact of such an approach is that it could enable a low-cost, high speed, and easily maintenance sub-nanosecond laser to provide high resolution non-thermal ablation. Further development of a high peak-power sub-nanosecond laser pulse extraction system will require integrating the ultrafast all-optical shutter into a single nanosecond laser. A major challenge includes sharpening the fast rising edge of a control optical pulse from a nanosecond seed pulse. A possible solution is to generate a sharp rising edge optical pulse by passing a nanosecond pulse through a slow saturable absorber, for example, an organic dye DODCI (3,3'-diethyloxadicarbocyanine iodide). Because the sub-nanosecond pulse extracted by the ultrafast all-optical shutter is expected to create a unique temporal pulse shape (flat-hat like) as shown in FIG. 39(b), materials could therefore be non-thermally ablated resulting in a high cutting resolution.

Further, the temporally shaped optical pulse could be converted into a short electron pulse by passing through a photocathode based on the photon-electric effect. The high photoelectrons generation efficiency and an adjustable temporal pulse width within tens of picoseconds could be enabled. Then, the short X-ray pulse is able to be emitted by passing electron pulses through the X-ray tube. Both short electron pulses and X-ray pulses are powerful laboratory tools in fundamental studies, and X-ray pulses also have potential impacts in medical imaging applications.

The second path is to use the ultrafast all-optical shutter as an ultrafast camera for ultrafast photography. Although ultrafast events such as visualizing light propagation can be captured by a streak camera, each image frame needs to be scanned and reconstructed through a multiple of captured lines. The present ultrafast camera with a single shot per imaging frame ability with the ultrafast all-optical shutter can improve the image quality and recording speed.

A third path is to use the ultrafast all-optical shutter as a biomedical imaging device for seeing through scattering medium, for example, imaging blood vessels beneath skins. In an exemplary embodiment, the ultrafast all-optical shutter is used to demonstrate ballistic-photon imaging using a time-gated optical image technique.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A nonlinear optical device comprising:
   a first conductive metal layer at least 50 nm thick;
   a first dielectric layer;
   a second conductive metal layer comprising a noble metal; and
   a second dielectric layer;
   wherein the device is operable for an ultrafast and large change of its reflection or absorption coefficient upon being excited by an ultrafast optical pulse at wavelengths in the visible (Vis), near-infrared (NIR) or infrared (IR) spectral regions.

2. The nonlinear optical device of claim 1, wherein the first conductive metal layer is at least 100 nm thick.

3. The nonlinear optical device of claim 1, wherein the first conductive metal layer is at least 200 nm thick.

4. The nonlinear optical device of claim 1, wherein the refractive index of the first dielectric layer has a value of at least 1 in the spectral region of operation of the nonlinear optical device.

5. The nonlinear optical device of claim 1, wherein the second conductive metal layer comprises a noble metal from the group consisting of Au, Ag, and Cu.

6. The nonlinear optical device of claim 1, wherein the second conductive metal layer is between 5 nm and 40 nm thick.

7. The nonlinear optical device of claim 1, wherein the refractive index of the second dielectric layer has a value of at least 1 in the spectral region of operation of the nonlinear optical device.

8. The nonlinear optical device of claim 1, wherein the device is tunable, such that the thickness of the first and second dielectric layers are selected to produce a desired amount of absorption in the second conductive metal layer to produce a desired nonlinear optical change of the reflection or absorption coefficient of the nonlinear optical device.

9. The nonlinear optical device of claim 1, wherein at a given wavelength, the absorptance in the second conductive metal layer is a periodic function of an optical path length, defined as the thickness of a layer times its refractive index, of the first and second dielectric layers.

10. The nonlinear optical device of claim 9, wherein the periodicity of the absorptance in the second conductive metal layer is half-wave the optical path length of the first and second dielectric layers.

11. The nonlinear optical device of claim 1, wherein the nonlinear reflectance change is at least 10% at fluences less than 10 $J/m^2$.

12. The nonlinear optical device of claim 1, wherein the device acts as a reflective saturable absorber that presents a high absorptance at low irradiances and a lower absorptance at high irradiances.

13. The nonlinear optical device of claim 1, wherein the device as a non-degenerate switch or modulator wherein the absorptance or reflectance of the device at a first wavelength is modified by the absorption of light at a second wavelength.

14. An ultrafast all-optical shutter comprising the nonlinear optical device of claim 1.

15. An ultrafast framing camera comprising the nonlinear optical device of claim 1.

16. A nonlinear Sagnac interferometer comprising:
an imaging lens;
a ring interferometer;
a beam splitter at an entrance of the ring interferometer;
mirrors;
linear optical device of claim 1; and
a detector;
wherein one of the mirrors is to direct a control optical pulse to overlap with the Fourier spectrum of an image plane at the nonlinear optical device.

17. A nonlinear Sagnac interferometer comprising:
a first imaging lens;
a ring interferometer;
a beam splitter at an entrance of the ring interferometer;
a first mirror;
the nonlinear optical device of claim 1;
a second mirror;
a variable delay line;
a second lens;
a detector; and
a third mirror used to direct a control optical pulse to overlap with the Fourier spectrum of an image plane at the nonlinear optical device.

18. A nonlinear optical device comprising:
at least one metallic layer; and
at least on dielectric layer;
wherein the device acts as a nonlinear mirror that presents a high reflectance at a first angle of incidence and a high absorptance at a second angle of incidence, wherein a light impinging on the nonlinear mirror with a high irradiance at the second angle of incidence causes a strong reduction of the reflectance of the nonlinear mirror at the first angle of incidence.

19. The nonlinear optical device of claim 18, wherein the device is operable for an ultrafast and large change of its reflection or absorption coefficient upon being excited by an ultrafast optical pulse at wavelengths in the visible (Vis), near-infrared (NIR) or infrared (IR) spectral regions.

20. The nonlinear optical device of claim 18 having a nonlinear reflectance change of at least 10% at fluences less than 10 $J/m^2$.

21. A nonlinear optical device comprising:
at least one metallic layer; and
at least on dielectric layer;
wherein the device acts as a non-degenerate nonlinear mirror, wherein the reflectance at a first wavelength and at a first angle of incidence is controlled by the absorption of a light pulse at a second wavelength and at a second angle of incidence.

22. The nonlinear optical device of claim 21, wherein the device is operable for an ultrafast and large change of its reflection or absorption coefficient upon being excited by an ultrafast optical pulse at wavelengths in the visible (Vis), near-infrared (NIR) or infrared (IR) spectral regions.

* * * * *

UNITED STATES PATENT AND TRADEMARK OFFICE
CERTIFICATE OF CORRECTION

PATENT NO. : 9,658,510 B2
APPLICATION NO. : 14/764100
DATED : May 23, 2017
INVENTOR(S) : Bernard Kippelen, Canek Fuentes-Hernandez and James June Fan Hsu It is certified that error appears in the above-identified patent and that said Letters Patent is hereby corrected as shown below:

In the Specification

Column 1, Lines 19-23, insert:
--This technology was made with government support under contract number W31P4Q-09-1-0012 awarded by U.S. Army, contract no. DMR0120967 awarded by National Science Foundation (NSF), contract number FA9550-09-1-0418 awarded by U.S. Air Force, and contract number N00014-10-1-0392 awarded by the Office of Naval Research. The government has certain rights in the technology.--

Signed and Sealed this
Twenty-seventh Day of March, 2018

Andrei Iancu
*Director of the United States Patent and Trademark Office*